United States Patent
Whelan et al.

(10) Patent No.: US 12,545,510 B2
(45) Date of Patent: Feb. 10, 2026

(54) AUTOMATED STORAGE SYSTEMS, AND DEVICES

(71) Applicant: Ocado Innovation Limited, Hatfield (GB)

(72) Inventors: Matthew Whelan, Hatfield (GB); Wilhelm Johannisson, Hatfield (GB); Alice Moss, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 333 days.

(21) Appl. No.: 17/909,060

(22) PCT Filed: Mar. 3, 2021

(86) PCT No.: PCT/EP2021/055383
§ 371 (c)(1),
(2) Date: Sep. 2, 2022

(87) PCT Pub. No.: WO2021/175948
PCT Pub. Date: Sep. 10, 2021

(65) Prior Publication Data
US 2023/0088136 A1 Mar. 23, 2023

(30) Foreign Application Priority Data

Mar. 4, 2020 (GB) ..................................... 2003091
Mar. 4, 2020 (GB) ..................................... 2003097
(Continued)

(51) Int. Cl.
*B65G 1/04* (2006.01)
*B25J 15/00* (2006.01)
(Continued)

(52) U.S. Cl.
CPC ........ *B65G 1/0464* (2013.01); *B25J 15/0047* (2013.01); *B25J 15/022* (2013.01); *B66C 1/54* (2013.01); *B66C 1/663* (2013.01)

(58) Field of Classification Search
CPC ... B65G 1/0464; B25J 15/0047; B25J 15/022; B66C 1/54; B66C 1/663
See application file for complete search history.

(56) References Cited

U.S. PATENT DOCUMENTS 2,701,065 A 2/1955 Bertel
3,610,652 A 10/1971 Moore
(Continued)

FOREIGN PATENT DOCUMENTS

CA 3086277 A1 7/2019
CN 104786731 A 7/2015
(Continued)

OTHER PUBLICATIONS

First Office Action issued on Dec. 19, 2023, by the Japanese Patent Office in corresponding Japanese Patent Application No. 2022-552843, English Translation only. (10 pages).
(Continued)

*Primary Examiner* — James Keenan
(74) *Attorney, Agent, or Firm* — Buchanan Ingersoll & Rooney PC

(57) ABSTRACT

A grid framework structure includes a first set of parallel rails or tracks and a second set of parallel rails or tracks extending substantially perpendicularly to the first set of rails or tracks in a substantially horizontal plane to form a grid pattern. The grid is supported by a set of uprights to form a plurality of vertical storage locations beneath the grid for containers to be stacked between and be guided by the uprights in a vertical direction. A load handling device includes a body mounted on a first set of wheels and a
(Continued)

second set of wheels arranged to engage with the tracks. A gripper assembly is provided for latching to a storage container via a deformable flexure mechanism movable between a locked configuration and a release configuration.

21 Claims, 42 Drawing Sheets

(30) Foreign Application Priority Data

| Mar. 4, 2020 | (GB) | ................................. 2003110 |
| Jun. 1, 2020 | (GB) | ................................. 2008183 |

(51) Int. Cl.
  *B25J 15/02* (2006.01)
  *B66C 1/54* (2006.01)
  *B66C 1/66* (2006.01)

(56) References Cited

U.S. PATENT DOCUMENTS

| 3,800,963 | A | 4/1974 | Holland |
| 3,978,995 | A | 9/1976 | Zollinger et al. |
| 4,134,604 | A | 1/1979 | Jackson |
| 4,307,988 | A | 12/1981 | Page et al. |
| 4,511,348 | A | 4/1985 | Witdoek et al. |
| 4,515,235 | A | 5/1985 | Yamamoto et al. |
| 4,629,062 | A | 12/1986 | Silverthorn et al. |
| 5,156,513 | A | 10/1992 | Galan et al. |
| 5,401,079 | A | 3/1995 | Rooney |
| 5,429,470 | A | 7/1995 | Nicol et al. |
| 5,816,774 | A * | 10/1998 | Stolzer ............... B65G 1/0442 414/792.8 |
| 5,944,390 | A | 8/1999 | Parenzuela |
| 6,561,884 | B1 | 5/2003 | White et al. |
| 6,726,532 | B2 | 4/2004 | Lin et al. |
| 7,494,434 | B2 | 2/2009 | McVicar et al. |
| 7,648,436 | B2 | 1/2010 | Horst et al. |
| 7,699,731 | B2 | 4/2010 | Bicchi et al. |
| 10,000,337 | B2 * | 6/2018 | Lindbo ............... B65G 1/0492 |
| 10,259,122 | B2 * | 4/2019 | Odhner ............... B25J 15/024 |
| 10,343,286 | B2 * | 7/2019 | Vain ................... B25J 11/00 |
| 10,836,577 | B2 * | 11/2020 | Fryer ................... B65G 1/065 |
| 10,882,540 | B2 * | 1/2021 | Stadie ................ B65G 1/0464 |
| 11,424,491 | B2 * | 8/2022 | Väin ................... H01M 50/20 |
| 11,981,201 | B2 | 5/2024 | O'Brien et al. |
| 2002/0096237 | A1 | 7/2002 | Burhoe et al. |
| 2003/0113191 | A1 | 6/2003 | Smith et al. |
| 2004/0072642 | A1 | 4/2004 | Serkh |
| 2006/0287146 | A1 | 12/2006 | McVicar et al. |
| 2007/0155559 | A1 | 7/2007 | Horst et al. |
| 2008/0053586 | A1 | 3/2008 | Hanada et al. |
| 2008/0139354 | A1 | 6/2008 | Bogner |
| 2009/0211675 | A1 | 8/2009 | Louden |
| 2011/0126948 | A1 | 6/2011 | Boyer et al. |
| 2011/0260525 | A1 | 10/2011 | Delfino et al. |
| 2011/0272254 | A1 | 11/2011 | Anderfaas et al. |
| 2011/0312454 | A1 | 12/2011 | Comsa et al. |
| 2012/0225744 | A1 | 9/2012 | Markley |
| 2012/0318589 | A1 | 12/2012 | Staley et al. |
| 2014/0037404 | A1 | 2/2014 | Hancock et al. |
| 2014/0110024 | A1 | 4/2014 | Anderfaas et al. |
| 2014/0110192 | A1 | 4/2014 | Yoshioka et al. |
| 2014/0291124 | A1 | 10/2014 | Fenile et al. |
| 2014/0309882 | A1 | 10/2014 | Antchak et al. |
| 2014/0367007 | A1 | 12/2014 | Thompson |
| 2015/0127143 | A1 * | 5/2015 | Lindbo ................ B65G 1/0464 700/218 |
| 2016/0167227 | A1 | 6/2016 | Wellman et al. |
| 2016/0167228 | A1 | 6/2016 | Wellman et al. |
| 2016/0194151 | A1 | 7/2016 | Lindbo et al. |
| 2016/0325928 | A1* | 11/2016 | Lepek .................. B65G 1/0471 |
| 2016/0375723 | A1 | 12/2016 | Jochim et al. |
| 2017/0021499 | A1 | 1/2017 | Wellman et al. |
| 2017/0106532 | A1 | 4/2017 | Wellman et al. |
| 2017/0157983 | A1 | 6/2017 | Siegel |
| 2017/0174005 | A1 | 6/2017 | Van Riper et al. |
| 2018/0029419 | A1 | 2/2018 | Kim et al. |
| 2018/0072095 | A1 | 3/2018 | Anderfaas et al. |
| 2018/0141211 | A1 | 5/2018 | Wellman et al. |
| 2018/0178981 | A1 | 6/2018 | Lindbo et al. |
| 2018/0194571 | A1 | 7/2018 | Fryer et al. |
| 2018/0319590 | A1 | 11/2018 | Lindbo et al. |
| 2018/0346243 | A1 | 12/2018 | Lindbo et al. |
| 2018/0354304 | A1 | 12/2018 | Haidet et al. |
| 2018/0354717 | A1 | 12/2018 | Lindbo et al. |
| 2019/0001744 | A1 | 1/2019 | Delfino et al. |
| 2019/0161273 | A1 | 5/2019 | Ingram-tedd et al. |
| 2019/0225436 | A1 | 7/2019 | Lindbo et al. |
| 2019/0291955 | A1 | 9/2019 | Bastian |
| 2019/0344613 | A1 | 11/2019 | Anderfaas et al. |
| 2019/0366767 | A1 | 12/2019 | Delfino et al. |
| 2020/0055713 | A1 | 2/2020 | Turnbull et al. |
| 2020/0094617 | A1 | 3/2020 | Wang et al. |
| 2020/0276861 | A1 | 9/2020 | Thompson et al. |
| 2020/0354147 | A1 | 11/2020 | Lindbo et al. |
| 2020/0391941 | A1 | 12/2020 | Austrheim et al. |
| 2020/0399060 | A1 | 12/2020 | Whelan et al. |
| 2021/0047111 | A1 | 2/2021 | Lindbo et al. |
| 2021/0053759 | A1 | 2/2021 | Lindbo et al. |
| 2021/0114811 | A1 | 4/2021 | Clark et al. |
| 2021/0138830 | A1 | 5/2021 | Nishida |
| 2021/0139239 | A1* | 5/2021 | Austrheim .......... B65G 1/0464 |
| 2021/0146772 | A1 | 5/2021 | Takamatsu |
| 2021/0354365 | A1 | 11/2021 | Kritchman et al. |
| 2022/0314790 | A1 | 10/2022 | O'Brien et al. |
| 2023/0090378 | A1 | 3/2023 | Whelan et al. |
| 2023/0102969 | A1 | 3/2023 | Whelan et al. |
| 2023/0106919 | A1 | 4/2023 | Johannisson |
| 2024/0217263 | A1 | 7/2024 | Johannisson |
| 2024/0253461 | A1 | 8/2024 | O'Brien et al. |

FOREIGN PATENT DOCUMENTS

| CN | 107364734 A * | 11/2017 | ............ B65G 65/23 |
| CN | 206856399 U | 1/2018 | |
| CN | 207122552 U | 3/2018 | |
| CN | 108116154 A | 6/2018 | |
| CN | 110239871 A * | 9/2019 | |
| CN | 110561478 A | 12/2019 | |
| CN | 111056234 A | 4/2020 | |
| CN | 210682126 U | 6/2020 | |
| CN | 111660718 A | 9/2020 | |
| DE | 3804821 A1 | 8/1989 | |
| DE | 202005011567 U1 | 11/2005 | |
| DE | 102005046160 B3 * | 3/2007 | .......... B25J 15/0226 |
| DE | 102007042501 A1 | 3/2009 | |
| DE | 102018201929 A1 | 8/2019 | |
| DE | 102018215451 A1 | 3/2020 | |
| EP | 0767113 B1 | 7/2002 | |
| EP | 1225063 A2 | 7/2002 | |
| EP | 1037828 B1 | 9/2003 | |
| EP | 2784009 A1 | 10/2014 | |
| EP | 3178664 A1 | 6/2017 | |
| EP | 3543201 A1 | 9/2019 | |
| EP | 3798156 A1 | 3/2021 | |
| FR | 2623141 A1 | 5/1989 | |
| GB | 2153757 A | 8/1985 | |
| GB | 2517264 A | 2/2015 | |
| GB | 2520104 A | 5/2015 | |
| GB | 2524383 B | 1/2017 | |
| GB | 2550027 A | 11/2017 | |
| GB | 2573874 A | 11/2019 | |
| GB | 2584766 A | 12/2020 | |
| GB | 2587476 A | 3/2021 | |
| JP | H5-28702 U | 4/1993 | |
| JP | 5623546 B2 * | 11/2014 | .......... B25J 15/0019 |
| JP | 2017114481 A | 6/2017 | |
| JP | 2018016304 A | 2/2018 | |
| JP | 2018188097 A | 11/2018 | |
| JP | 2019506319 A | 3/2019 | |
| JP | 2019116386 A | 7/2019 | |

(56) References Cited

FOREIGN PATENT DOCUMENTS

| | | | |
|---|---|---|---|
| KR | 20160040690 A | 4/2016 | |
| KR | 20160133487 A | 11/2016 | |
| WO | 2010012091 A1 | 2/2010 | |
| WO | WO-2010108662 A1 * | 9/2010 | ............ B25J 15/022 |
| WO | 2011056719 A2 | 5/2011 | |
| WO | 2015019055 A1 | 2/2015 | |
| WO | 2016100235 A1 | 6/2016 | |
| WO | 2016166294 A1 | 10/2016 | |
| WO | 2017081281 A1 | 5/2017 | |
| WO | 2017106723 A1 | 6/2017 | |
| WO | 2017116825 A1 | 7/2017 | |
| WO | 2017117598 A1 | 7/2017 | |
| WO | 2017117605 A1 | 7/2017 | |
| WO | 2017153583 A1 | 9/2017 | |
| WO | 2018112650 A1 | 6/2018 | |
| WO | 2018115939 A1 | 6/2018 | |
| WO | 2018206478 A1 | 11/2018 | |
| WO | 2018207460 A1 | 11/2018 | |
| WO | 2019119155 A1 | 6/2019 | |
| WO | 2019170805 A1 | 9/2019 | |
| WO | 2019198506 A1 | 10/2019 | |
| WO | 2021175922 A1 | 9/2021 | |
| WO | 2021175940 A1 | 9/2021 | |
| WO | 2021175948 A1 | 9/2021 | |
| WO | 2021175956 A1 | 9/2021 | |
| WO | 2021175958 A1 | 9/2021 | |

OTHER PUBLICATIONS

Office Action issued on Dec. 20, 2023, by the Canadian Patent Office in corresponding Canadian Patent Application No. 3,173,591. (8 pages).
Examination Report dated Jun. 16, 2022 by the British Patent Office for Application No. 2102968.1 (4 pages).
Examination Report dated Jun. 17, 2022 by the British Patent Office for Application No. 2102983.0 (3 pages).
Examination Report dated Jun. 17, 2022 by the British Patent Office for Application No. 2102990.5 (3 pages).
International Search Report (PCT/ISA/210) and Written Opinion (PCT/ISA/237) mailed on Jun. 10, 2021, by the European Patent Office as the International Searching Authority for International Application No. PCT/EP2021/055372. (13 pages).
International Search Report (PCT/ISA/210) and Written Opinion (PCT/ISA/237) mailed on Jun. 7, 2021, by the European Patent Office as the International Searching Authority for International Application No. PCT/EP2021/055335 (16 pages).
International Search Report (PCT/ISA/210) and Written Opinion (PCT/ISA/237) mailed on May 21, 2021, by the European Patent Office as the International Searching Authority for International Application No. PCT/EP2021/055383. (15 pages).
International Search Report (PCT/ISA/210) and Written Opinion (PCT/ISA/237) mailed on May 21, 2021, by the European Patent Office as the International Searching Authority for International Application No. PCT/EP2021/055396. (18 pages).
International Search Report (PCT/ISA/210) and Written Opinion (PCT/ISA/237) mailed on May 21, 2021, by the European Patent Office as the International Searching Authority for International Application No. PCT/EP2021/055398. (11 pages).
Search and Examination Report dated Aug. 16, 2021 by the British Patent Office for Application No. 2102990.5 (9 pages).
Search and Examination Report dated Aug. 17, 2021 by the British Patent Office for Application No. 2102968.1 (6 pages).
Search and Examination Report dated Aug. 19, 2021 by the British Patent Office for Application No. 2102997.0 (7 pages).
Search and Examination Report dated Aug. 20, 2021 by the British Patent Office for Application No. 2102983.0 (8 pages).
Search and Examination Report dated Jul. 9, 2021 by the British Patent Office for Application No. 2102974.9 (7 pages).
Search Report dated Dec. 1, 2020 by the British Patent Office for Application No. 2003110.0 (4 pages).
Search Report dated Nov. 26, 2020 by the British Patent Office for Application No. 2003097.9 (3 pages).
Search Report dated Nov. 26, 2020 by the British Patent Office for Application No. 2003091.2 (4 pages).
First Office Action issued on Oct. 17, 2023, by the Japanese Patent Office in corresponding Japanese Patent Application No. 2022-552844, English translation only,. (5 pages).
Office Action (Examination Report No. 1) issued on Nov. 13, 2023, by the Australian Patent Office in corresponding Australian Patent Application No. 2021232560. (5 pages).
Office Action (Examination Report No. 1) issued on Oct. 30, 2023, by the Australian Patent Office in corresponding Australian Patent Application No. 2021231548. (5 pages).
Office Action issued on Nov. 2, 2023, by the Canadian Patent Office in corresponding Canadian Patent Application No. 3,174,055. (5 pages).
Office Action issued on Jun. 13, 2024, by the Canadian Patent Office in corresponding Canadian Patent Application No. 3,174,461. (5 pages).
Office Action (Examination Report No. 2) issued on May 10, 2024, by the Australian Patent Office in corresponding Australian Patent Application No. 2021231548. (4 pages).
Office Action (Examination Report No. 2) issued on May 15, 2024, by the Australian Patent Office in corresponding Australian Patent Application No. 2021232560. (5 pages).
Office Action (Examination Report No. 2) issued on May 20, 2024, by the Australian Patent Office in corresponding Australian Patent Application No. 2021231223. (3 pages).
Office Action (Request for the Submission of an Opinion) issued on Apr. 30, 2024, by the Korean Patent Office in corresponding Korean Patent Application No. 10-2022-7034152, and an English Translation of the Office Action. (6 pages).
Office Action issued on May 20, 2024, by the Korean Patent Office in corresponding Korean Patent Application No. 10-2022-7034145, and an English Translation of the Office Action. (19 pages).
Office Action (Examination Report No. 1) issued on Aug. 30, 2023, by the Australian Patent Office in corresponding Australian Patent Application No. 2021231223. (4 pages).
Office Action (Examination Report No. 1) issued on Aug. 31, 2023, by the Australian Patent Office in corresponding Australian Patent Application No. 2021231230. (4 pages).
Office Action (Examination Report No. 1) issued on Aug. 31, 2023, by the Australian Patent Office in corresponding Australian Patent Application No. 2021231546. (4 pages).
Office Action issued on Dec. 8, 2022, by the Great Britain Patent Office in corresponding Great Britain Patent Application No. GB2210402.0. (5 pages).
Office Action issued on Nov. 21, 2023, by the Canadian Patent Office in corresponding Canadian Patent Application No. 3,174,038. (4 pages).
Office Action issued on Nov. 24, 2023, by the Canadian Patent Office in corresponding Canadian Patent Application No. 3, 174,461. (7 pages).
Office Action issued on Nov. 6, 2023, by the Canadian Patent Office in corresponding Canadian Patent Application No. 3,173,588. (4 pages).
Office Action (Communication) issued on Nov. 7, 2024, by the European Patent Office in corresponding European Patent Application No. 21 708 255.1. (4 pages).
Office Action issued on Jan. 13, 2025, by the Korean Patent Office in corresponding Korean Patent Application No. 10-2022-7034146, and a machine English Translation of the Office Action. (29 pages).
Office Action issued on Nov. 8, 2024, by the Chinese Patent Office in corresponding Chinese Patent Application No. 202180032590.4, and a machine English Translation of the Office Action. (28 pages).
Office Action (Communication) issued on Oct. 4, 2024, by the European Patent Office in corresponding European Patent Application No. 21 708 251.0. (6 pages).
Office Action issued on Oct. 23, 2024, by the U.S. Patent and Trademark Office in co-pending U.S. Appl. No. 17/909,090. (16 pages).

(56) References Cited

OTHER PUBLICATIONS

Office Action issued on Sep. 12, 2024, by the U.S. Patent and Trademark Office in co-pending U.S. Appl. No. 17/909,052. (10 pages).
Office Action (Communication) issued on Nov. 11, 2024, by the European Patent Office in corresponding European Patent Application No. 21 708 244.5. (8 pages).
Office Action issued on Aug. 16, 2024, by the Canadian Patent Office in corresponding Canadian Patent Application No. 3,174,038. (8 pages).
Office Action issued on Sep. 3, 2024, by the Canadian Patent Office in corresponding Canadian Patent Application No. 3,173,588. (3 pages).

\* cited by examiner (a)          (b)

(a)          (b)

(a)          (b)

(a)          (b)

(a)

(b)

AUTOMATED STORAGE SYSTEMS, AND DEVICES

FIELD OF THE INVENTION

The present invention relates to automated storage systems devices. More specifically but not exclusively, it relates to load handling devices operating on a storage system, the storage systems having storage bins in stacks, the stacks being located within a grid structure.

BACKGROUND

Methods of handling containers stacked in rows have been well known for decades. Some such systems, for example as described in U.S. Pat. No. 2,701,065, to Bertel, comprise free-standing stacks of containers arranged in rows in order to reduce the storage volume associated with storing such containers but yet still provide access to a specific container if required. Access to a given container is made possible by providing relatively complicated hoisting mechanisms which can be used to stack and remove given containers from stacks. The costs of such systems are, however, impractical in many situations and they have mainly been commercialised for the storage and handling of large shipping containers.

The concept of using free-standing stacks of containers and providing a mechanism to retrieve and store specific containers has been developed further, for example as described in EP 0767113 B to Cimcorp. EP'113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in EP'113, the height of the tube has to be at least as high as the height of the largest stack of containers, so that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) describes a system in which stacks of containers are arranged within a frame structure. A system of this type is illustrated schematically in FIGS. 1 to 4 of the accompanying drawings. Robotic load handling devices can be controllably moved around the stack on a system of tracks on the uppermost surface of the stack.

A load handling device is described in UK Patent Application No. GB2520104A— Ocado Innovation Limited— where each robotic load handler only covers one grid space, thus allowing high density of load handlers and thus high throughput of a given size system.

In the known robotic picking systems described above, robotic load handling devices are controllably moved around the top of the stacks on a track system forming a grid. A given load handling device lifts a bin from the stack, the container being lifted containing inventory items needed to fulfil a customer order. The container is carried to a pick station where the required inventory item may be manually removed from the bin and placed in a delivery container, the delivery container forming part of the customer order, and being manually filled for dispatch at the appropriate time. At the pick station, the items may also be picked by industrial robots, suitable for such work, for example as described in UK Patent Application No GB2524383B— Ocado Innovation Limited.

As shown in FIGS. 1 and 2, stackable storage containers, known as bins 10, are stacked on top of one another to form stacks 12. The stacks 12 are arranged in a framework 14 in a warehousing or manufacturing environment. FIG. 1 is a schematic perspective view of the framework 14, and FIG. 2 is a top-down view showing a single stack 12 of bins 10 arranged within the framework 14.

Each bin 10 typically holds a plurality of product or inventory items, and the inventory items within a bin 10 may be identical, or may be of different product types depending on the application. Furthermore, the bins 10 may be physically subdivided to accommodate a plurality of different inventory items.

The framework 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the framework 14, so that the framework 14 guards against horizontal movement of the stacks 12 of bins 10, and guides vertical movement of the bins 10.

The top level of the framework 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the framework 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the framework 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the framework 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being of a size capable of holding a bin 10. The lifting means 38 comprises winch means and a bin gripper assembly 39. The lifting means lifts a bin 10 from the stack 12 to within the cavity 40 within the body of the vehicle 32.

When in the cavity 40, the bin 10 is lifted clear of the rails beneath, so that the load handling device can move laterally to a different location on the grid. On reaching the target location, for example another stack, an access point in the storage system or a conveyor belt, the bin 10 can be lowered from the cavity and released from the gripper assembly 39.

In this way, multiple products can be accessed from multiple locations in the grid and stacks at any one time.

The above description describes a storage system in connection with, for example, groceries. FIG. 4 shows a typical such storage system, the system having a plurality of load handling devices 30 active on the grid above the stacks 12.

FIGS. 1 and 4 show the bins 10 in stacks 12 within the storage system. It will be appreciated that there may be a large number of bins 10 in any given storage system and that many different items may be stored in the bins 10 in the stacks 12. Each bin 10 may contain different categories of inventory items within a single stack 12.

In one system described above and further in UK Patent Application Number GB2517264A— Ocado Innovation Limited, hereby incorporated by reference—the storage system comprises a series of bins 10 that may further comprise delivery containers DT with customer orders contained therein or may further comprise bins 10 with inventory items awaiting picking contained therein. These different bins 10 and combinations thereof may be contained in the storage system and be accessed by the robotic load handling devices 30 as described above.

It will be appreciated that automated or semi-automated storage and retrieval systems are not limited to systems directed to groceries. For example, the technology can be applied to shipping, baggage handling, vehicle parking, indoor or hydroponic greenhouses and farming, modular buildings, self-storage facilities, cargo handling, transport switchyards, manufacturing facilities, pallet handling, parcel sortation, airport logistics (ULD) and general logistics to name but a few possible applications. It will be appreciated that storage and retrieval systems of different types will have different technical requirements.

It is against this background that the present invention has been devised.

SUMMARY

Aspects of the invention are set out in the accompanying claims.

One aim is to provide a lightweight load handling device. Another aim is to provide a low cost load handling device. Another aim is to provide a modular load handling device, which is easy and or cheap to maintain.

Another aim is to provide a load handling device that is primarily made from recyclable or environmentally-friendly materials.

A load handling device is provided for lifting and moving storage containers (10) stacked in a grid framework (14) structure comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprises: a body mounted on a first set of wheels (116) being arranged to engage with the first set of parallel tracks (22b) and a second set of wheels being arranged to engage with the second set of parallel tracks (22a), and a direction-change assembly arranged to raise or lower the first set of wheels and or lower or raise the second set of wheels with respect to the body to engage and disengage the wheels with the parallel tracks, wherein the direction-change assembly comprises a compliant mechanism having at least one resiliently deformable member arranged to move under an applied force to cause the wheels to raise or lower.

A load handling device is provided for lifting and moving storage containers stacked in a grid framework structure comprising: a first set of parallel rails or tracks and a second set of parallel rails or extending substantially perpendicularly to the first set of rails or tracks in a substantially horizontal plane to form a grid pattern comprising a plurality of grid spaces, wherein the grid is supported by a set of uprights to form a plurality of vertical storage locations beneath the grid for containers to be stacked between and be guided by the uprights in a vertical direction through the plurality of grid spaces, the load handling device comprising: a body mounted on a first set of wheels being arranged to engage with the first set of parallel tracks and a second set of wheels being arranged to engage with the second set of parallel tracks, and a direction-change assembly arranged to raise or lower the first set of wheels, and or lower or raise the second set of wheels with respect to the body to engage and disengage the wheels with the parallel tracks, wherein the direction-change assembly comprises a linkage-set having a series of members arranged between a traveller and a fixed brace, wherein the traveller is arranged to move under an applied force to cause the wheels to raise or lower.

It will be appreciated that each of the series of members may be the same. Thus, each member will have a similar movement when the traveller is moved relative to the fixed brace. It will be appreciated that the linkage-set may comprise one member between the traveller and the fixed brace. However, typically, the series of members may comprise two or more members or legs. One leg would be located between each end of the traveller and fixed brace to avoid twisting of the arrangement. Typically, the series of members may comprise five members. It will be appreciated that any number of members may be used according to the requirements of the direction-change assembly and the length, and therefore space, on the traveller and fixed brace.

The first set of wheels and the second set of wheels may be independently driveable with respect to each other. When the load handling device is being driven, only one set of wheels is engaged with the grid thereby enabling movement of the load handling device along the tracks to any point on the grid by driving only the set of wheels engaged with the tracks.

An advantage of the direction change assembly comprising a compliant mechanism or linkage-set is that it may reliably engage the appropriate set of wheels in order to effectively and efficiently manoeuvre the load handling device on and around the grid in x- and y-directions, in forward and reverse in order to be able to reach each grid space and move around other devices operating on the grid. A further advantage of a compliant mechanism or linkage-set for a direction change assembly is that it may be made to be light-weight as a result of making use of the material properties.

The direction-change mechanism may be connected to both the first set of wheels and the second set of wheels. Accordingly, by selectively operating one or other set of wheels, the load handling device is enabled to move to any position on the grid.

The linkage-set may be a series of resiliently deformable members comprising a compliant mechanism, or wherein the linkage-set is a series of pivotally connected rigid-body members. The series of members may each comprise pivotally connected two-part linkages. Joints between members of the linkage-set are rotationally limited.

In this way, the series of members may rotate about one pivot point, joint or hinge until it is stopped or limited, and then move about a second pivot point, joint or hinge. It will be appreciated that the linkages may comprise more than two joints. Advantageously, the movement of the series of members may be designed to manage the force required for the direction-change function relative to the position of the wheel sets or some other part of the load handling device, by adjusting the relative length between each part of the two-part linkages and by adjusting the rotational limits. By managing the forces required for the direction-change function, it is possible to manage the wear on parts of the load handling device. In turn, this leads to a more reliable device that requires less maintenance or fewer replacement parts.

The upper brace may be horizontally displaced relative to the lower brace, accordingly the upper brace may also be referred to as a traveller.

The compliant mechanism may be stable in a neutral configuration and the compliant mechanism may be stable in at least one other configuration. Similarly, the linkage-set may be stable in a neutral configuration and at least one other configuration.

In this way, the direction-change assembly has "preferred" configurations or positions which the linkage-set or compliant mechanism will tend to rest in or move to if a deforming force is removed.

This enables selection of the first set of wheels, the second set of wheels or both the first and second set of wheels. Advantageously, the load handling device can be arranged to move to a default position. Advantageously, the default position may passively i.e. without input, put the load handling device into a "safe" state automatically.

The linkage-set or compliant mechanism may be in a stable configuration when the first set of wheels is engaged with the tracks or when the second set of wheels is engaged with the tracks. Or the linkage-set or compliant mechanism may be in a stable configuration when the first set of wheels is engaged with the tracks and when the second set of wheels is engaged with the tracks. Thus, the linkage-set or compliant mechanism may have three stable configurations: a stable configuration for each set of wheels, and a stable "parked" configuration in which both the first and second sets of wheels are engaged with the tracks.

The direction-change assembly may comprise at least one linkage-set or compliant mechanism for each set of wheels. The linkage-sets or compliant mechanisms may be mechanically connected to move in unison between configurations.

The mechanical connection may be a belt linking two or more linkage-sets, optionally wherein the belt circumnavigates the body of the load handling device. Alternatively, the mechanical connection may be a chain. Thus, it may be ensured that there is a coordinated deployment of each set of wheels. This may prevent tilt of the load handling device body and as a result assists in keeping the load handling device envelope within tolerance of a single space during a direction-change operation. Accordingly, this lowers the risk of collision with other load handling devices operating on adjacent tracks. It will be appreciated that any number of linkage-sets or compliant mechanisms may be used to enable the direction-change assembly to operate with the desired behaviour, as described herein. It will be appreciated that a first opposed pair of sides of the load handling device should operate together, and the perpendicular second opposed pair or sides should operate counter to the first pair of sides. Thus, the linkage-set of compliant mechanisms on the second pair of sides may be reversed relative to the compliant mechanisms on the first pair of sides.

The at least one resiliently deformable member may be a hinge, and the compliant mechanism may comprise a series of trunk portions attached to an upper brace and a lower brace through hinges. The hinges may comprise a branch portion, or a spring portion. It will be appreciated that any other type of hinge may be used that has the necessary characteristics to achieve the desired behaviour of the compliant mechanism.

Thus, the compliant mechanisms are arranged to preferentially bend or flex at particular points on the form. In turn this encourages particular mechanical, or dynamic mechanical behaviour from the compliant mechanism. Hinges may be designed with thinner sections than the trunks.

As noted above, the compliant hinges may be replaced with another type of hinge. For example, the "living" hinges of the compliant mechanism may be replaced with pivotally connected rigid members arranged to replicate similar behaviour. Pivot connections may be hinges. Pivotally connected rigid members may be a linkage-set.

Each linkage-set or compliant mechanism may comprise at least one trunk portion having hinges of a first type and at least one trunk portion having hinges of a second type.

In this way, a complex behaviour of the linkage-set or compliant mechanism may be achieved. Hinges of the first type may display one type of behaviour, and hinges of the second type may display a second, different, behaviour. A linkage-set or compliant mechanism using a series of columns or trunks each with different behaviour characteristics may display a combination of behaviour characteristics.

In use, and for example, when the upper brace or traveller is moved in a first direction relative to the lower brace, the trunk portions having hinges of a first type may engage with the upper and lower braces in an x-direction stable configuration, and or when the upper brace or traveller is moved in a second direction relative to the lower brace, the trunk portions having hinges of a second type may engage with the upper and lower braces in a y-direction stable configuration.

The direction-change mechanism may be driven by a single motor.

In this way, a single motor may be used to change the direction of movement of a load handling device. It will be appreciated that a motor may be replaced with any means of activation, for example, a solenoid, hydraulic means, pneumatic means, servo means, solid state actuation means etc.. Advantageously this may reduce the overall cost and weight of the load handling device.

The direction-change mechanism may be driven by more than one motor. The direction-change mechanism may be driven by a motor for each respective compliant mechanism.

In this way, the load handling device may have some redundancy so that the load handling device may continue to operate even when there is partial failure of the load handling device, and thus avoid complete failure of the manoeuvrability of the load handling device on the grid.

Advantageously, a more robust direction change mechanism is provided. Advantageously, this reduces the downtime of individual load handling devices, and the overall storage and retrieval system.

The linkage-sets or compliant mechanism(s) may be made from plastic, polymer plastics, thermoset plastic, thermoplastic plastic, metals, aluminium, aluminium alloy, iron, iron alloy, steel, steel alloy, magnesium, magnesium alloy, titanium, titanium alloy, zinc, zinc alloy, fibre reinforced composite, carbon fibre, graphite fibre, glass fibre, natural fibre, plant fibre, plastic fibre, paper, cardboard, rubber, epoxy OR nylon.

The linkage-sets or compliant mechanism(s) may be 3-D printed. In this way, it may be possible to realise forms which are not possible to realise with more traditional forms of manufacturing. Advantageously, the linkage-sets or compliant mechanism may be printed on-demand or at a 3-D printing facility that is near to the location where the part is required, thereby minimising logistical costs in getting parts to where they are required. It will be appreciated that 3-D printing referred to herein could be more generally referred to as additive manufacturing, involving layer on layer of addition of material.

The linkage-sets or compliant mechanism(s) may be substantially topologically optimised. In this way, the linkage-set or compliant mechanism may be optimised to reduce the total amount of material used. Alternatively the linkage-set or compliant mechanism may be optimised to remain within certain stress limits to ensure that the linkage-set or compliant mechanism operates below fatigue limit within the operating temperature range.

It will be appreciated that one set of wheels may be fixed relative to the skeleton or body of the load handling device, while the other set of wheels may be raised and lowered with respect of the body of the load handling device. Alternatively, it will be appreciated that neither set of wheels may be fixed relative to the body of the load handling device and the first and second sets of wheels are arranged to move in unison in opposed vertical direction relative to the body of the load handling device. Accordingly, it will be appreciated that the direction change mechanism may be attached or connected to both the first set of wheels and the second set or wheels, or the direction-change mechanism may be attached to only one set of wheels.

According to another embodiment of the invention there is provided a method of changing the direction of travel of a load handling device, the method comprising the steps of: applying a force in a first direction $F_1$ to the traveller of the direction-change assembly, causing the linkage-set or compliant mechanism to move to the x-direction stable configuration, or applying a force in a second direction $F_2$ to the traveller of the direction-change assembly, causing the linkage-set or compliant mechanism to move to the y-direction stable configuration, or removing a force applied to the traveller of the direction-change assembly, causing the linkage-set or compliant mechanism to move to a neutral configuration or an at rest configuration having no elastically stored energy.

Thus, the compliant mechanism may be moved between configurations of stable states.

A method may further comprise the steps of: receiving a signal from a centralised control facility; controlling the direction-change assembly based on the received signal to: (a) engage the first set of wheels with the tracks; (b) engage the second set of wheels with the tracks; or (c) engage first and second sets of wheels with the tracks to park the load handling device; and OPTIONALLY when the first or second sets of wheels are engaged with the tracks, driving the set of wheels in forward or reverse directions to manoeuver the load handling device to a position on the grid as determined by the centralised control facility.

Thus, the direction-change assembly may be controlled by a centralised control facility and used to engage a set of wheels as determined by the centralised control facility. Once a (single) set of wheels are engaged the centralised control facility can drive the wheels to manoeuver the load handling device. Or the load handling device may be "parked" by engaging both sets of wheels at the same time.

The load handling device may further comprise means for sensing position on the grid. The load handling device may further comprise means for lifting storage containers. The load handling device may further comprise means for transporting lifted storage containers to a position on the grid. The load handling device may further comprise means for identifying storage containers. The load handling device may further comprise means for identifying a storage container. The load handling device may be movable autonomously, without continual direction from the centralised control utility. The load handling device may be remotely manoeuvrable under the control of a storage system. The load handling device may further comprise means for communicating a signal to a centralised control utility and may be movable under control of the centralised control utility. The load handling device may further comprise means for powering the direction change assembly. The load handling device may further comprise a drive assembly. The load handling device may have belt driven wheels. The load handling device may further comprise identification means.

A method is provided for changing the engagement of sets of wheels of a load handling device with a track, where the load handling device operates on a grid framework (14) structure comprising tracks. The method comprising the steps of: applying a force in a first direction $F_1$ to the traveller of a direction-change assembly, causing the linkage-set or compliant mechanism to move to an x-direction stable configuration, OR applying a force in a second direction $F_2$ to the traveller of the direction-change assembly, causing the linkage-set or compliant mechanism to move to a y-direction stable configuration, OR removing a force applied to the traveller of the direction-change assembly, causing the linkage-set or compliant mechanism to move to a neutral configuration.

The method may further comprise the steps of: receiving a signal from a centralised control facility; controlling the direction-change assembly based on the received signal to: (a) engage the first set of wheels with the first set of parallel tracks; (b) engage the second set of wheels with the second set of parallel tracks; OR (c) engage first and second sets of wheels with the first and second sets of parallel tracks to park the load handling device.

Wherein when the first or second sets of wheels are engaged with the tracks the method may further comprise the steps of: driving the set of wheels in forward or reverse directions to manoeuvre the load handling device to a position on the grid as determined by the centralised control facility.

A kit of parts for modular assembly of a load handling device is provided. The kit comprises: at least one direction-change assembly linkage-set or compliant mechanism.

The kit may further comprise: at least two direction-change assembly linkage-sets or compliant mechanisms and a transfer belt; at least one direction change motor; and or a linkage for connecting the direction change assembly to the first set of wheels and the second set of wheels.

At least one part of the kit may be 3-D printed.

The kit of parts may further comprising at least one of: a set of wheels, a drive assembly, a gripper assembly, a lifting assembly, a communications system, AND/OR a sensor means.

A grid-based storage and retrieval system is provided, the system comprising: a grid framework (14) structure comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, at least one load handling device operating on the grid framework structure; and a centralised control utility for controlling the at least one load handling device(s).

The at least one load handling device may further comprise a communication means; and the centralised control utility of the storage system comprises communication means for communicating with a communication means on the at least one load handling device.

The centralised control utility remotely monitors the condition of the at least one load handling device.

If a malfunction and or failure of the load handling device is detected, the load handling device may be instructed to move to a maintenance area or the edge of the grid using non-malfunctioning and non-failed means.

The centralised control utility may communicate with the at least one load handling device operating on the grid to instruct the load handling device to move to a specific location on the grid.

Further the load handling device may be instructed to lift a container from a stack and move the container to another location on the grid, AND OR further instruct the load handling device to lower a container into a stack position beneath the grid.

A load handling device is provided for lifting and moving storage containers (10) stacked in a grid framework (14) structure comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprises:

a body mounted on a first set of wheels (116) being arranged to engage with the first set of parallel tracks (22b) and a second set of wheels (118) being arranged to engage with the second set of parallel tracks (22a), wherein the first and second sets of wheels (116, 118) comprise wheels having spokes, the spokes connecting the rim to the hub, and wherein the wheel is at least partially resiliently deformable.

The rim and wheel hub may be made from a rigid material relative to the spoke material. The wheel spokes may be arranged in a network. A portion of the wheel spoke network may be compressible.

The wheel may comprise two or more layers, wherein a first-type layer having radial spokes may be layered with at least one second-type layer having curved spokes. Thus, the wheel may comprise a wheel assembly. The curved spokes may comprise a first set curved in a clockwise direction, and a second set curved in an anti-clockwise direction. The first-type layer may be sandwiched between two second-type layers.

Advantageously, the wheels are designed to be lightweight, provide some shock absorption, provide some suspension to the load handling device, and reduce tyre wear. A further advantage of this arrangement is that the outer layer may bend out of plane. This allows the wheel to tolerate, for example, misaligned sections of track and the width of the track is narrowed at the transition. Out of plane bending avows the wheel to squash and become momentarily narrower in a scenario like this, where a less deformable wheel would likely try to lift itself out of the track and derail.

The wheel may display a combination of characteristics where the characteristics of each of the layers contributes to the overall characteristics of the wheel. Each layer may be designed to optimise particular characteristics, and the layered or composite arrangement or wheel then displays all of the characteristics embodied by the layers.

In this way, the wheel displays characteristics which advantageously provide specific directional stiffness and strength and yet are able to absorb some vibrations as they move over the tracks. In particular, the design of the spoke network may be to keep torsional stiffness within specific bounds and thereby avoid inaccuracies in movement of the load handling device.

In this way, the wheels are able to generate good traction with the track, and minimise wheel slip. This allows the load handling device to be more accurately positionally controlled on the grid as drive movements result in more consistent and predictable movement of the load handling device.

The rim of the second-type layer may comprise a groove for receiving an O-ring.

The O-ring provides the contact point between the wheel and the tracks. Thus, the second-type layer may have an O-ring that provides the track-wheel interface. O-rings are typically made from rubber. This may provide a certain amount of suspension to the wheel. O-rings are readily available and may be easily replaced. It will be appreciated that any suitable material and arrangement may be used to provide a traction providing contact point between the wheel and the tracks. For example, a rubber strip may be attached to the rim.

The rim of the wheel may comprise additional grooves for receiving additional O-rings. For example, the wheel may comprise two, three or more grooves for receiving O-rings.

Having the option to provide the wheel with additional O-rings across the width or depth of the wheel provides the opportunity to increase the contact rubber between the wheel and the track. It will be appreciated that the wheel may necessarily require modifications in other respects in order to accommodate space for the additional space around the rim of the wheel that additional O-rings require. For example, it may be necessary to provide a different or modified drive arrangement.

Additional O-rings and the proportional additional contact area they would provide, advantageously provides a wheel that may be capable of providing sufficient grip under heavier load conditions. In this way, the wheel may be used with load handling devices carrying greater load. In turn this may increase the efficiency of a storage and retrieval system for example.

The first-type layer may be a pulley and may have a smaller diameter than the second-type layer thereby creating a channel into which a drive belt may be received. The rim of the first-type layer may comprise cog teeth for cooperating with a drive belt.

In this way, the first-type layer may be arranged not to contact or interface with the track and instead be part of the drive-train. While the first-type layer does not contact or interface with the track, and therefore does not support the load handling device, the first-type layer may provide the axle drive for the wheel and support the second-type layer. Thus, the first-type layer of an assembly may be part of the hub on to which the second-type layer is mounted for the track-wheel contact.

In this way, the first-type layer may be driven by a drive belt. The drive belt meshes with the first-type layer or pulley and may be used to drive the second-type layer or wheels of the load handling device to provide manoeuvrability. The arrangement of the drive belt in a groove or channel ensures that the drive belt remains in the correct position to mesh with the cog teeth. Having the wheel driven by a drive belt pulley may mean that there is more design freedom for the design of the wheel itself. The combined characteristics of each of the layers, together with the direct drive provided by the pulley/hub of the first-type layer may advantageously allow for the wheel to be driven with positional precision whilst also be resilient to step changes in the track, for example. In this way, the wheel may enable a load handling device to be driven to specific locations on a grid framework having a plurality of grid spaces.

The rim sides may be angled relative to the plane of the wheel.

The outer most surface of the wheel may be angled. In this way, the wheels are less likely to be derailed as it moves along the track. The angle of the rim face or sides may direct the wheel back into position and in contact with the track, if the wheel bounces on a bump in the track, for example, at a transition between grid spaces.

The hub may comprise a bearing for rotatably mounting the wheel to an axle on the load handling device body.

The wheel may be made from plastic, polymer plastics, thermoset plastic, thermoplastic plastic, metals, aluminium, aluminium alloy, iron, iron alloy, steel, steel alloy, magnesium, magnesium alloy, titanium, titanium alloy, zinc, zinc alloy, fibre reinforced composite, carbon fibre, graphite fibre, glass fibre, natural fibre, plant fibre, plastic fibre, paper, cardboard, rubber, epoxy OR nylon.

In particular, the spoke material is polyurethane or nylon, the hub and rim material is nylon, and the O-ring is rubber.

The wheel may be 3-D printed. The wheel may be substantially topologically optimised. In this way, wheels may be designed for specific characteristics. In this way, wheels may be printed at or near the location they are required, and avoid a complicated supply chain.

A drive belt assembly for a load handling device is provided, the drive belt assembly comprising: a drive belt; a drive wheel; one or more driven wheels; a tensioning means comprising: a first tensioning arm having a fixed end above an elbow and a rotatable distal end pivotally attached at the elbow, wherein the first tensioning arm is horizontally displaceable relative to the drive wheel and driven wheels; and a second tensioning arm, wherein the drive belt is routed around the first and second tensioning arms and the first and second tensioning arms are arranged to put pressure on the drive belt to tension the drive belt.

A drive belt assembly, wherein the driven wheels may be movable in a vertical direction between raised and lowered configurations, relative to the drive wheel; and wherein the tensioning means may have respective configurations corresponding to driven wheels raised and lowered configurations, and the tensioning means is moveable therebetween.

A load handling device for operating on a grid framework storage structure is provided comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprising: a body mounted on a first set of wheels (116) being arranged to engage with the first set of parallel tracks (22b) and a second set of wheels being arranged to engage with the second set of parallel tracks (22a), wherein the first set of wheels (116) and the second set of wheels (118) are driven by respective drive belt, wherein the first set of wheels (116) and the second set of wheels (118) are driven wheels.

A load handling device, may comprise four drive belt assemblies arranged on each side of the load handing device for driving respective driven wheels.

A load handling device, may further comprise a direction-change assembly arranged to raise or lower the first set of wheels and or lower or raise the second set of wheels with respect to the drive wheel for engaging and disengaging the wheels with the parallel tracks, wherein the tensioning means of the drive belt assembly is arranged to pretension the drive belt as the driven wheels are move between raised, lowered and parked configurations.

In this way the drive belt assembly may be pretensioned by the tensioning means in order to ensure engagement between the drive belt, drive wheel and driven wheels. It will be appreciated that as the wheels move between lower and raised positions, without a tensioning means, the path length of the drive belt would change and has the potential to become slack and slip. The drive belt assembly, and more particularly the tensioning means is arranged to compensate for the change of length of the belt path so that the path length of the drive belt stays substantially the same and ensures that the belt is tensioned as needed to stay in contact with the drive wheel and driven wheels, as required for drive. When the driven wheels are in a raised position, the path length around the tensioning means increases the path length of the drive belt as the belt is routed over the elbow of the first tensioning arm to compensate for the decrease in vertical distance between the traveller mount and the wheels. Advantageously, the tensioning means substantially prevents the drive belt from becoming slack. Advantageously, the tensioning means may ensure that the drive belt is in tension before it is driven, thus, slippage of the belt over the driven pulley is avoided. Without pre-tensioning the drive belt may slip without engaging with the driven wheel and drive wheel, or become worn by improper engagement with the drive wheel.

It will be appreciated that the change in path length of the drive belt as the direction-change assembly operates may not be linear. The change of path length will depend on the geometry of the direction-change assembly.

Pre-tension is the amount of tension that is put into the drive belt by the tensioning means, before it is driven to make sure that the belt does not slip relative to the pulleys. During operation, when the belt is being driven, the drive belt is in higher tension to transmit force from the drive pulley to the driven wheels. The speed at which the belt moves is a function of the motor and load on the system.

It will be appreciated that the drive means may be a chain drive, in place of a drive belt. In some arrangements, the drive belt may be without teeth.

A drive belt assembly, wherein movement between configuration of the driven wheels and the tensioning means may be mechanically coordinated.

A drive belt assembly, may further comprise a direction-change assembly arranged to raise or lower the driven with respect to the drive wheel, wherein the tensioning means of the drive belt assembly is arranged to pretension the drive belt as the driven wheels are move between raised, lowered and parked configurations.

A drive belt assembly, wherein the tensioning means may be mechanically linked to the direction-change mechanism.

The tensioning means may be arranged to move with the driven wheels. In this way, the drive belt is always tensioned by the tensioning means, assuming the system is functional and dependent on wheel position.

A drive belt assembly, wherein movement of the driven wheels in the vertical direction and the movement of the tensioning means may be actuated by the same actuator.

A drive belt assembly, wherein the tensioning force may be applied to the drive belt varies according to position of the first tensioning arm and or the second tensioning arm.

A drive belt assembly, wherein the peak force required for direction change may be at a different time than peak force required for tensioning.

The direction-change motor for enabling vertical movement of the driven wheels, may also be used for moving the tensioning means. Advantageously, no additional motor(s) are required for the tensioning means.

It will be appreciated that the force required for actuating the direction-change mechanism and the force required for actuating the tensioning means varies over time as the action is taken. As a result of the geometry design of the tensioning means, the peak force required for the tensioning means may occur slightly ahead or behind of the peak force required for the direction-change assembly. In this way, the additional load put on the actuating motor by the tensioning means is managed to mainly occur outside the instantaneous time that high load is put on the actuating motor by the direction-change assembly and therefore, the size of motor required is not increased by the tensioning means.

It will be appreciated that the direction-change assembly may put tension on the drive belt, due to the change in vertical distance between the driven wheels and the drive wheel. In some cases, the distance between the wheel mount and the 'middle halo' or upper brace/traveller mount, may be temporarily longer than when the wheels are in a drive position. It will be understood that the belt will need to be stretched over this 'bump' and a larger motor would be required to make it over the 'bump'. It is possible that the belt could snap. It will be appreciated that the tensioning means may compensate for this by only applying tension to the belt after the 'bump'. Accordingly, it may be possible to avoid wear on the belt and avoid strain on the motor by following belt path which involves a complex and interacting direction-change and belt tensioning arrangement.

A drive belt assembly, may further comprise a sensing means for monitoring belt tension, and optionally may further comprise means for adjusting belt tension.

A drive belt assembly, may further comprise sensing means for determining malfunction or failure of the drive belt.

In this way, the condition of the drive belt and the tension of the drive belt may be monitored. If the belt becomes stretched slightly, then the path length of the drive belt may be increased by a similar amount by adjusting the belt adjustment means. This allows the "resting" tension and belt path or route to be adjusted without the need to replace or adjust the belt by removing it from the load handling device. Further, this allows for fine-tuning of the belt. Belt adjustment may be possible while the load handling device is operating on the storage system grid, between drive actions. Of course, if the belt stretches significantly then it may need to be replaced during maintenance of the load handling device in a maintenance area. Further, the sensing manes may also be able to detect when there is a failure of the drive belt or drive system. During operation, as a load handling device will typically have a drive belt assembly and tensioning means on each side. Thus, even if the belt on one side fails the load handling device may be sufficiently operable using other sets of driven wheels to return to the edge of the grid or a maintenance area to be repaired rather than becoming stranded on the grid and requiring at least partial grid shut down to be recovered.

A load handling device for lifting and moving storage containers (10) stacked in a grid framework (14) structure is provided. The load handling device comprises: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, the load handling device comprising: a body mounted on a first set of wheels (116) being arranged to engage with the first set of parallel tracks (22b) and a second set of wheels (118) being arranged to engage with the second set of parallel tracks (22a), and a gripper assembly for latching to a storage container (10), wherein the gripper assembly comprises a deformable flexure mechanism movable between a locked configuration and a release configuration.

The gripper assembly may be self-locking.

The load handling device may grip onto storage containers and lift storage containers. The gripper assembly is stable in at least two configurations, and is self-locking in at least the locked configuration. The gripper operates below the fatigue limit of the material and is repeatedly movable between positions. In this way, the load handling device is able to securely and reliably grip a storage container for lifting and moving the storage container.

The bi-stable flexure may comprise: an actuator; two or more gripper-arms having hook-ends; and a number of hinge arrangements, the number of hinge arrangements corresponding to the number of gripper arms, wherein each hinge arrangement is deformable and connects the respective gripper-arms to the actuator. The hinge arrangements comprise a fulcrum, and first and second deformable sections connect to respective ends of the fulcrum. The fulcrum is substantially triangular. In the locked configuration the fulcrum engages with the gripper-arm and the compliant mechanism is open or wide; and in the release configuration the first and second sections of the hinge are flexed and the compliant mechanism is closed or narrow.

The hook-ends of the gripper arms allow the gripper to latch on to a cooperating part of a storage container, and the fulcrum means that the flexure is not able to move past the stable locked position without failure of the gripper. Thus, the configuration of the gripper assembly itself ensures that the gripper is reliably securable to the storage container for the purpose of lifting and moving the storage container.

The hinge arrangements may be connected to the gripper-arms spaced apart from the hook-ends and the fulcrum may extend above the line between the first and second hinge arrangements, or the fulcrum extends below the line between the first and second hinge arrangements. The gripper assembly may comprise two or more flexure mechanisms. The gripper assembly may comprise four flexure mechanisms.

It will be appreciated that the specific arrangement will depend on the intended use of the gripper assembly, and the intended scope is not limited to the specific examples disclosed herein.

The load handling device may further comprise a means for lifting storage containers, wherein the means for lifting storage containers comprises a gripper plate and the gripper assembly is mounted on the gripper plate. The means for lifting storage containers may be releasably mountable on the skeleton or body of the load-handling device. Lifting tapes may be attached to the gripper-arms.

The flexure mechanism may be 3-D printed.

A method of using a gripper assembly of a load handling device is provided, wherein when the flexure is inserted into a cooperating recess of a container, and a lifting force is applied to the container by the gripper assembly, the flexure engages with the container and moves into the locked configuration.

When the compliant mechanism is in the locked configuration, and an actuating force is applied to the gripper assembly, the compliant mechanism may move from the locked configuration to the release configuration.

A kit of parts for modular assembly of a load handling is provided. The kit comprises: at least one gripper assembly flexure.

Other variations and advantages will become apparent from the following description.

The invention will now be described with reference to the accompanying diagrammatic drawings in which.

Figure 6:
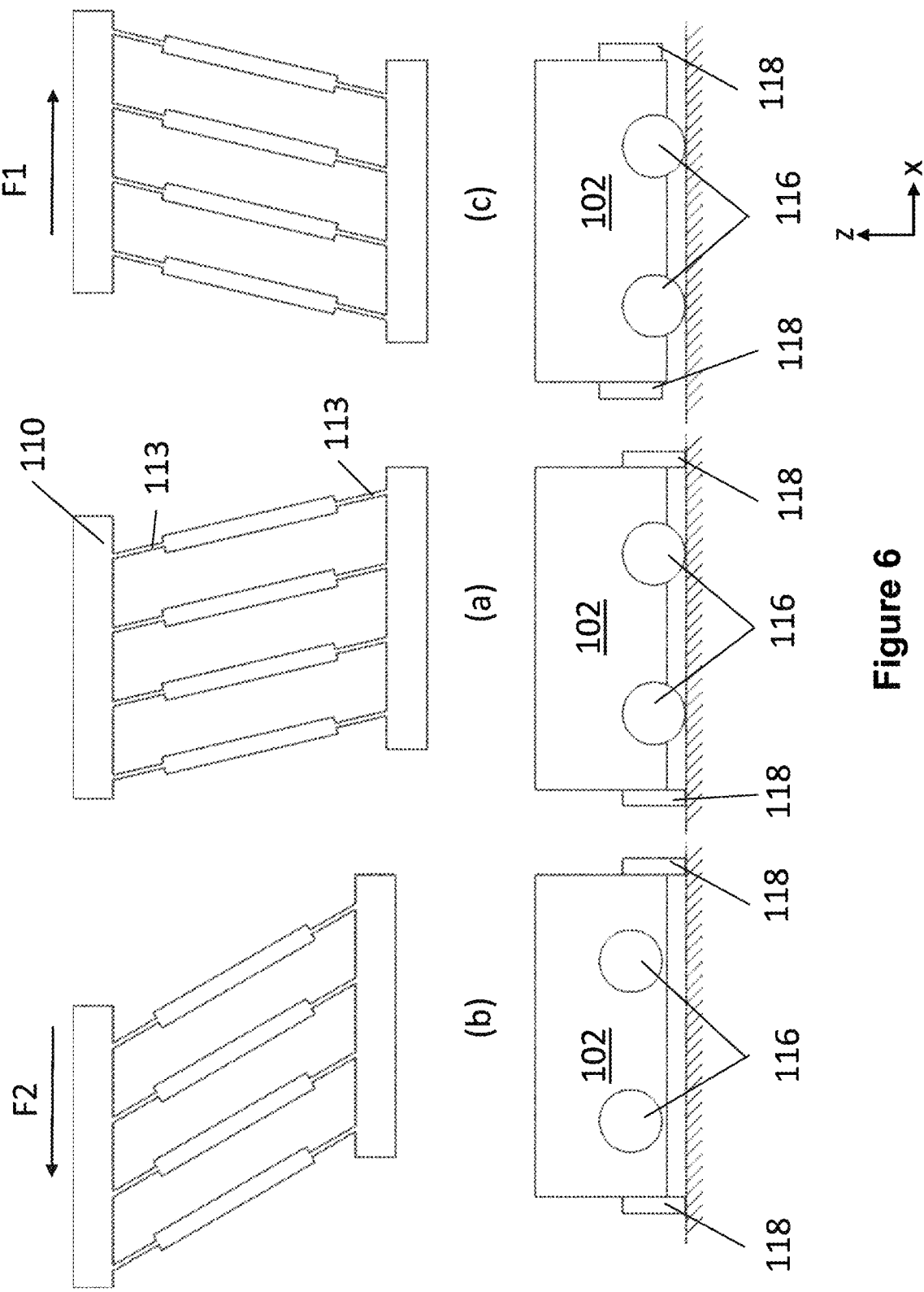
Figure 8:
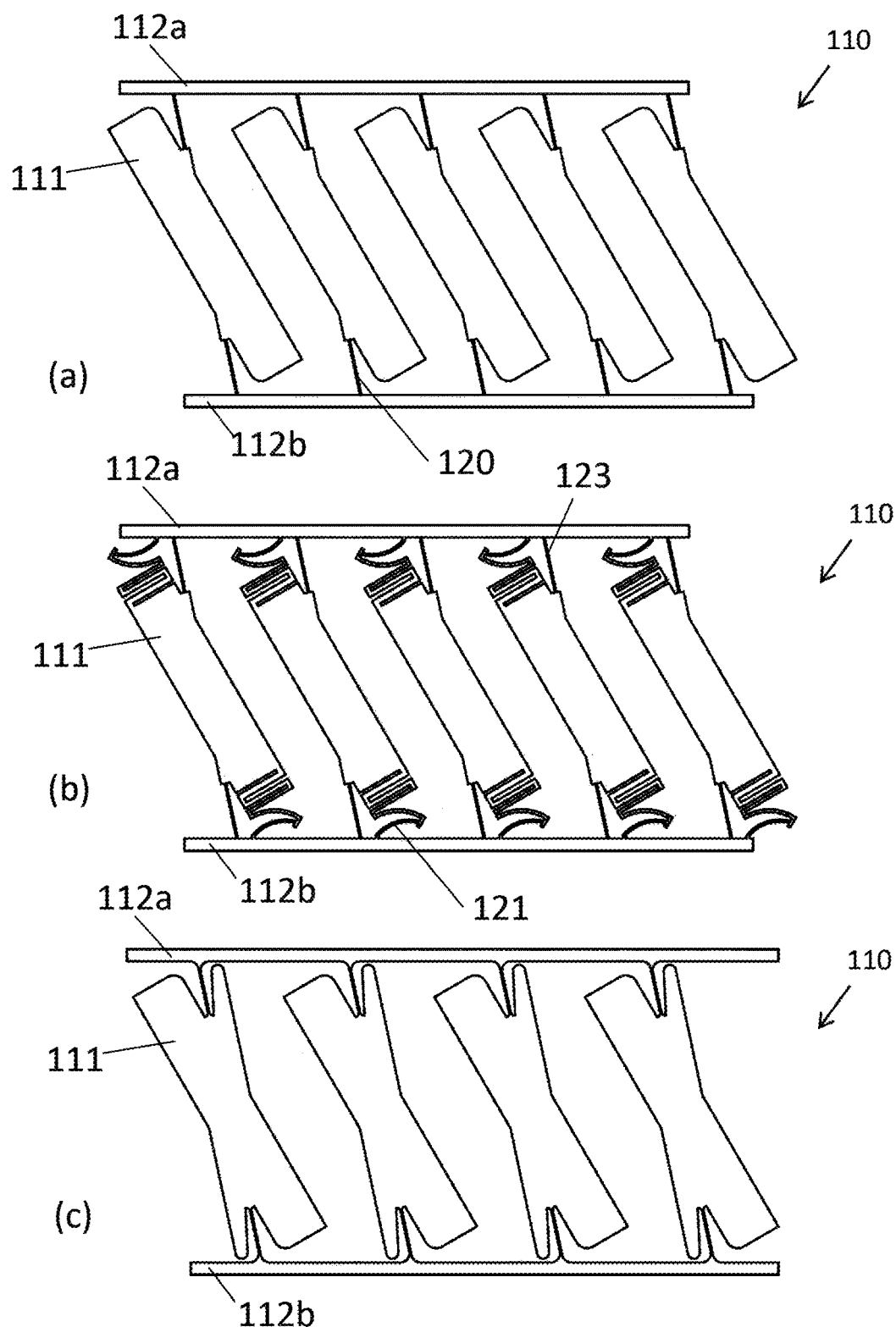
Figure 10:
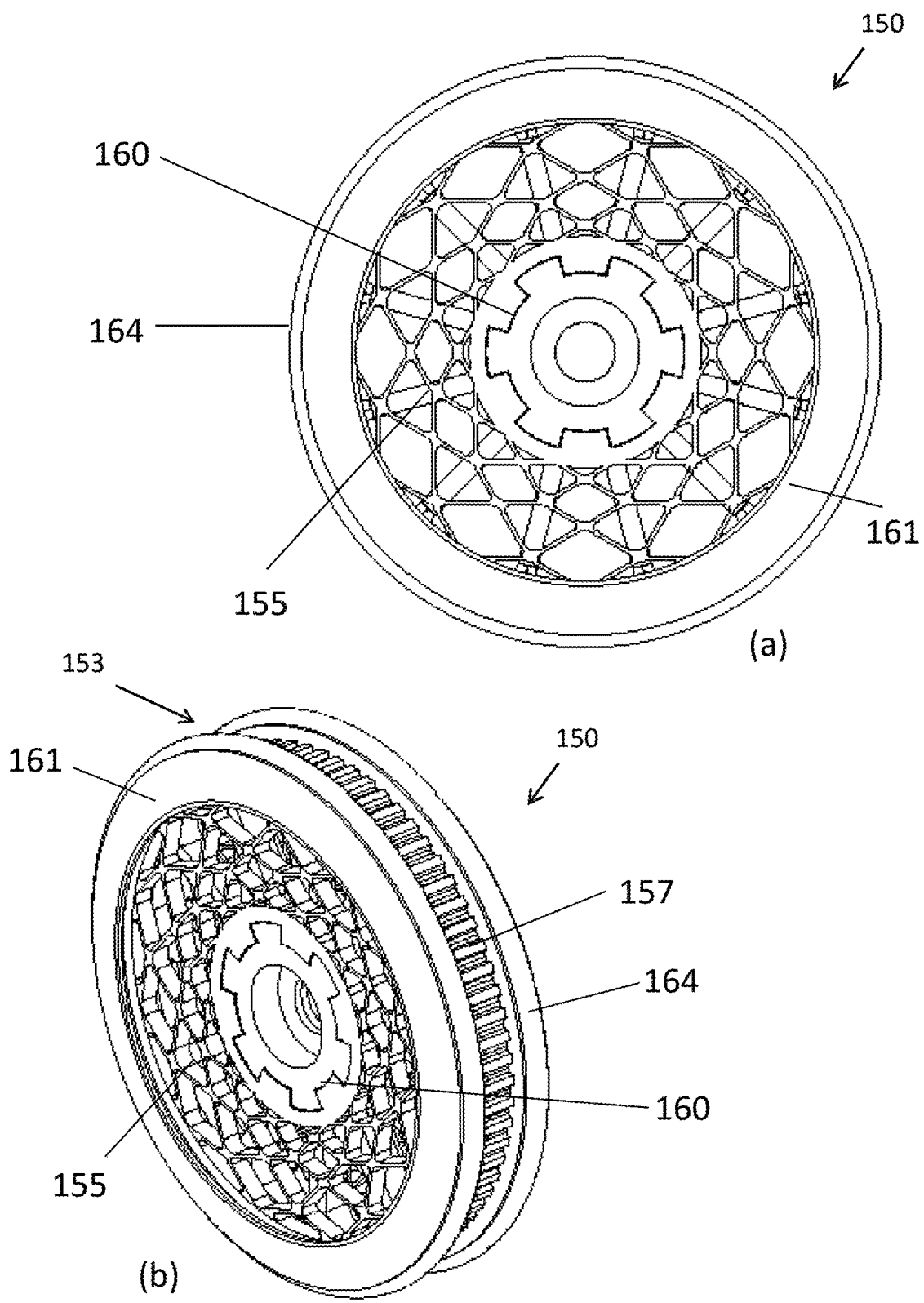
Figure 11:
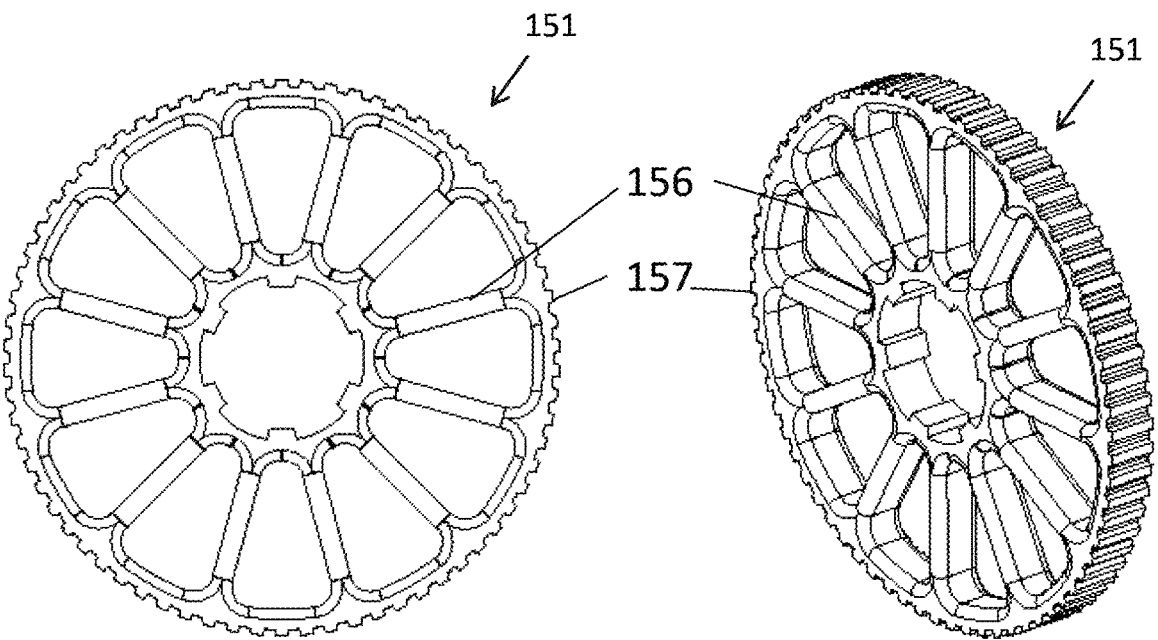
Figure 14:
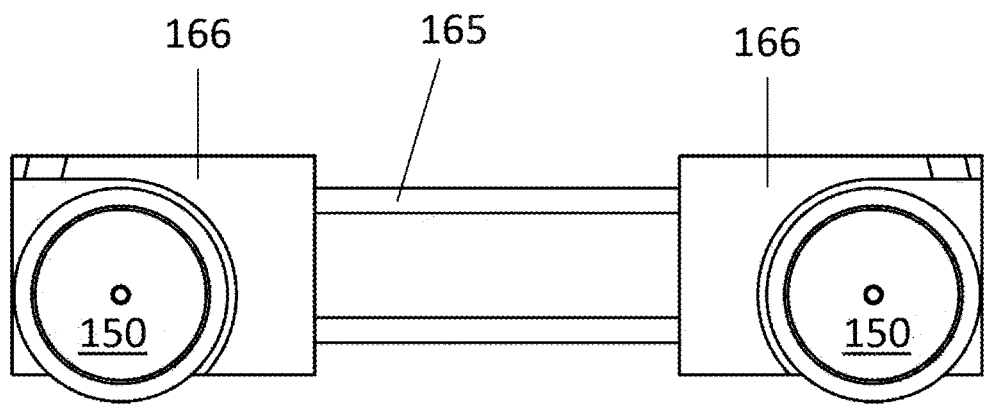
Figure 15:
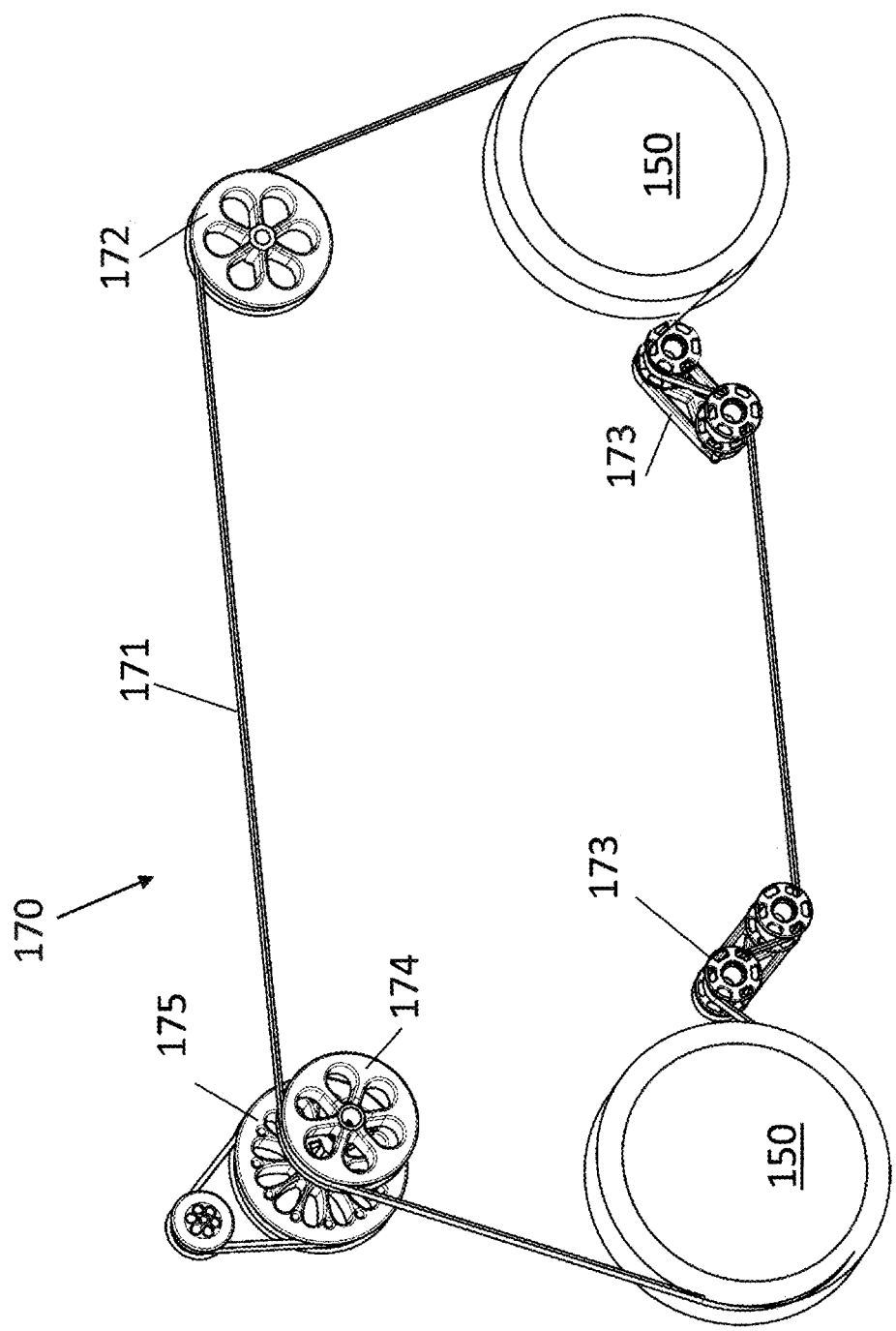
Figure 16:
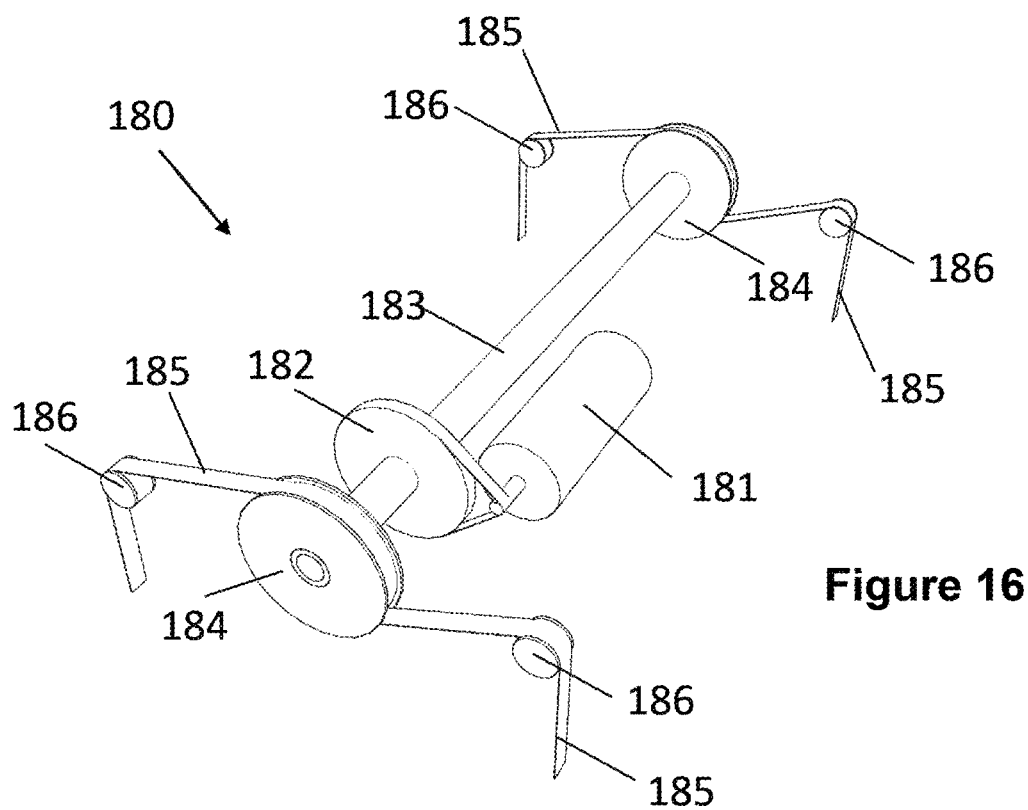
Figure 17:
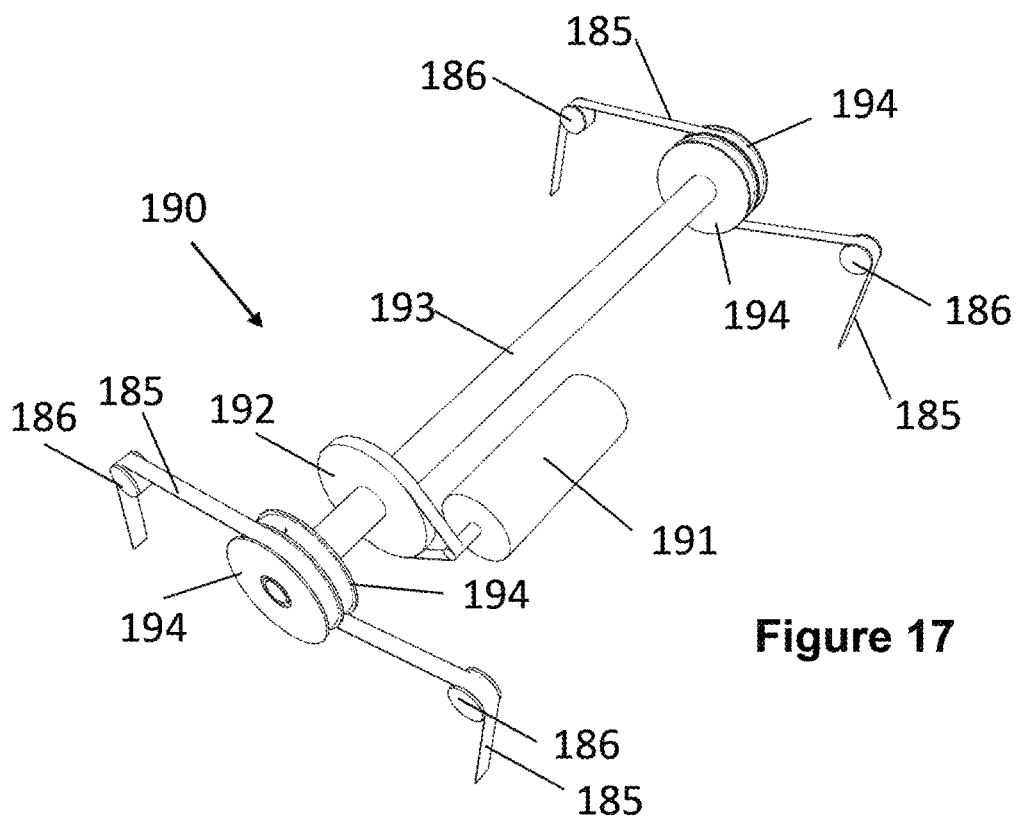
Figure 18A:
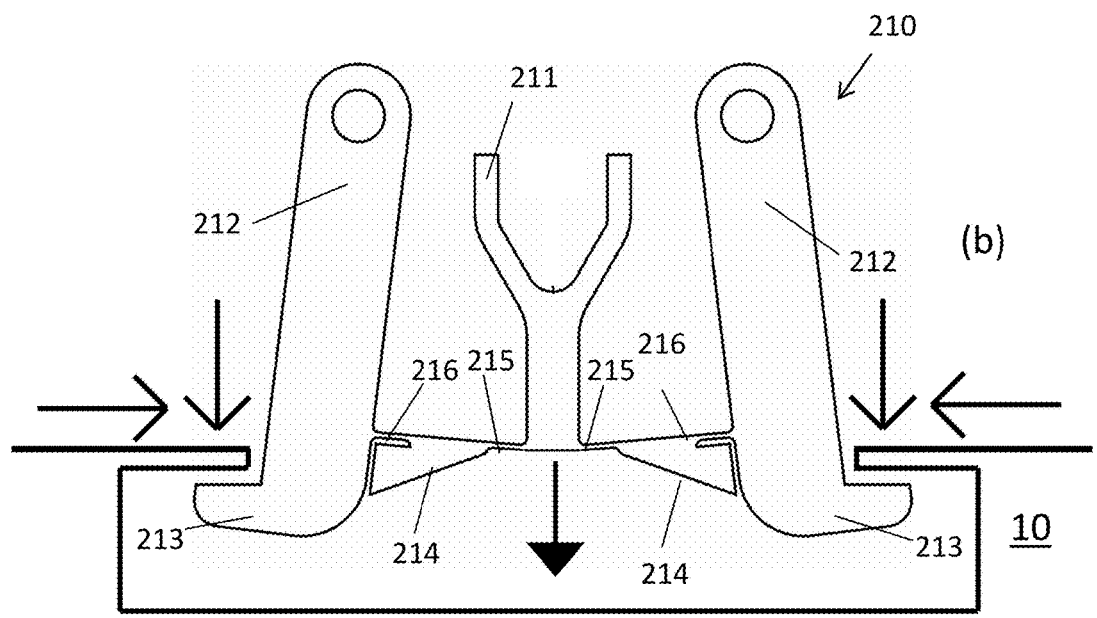
Figure 20:
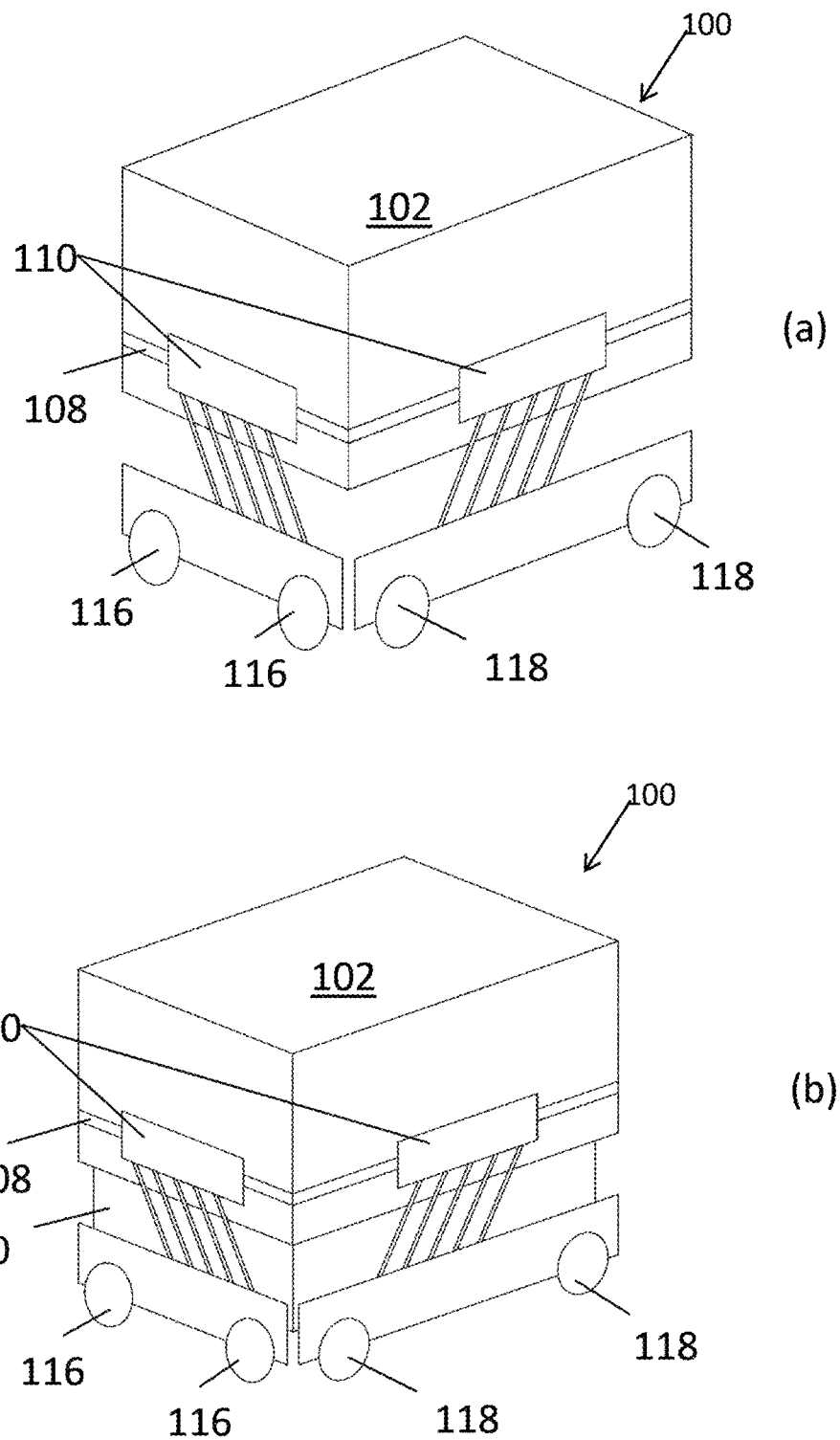
Figure 21:
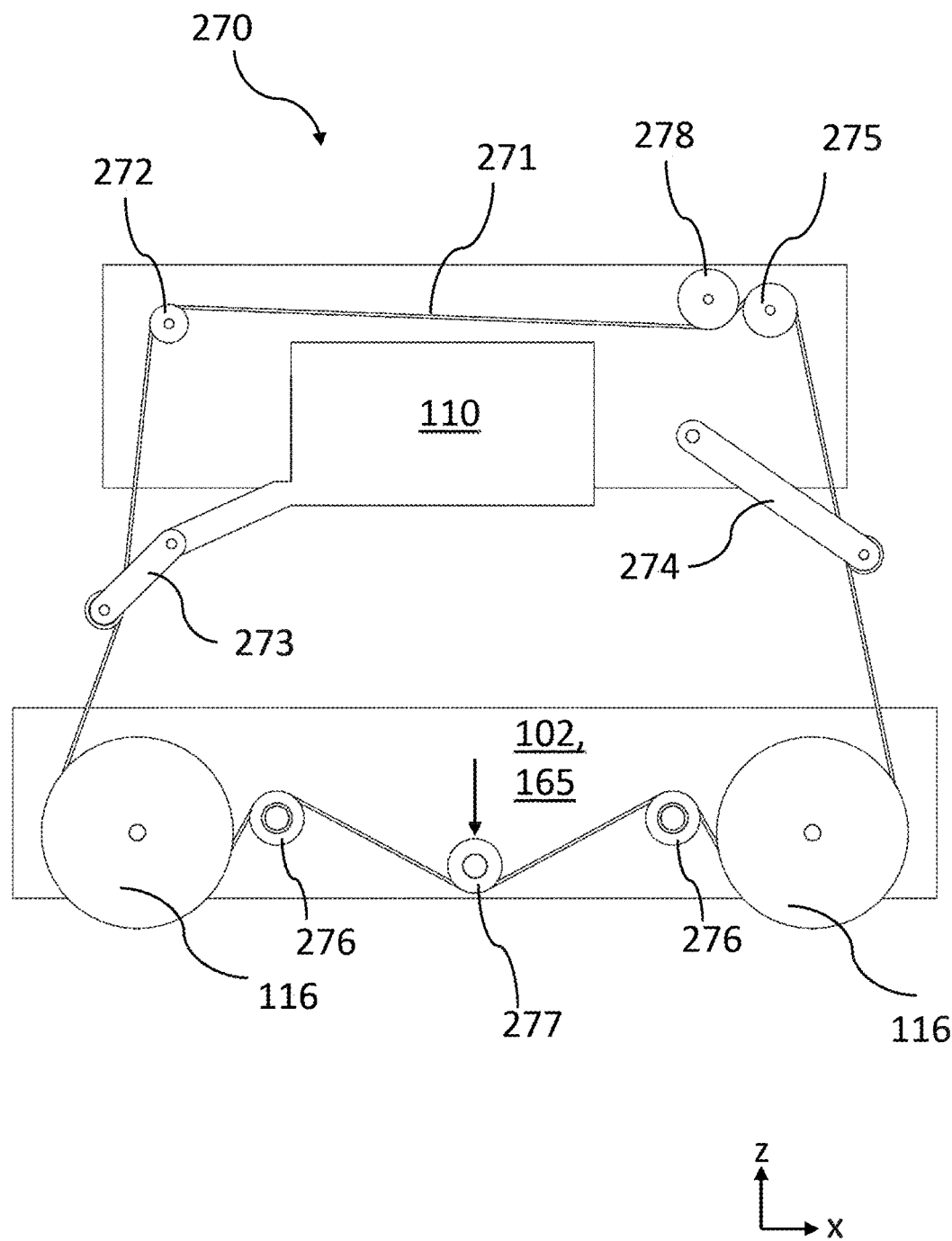
Figure 22:
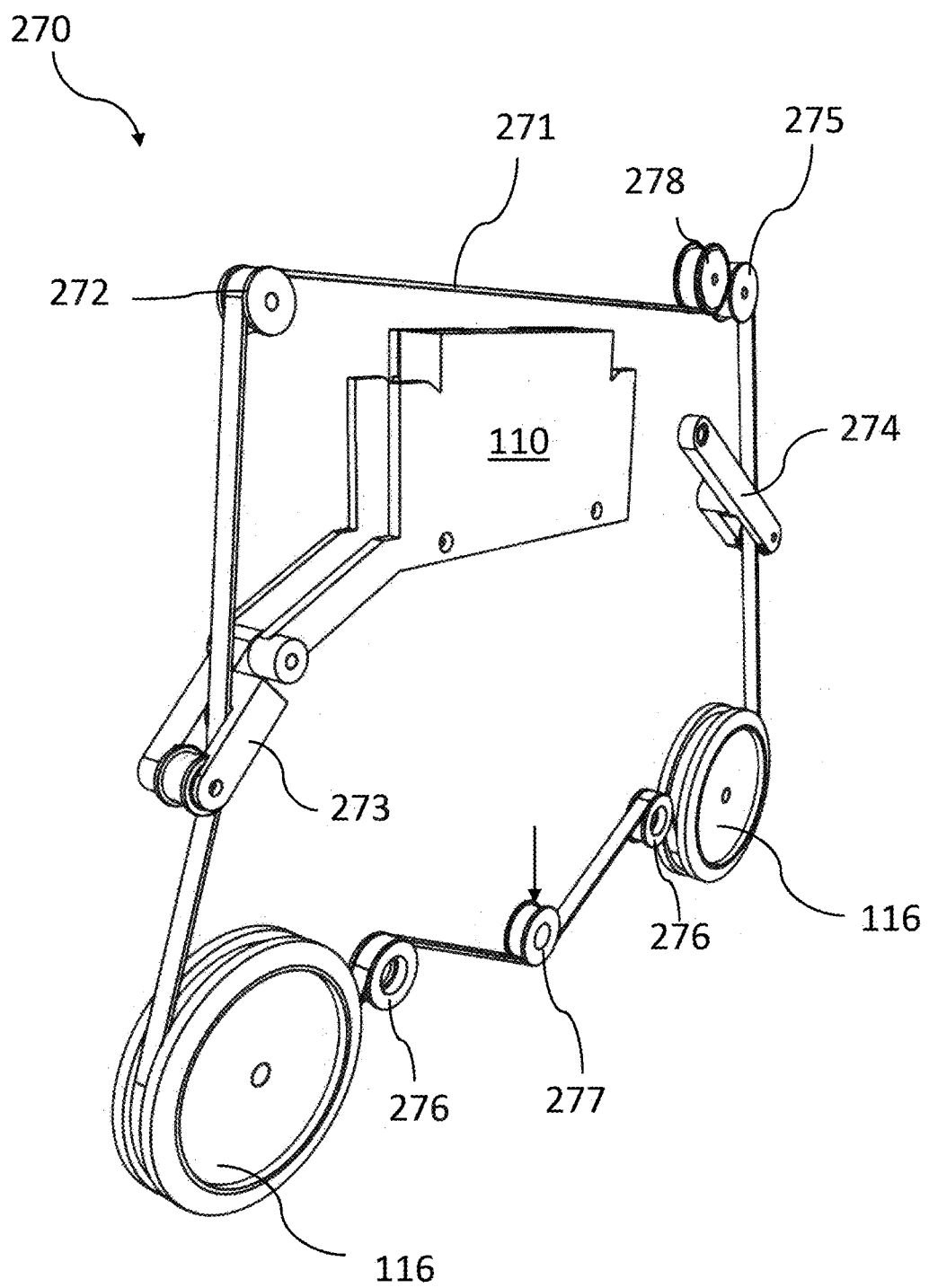
Figure 23:
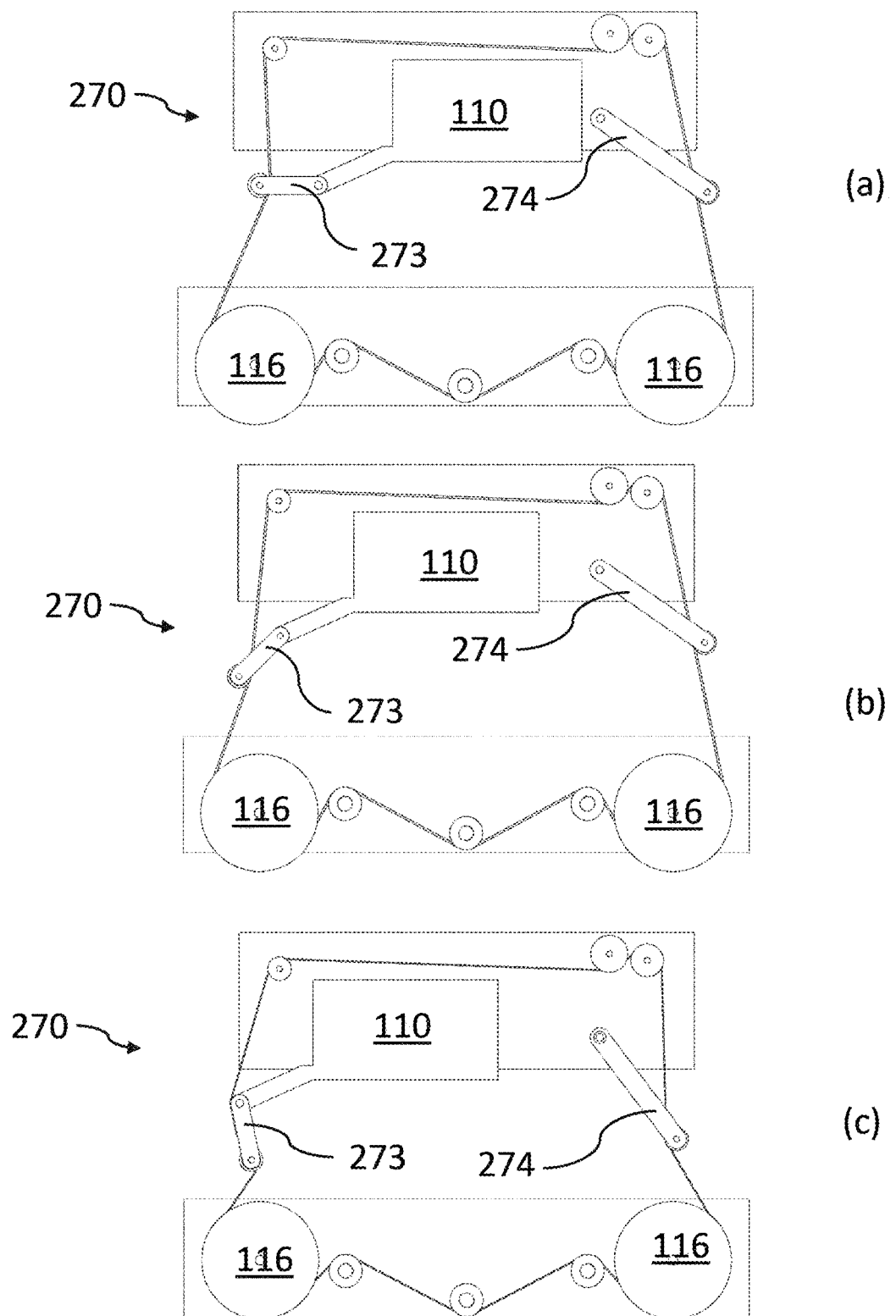
Figure 23:
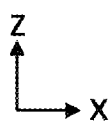
Figure 24:
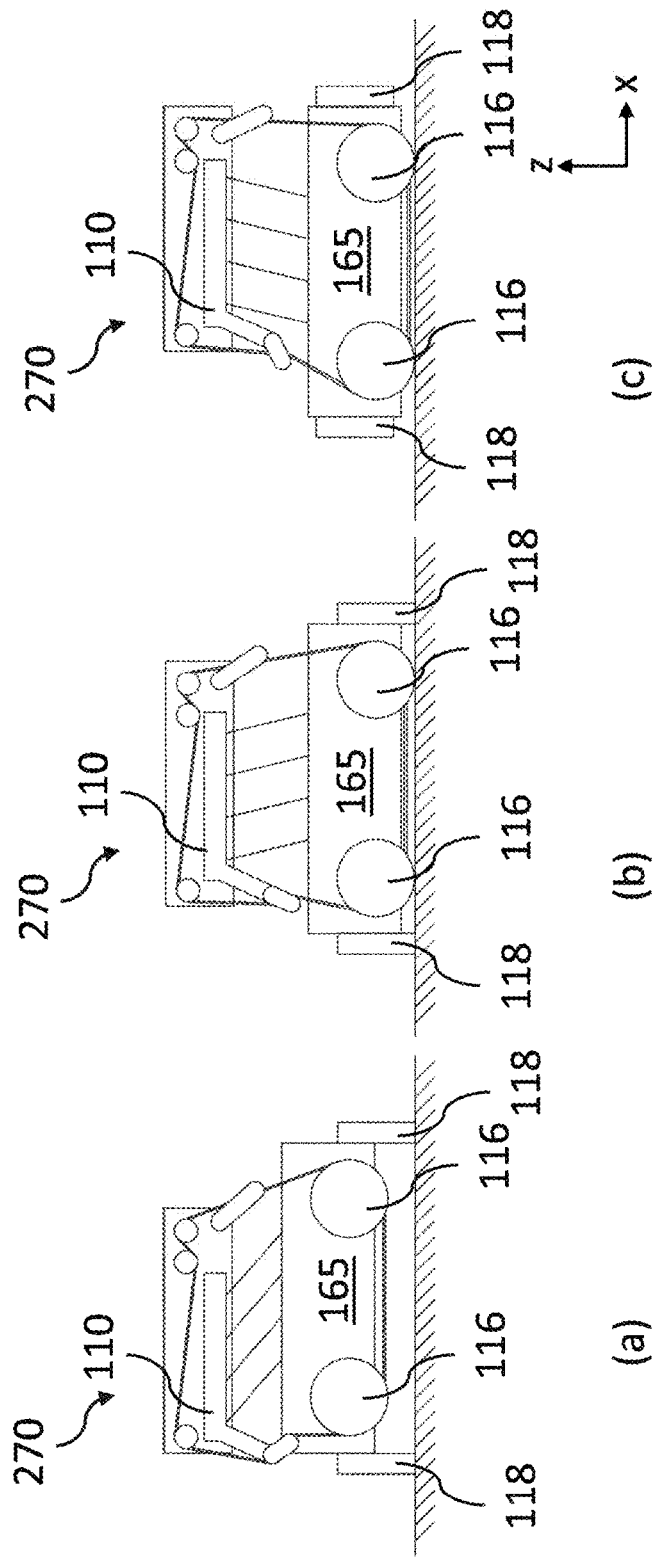
Figure 25:
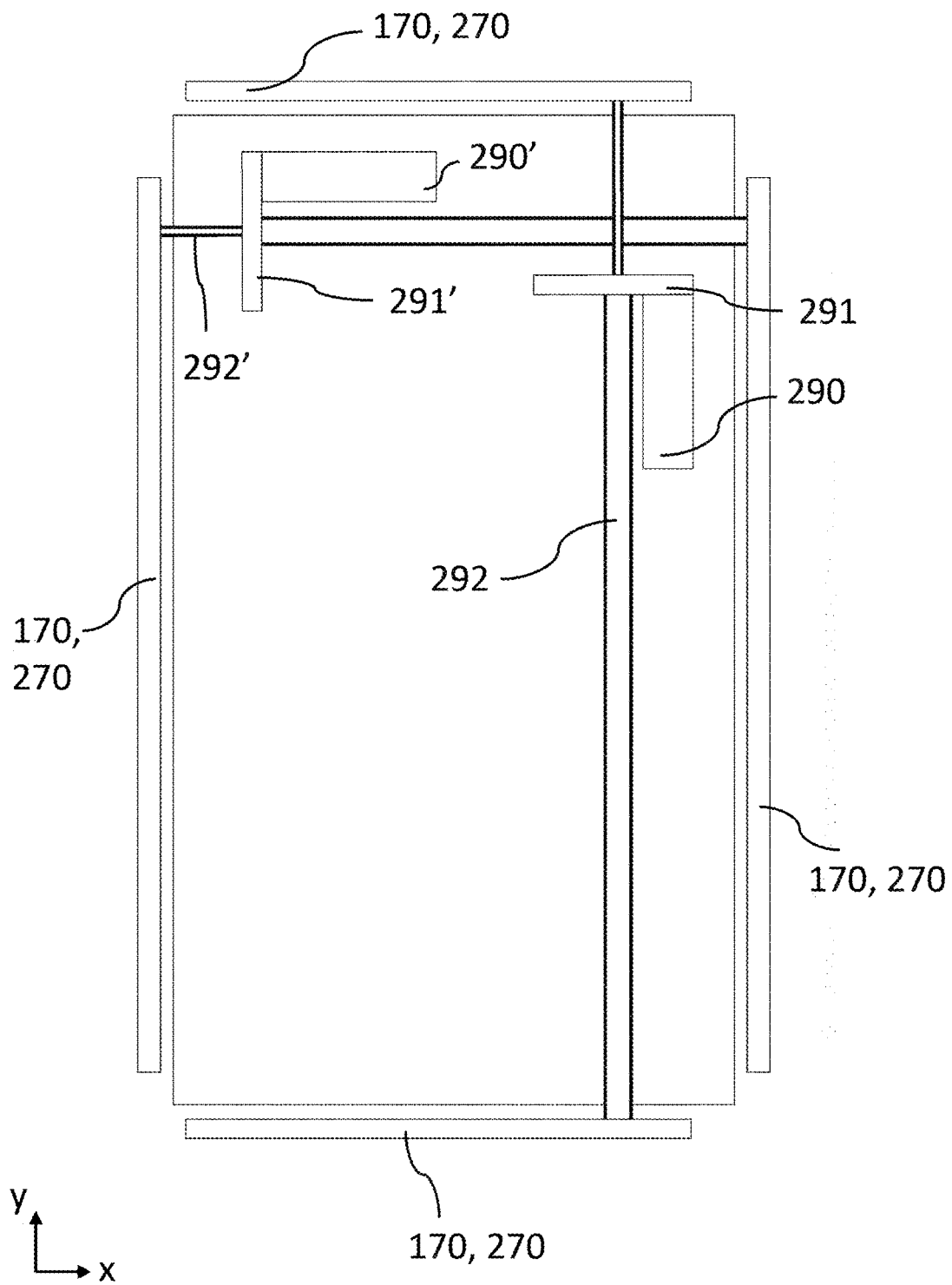
Figure 26:
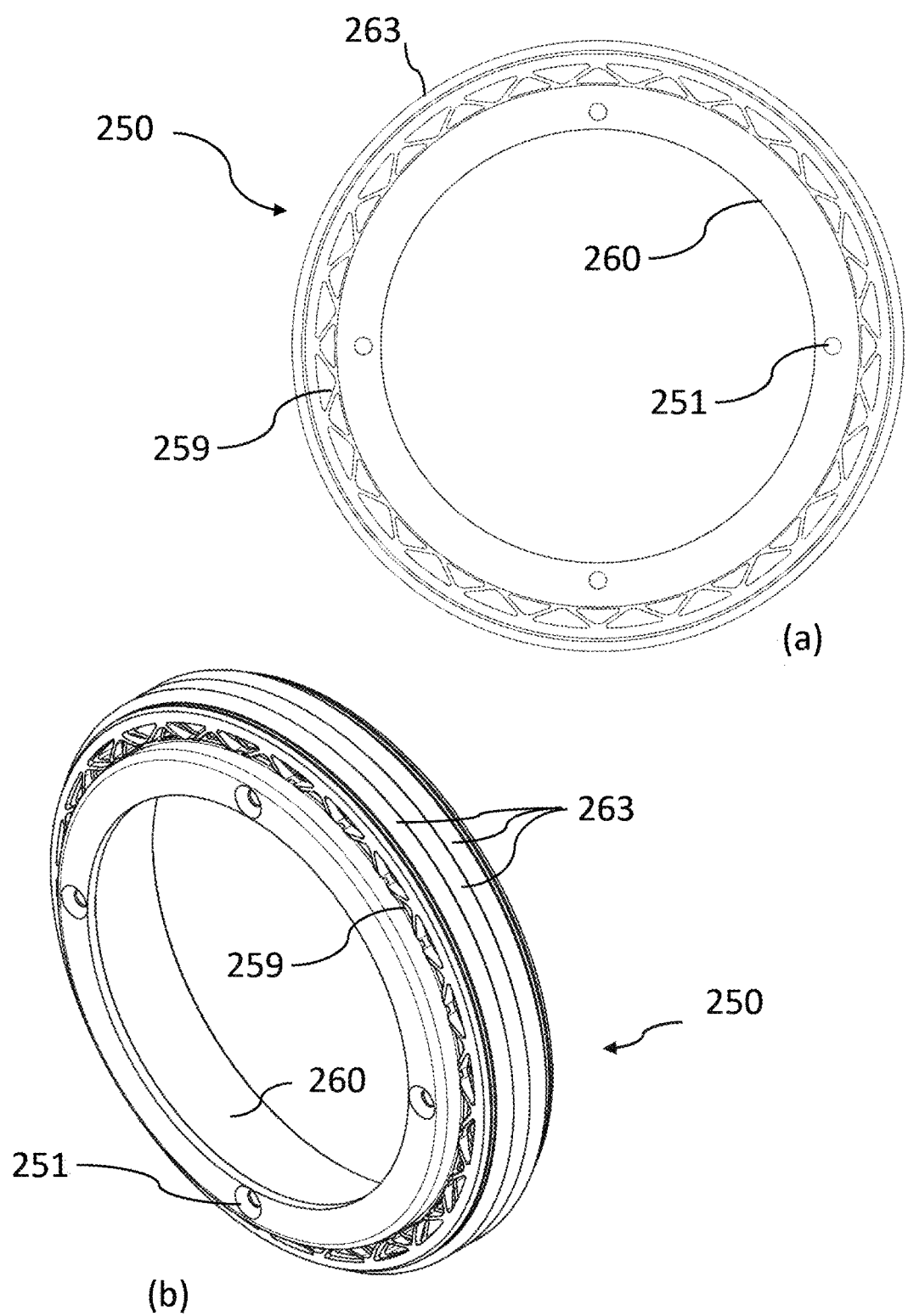
Figure 26C:
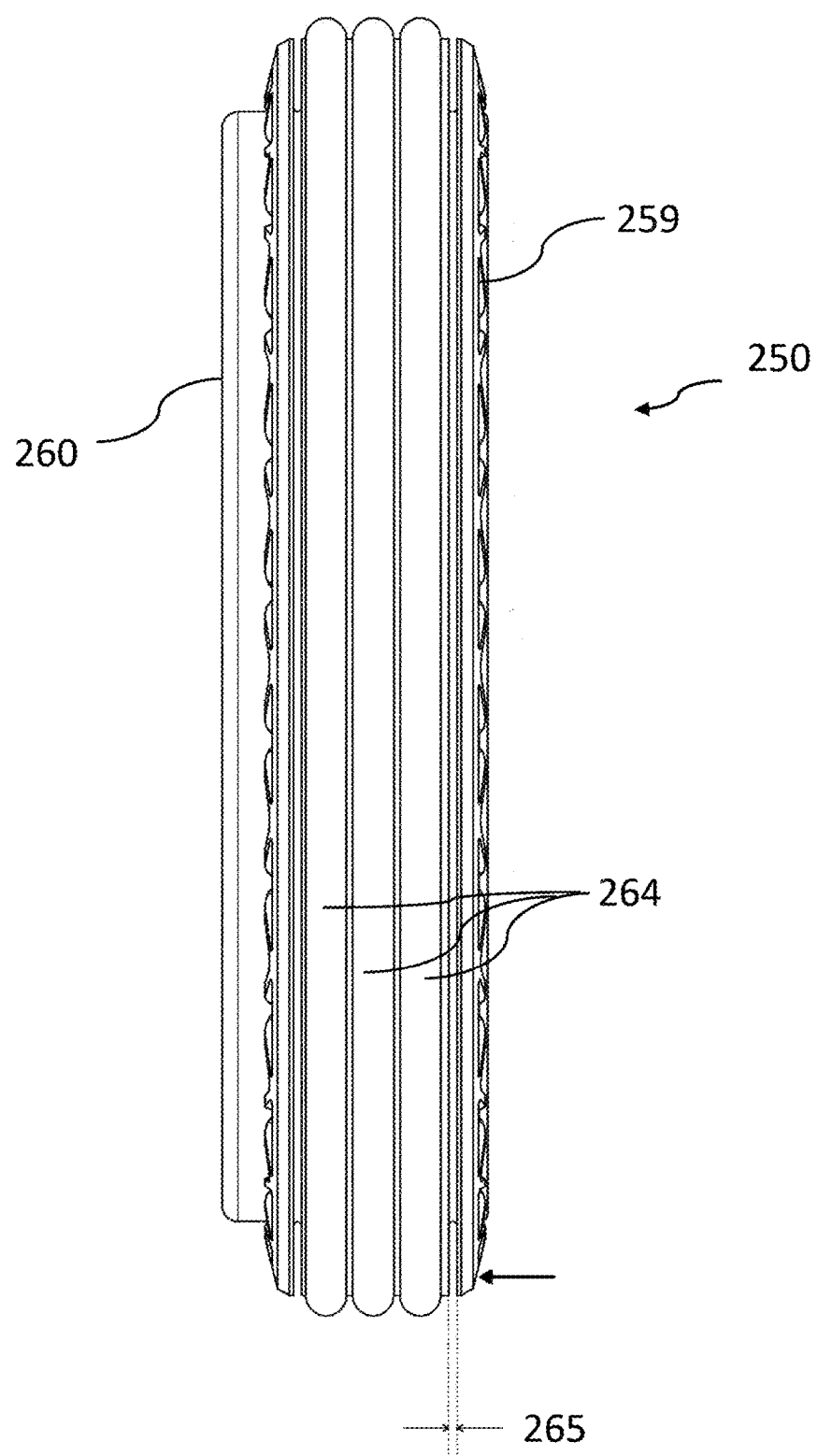
Figure 28:
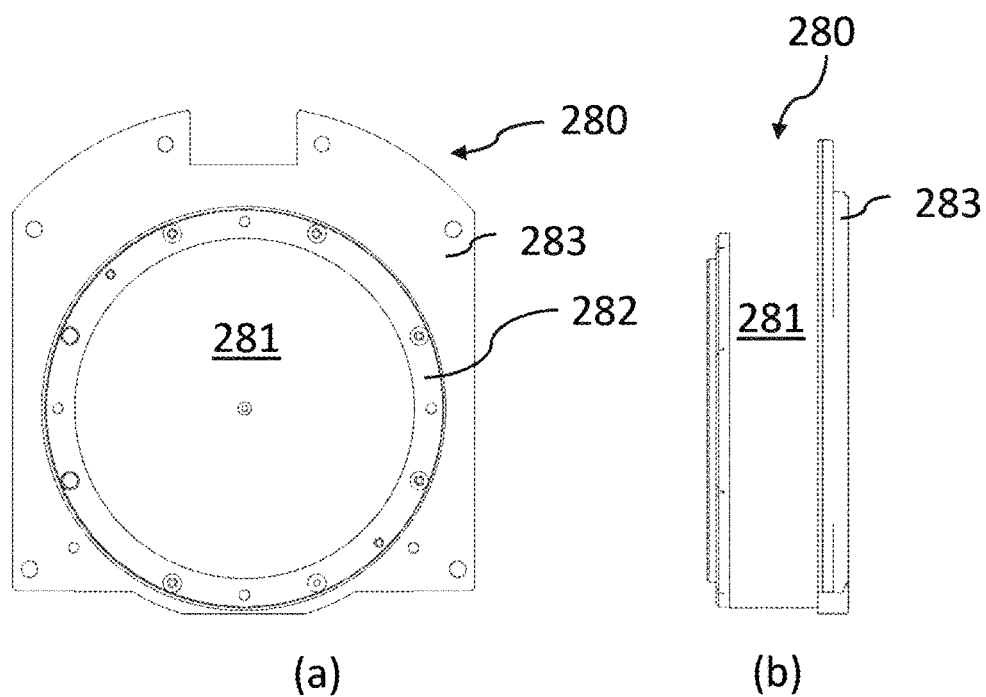
Figure 30:
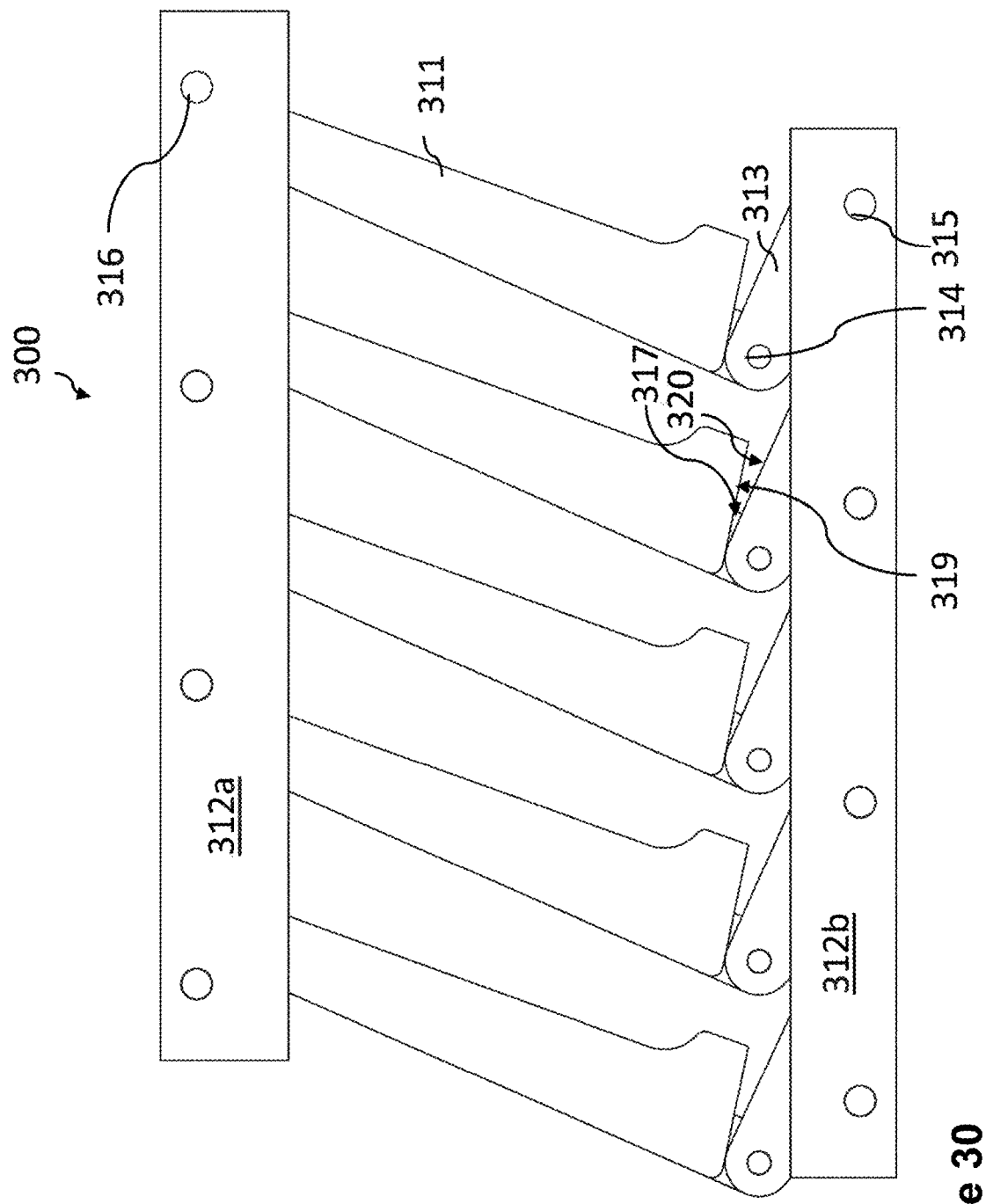
Figure 31:
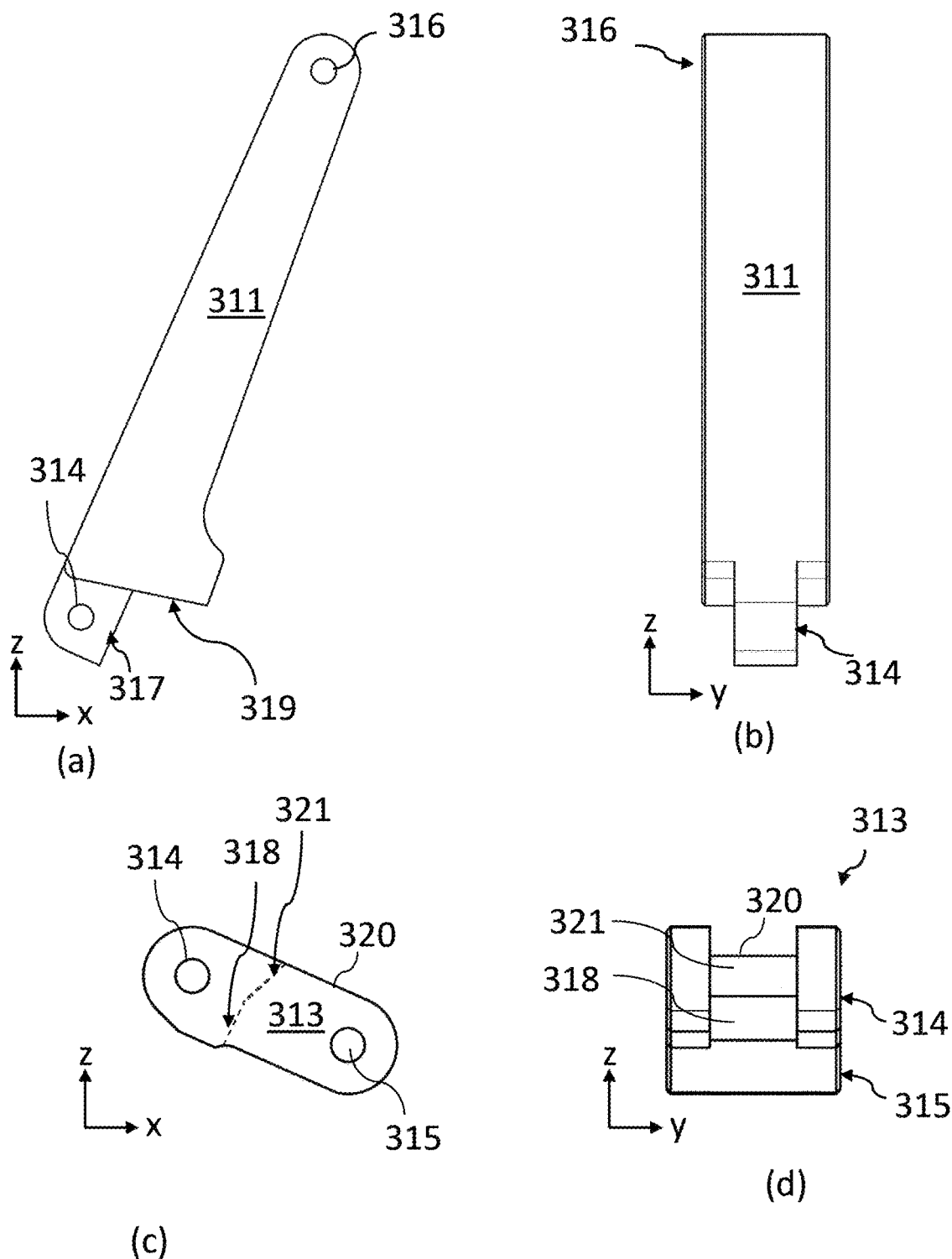
Figure 32:
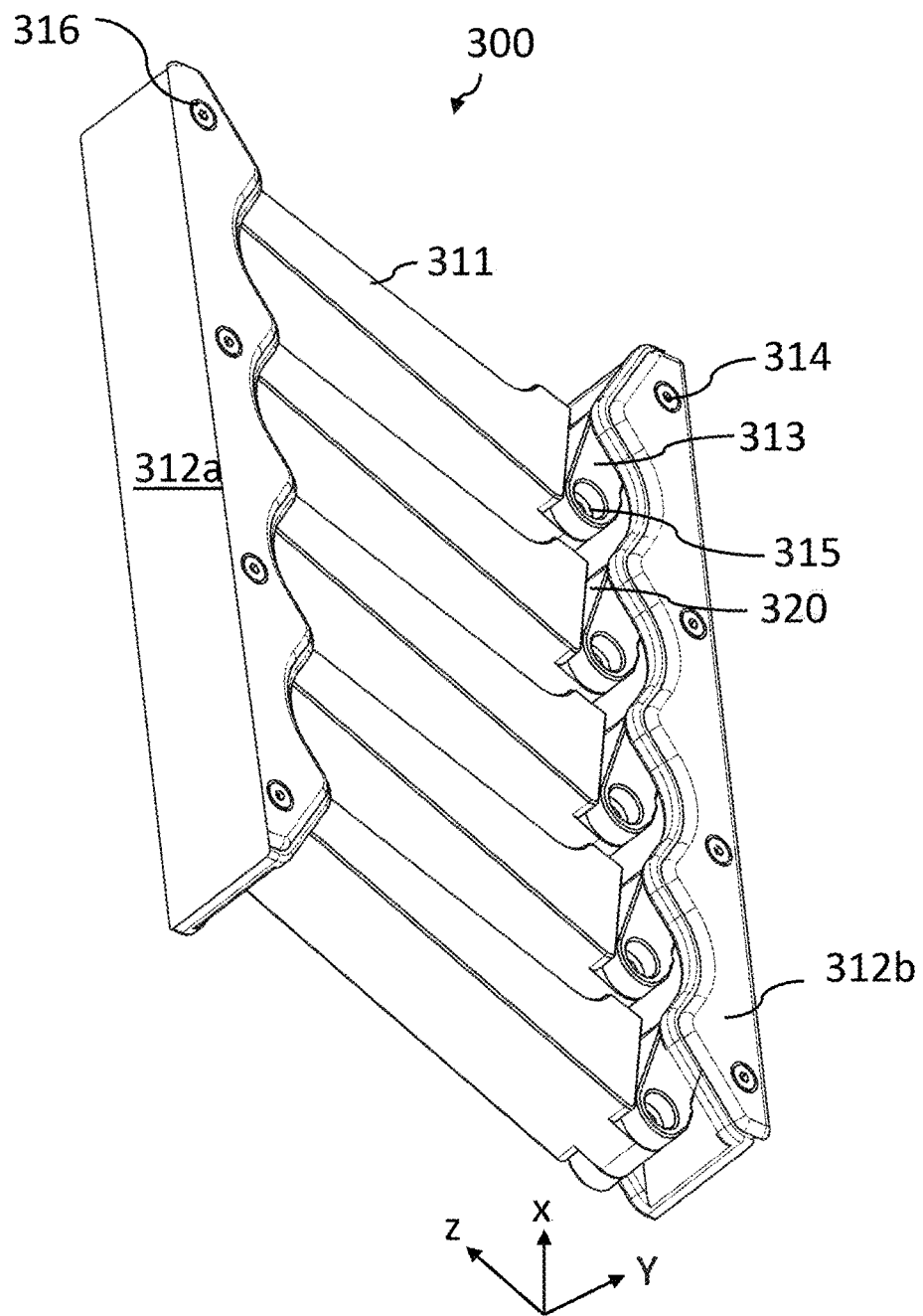
Figure 33A:
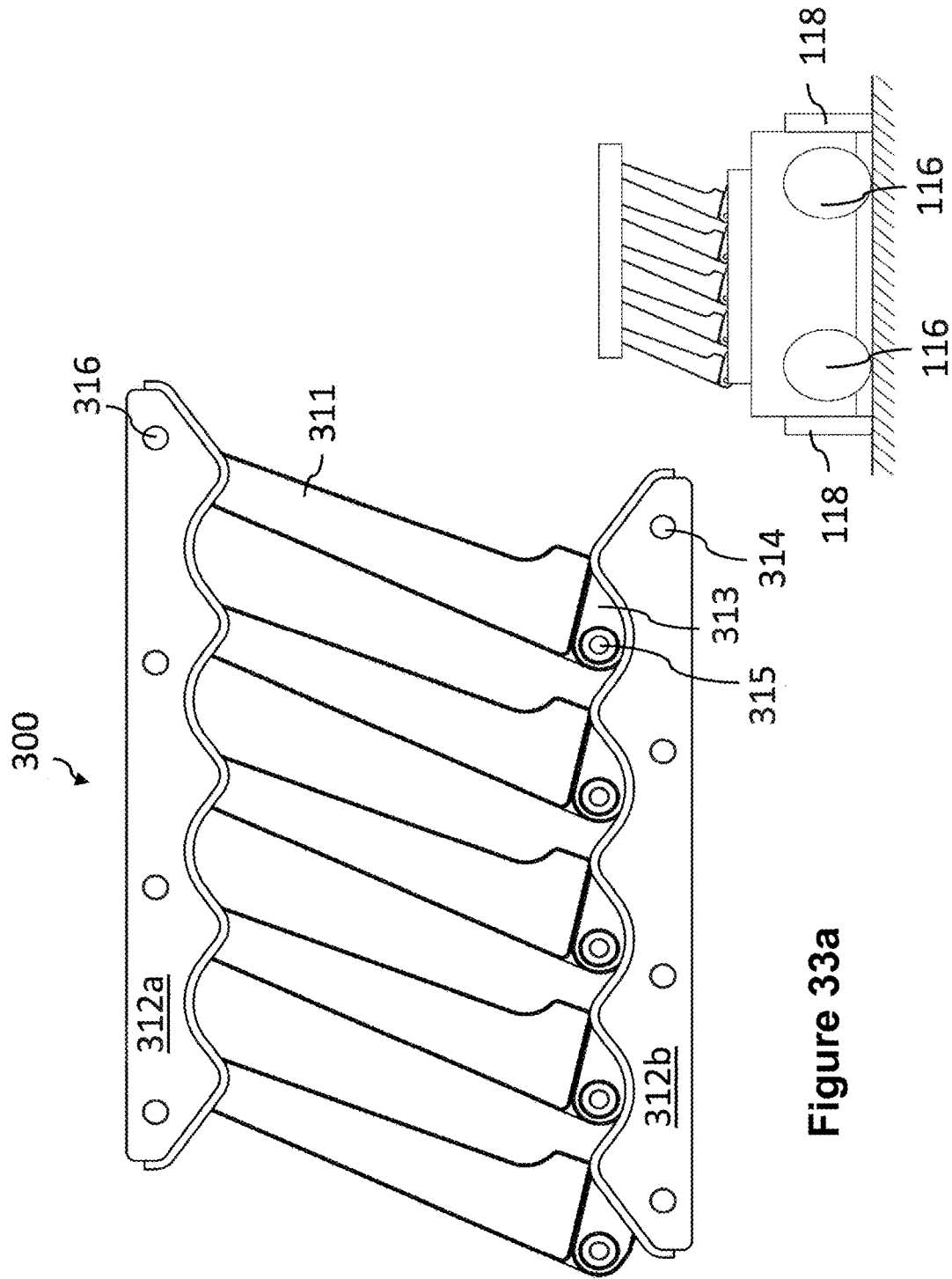
Figure 33B:
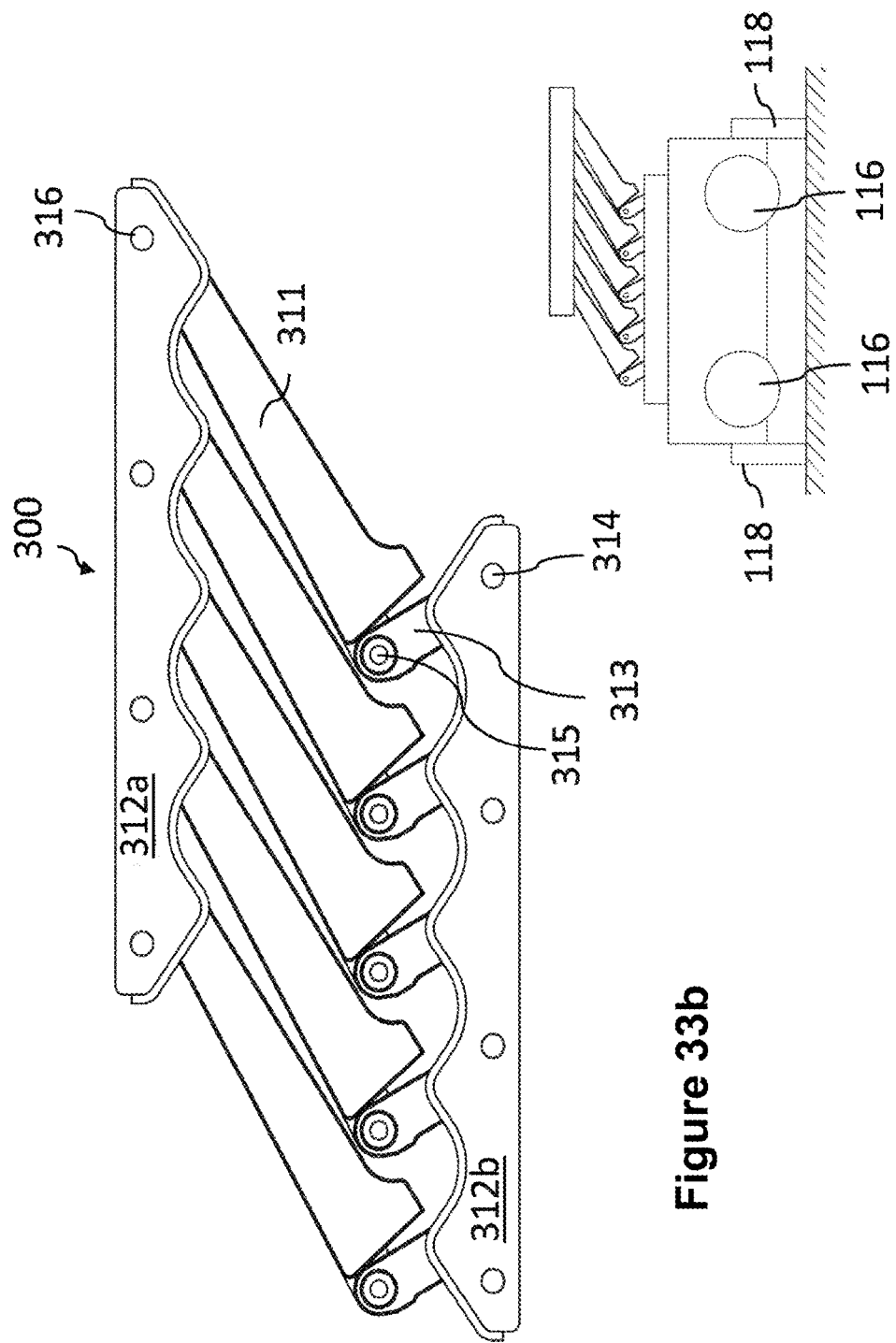
Figure 33C:
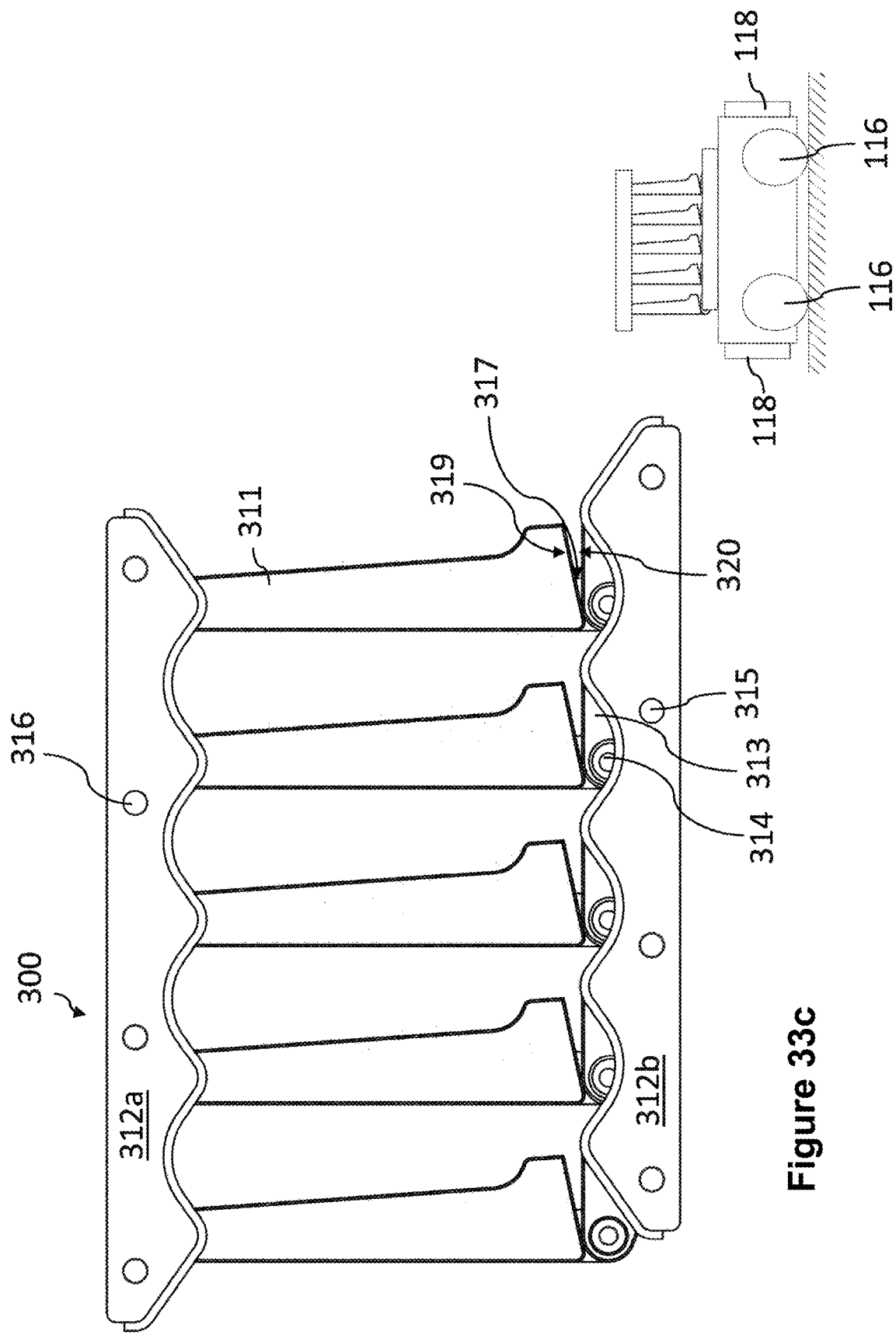
Figure 34:
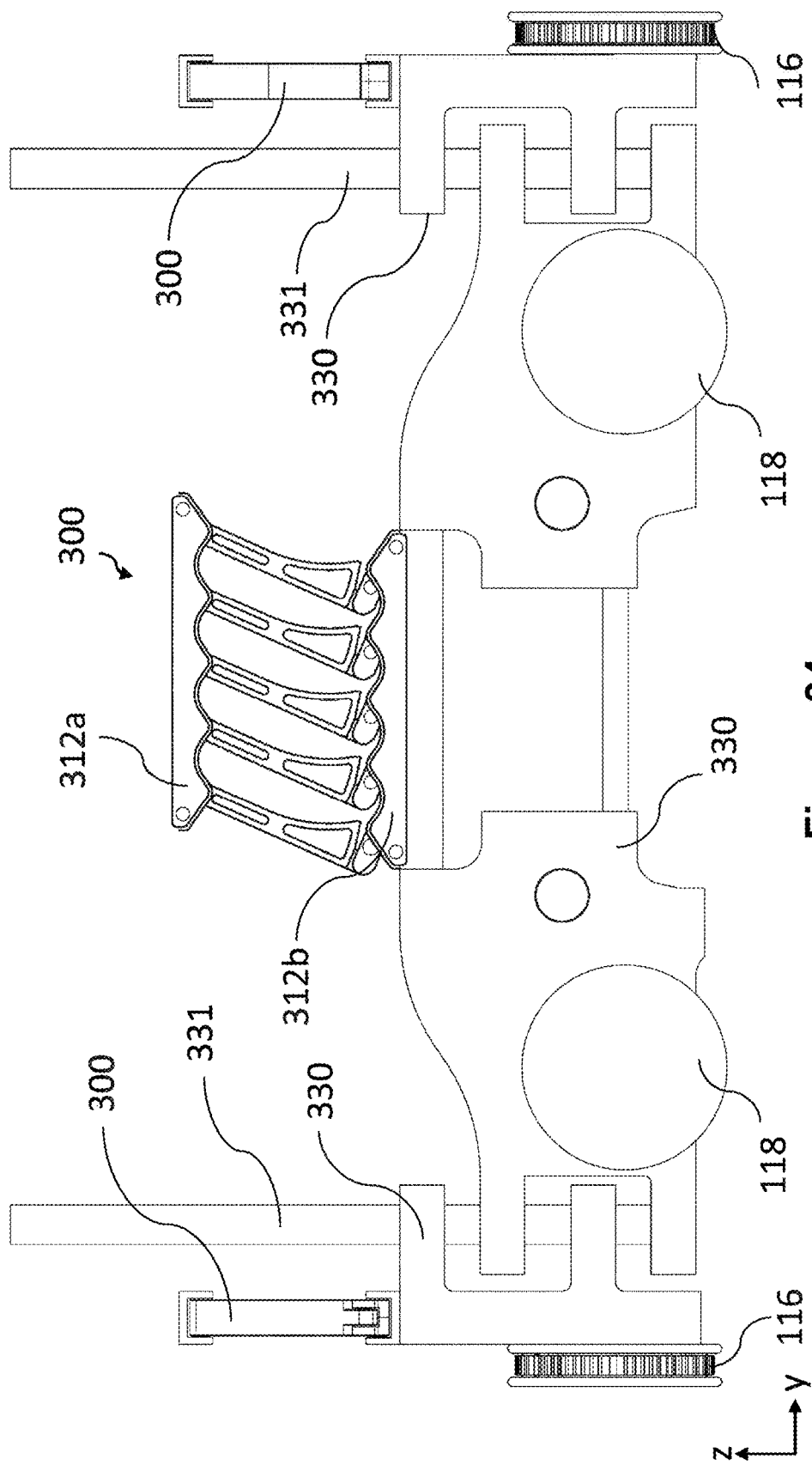
Figure 35:
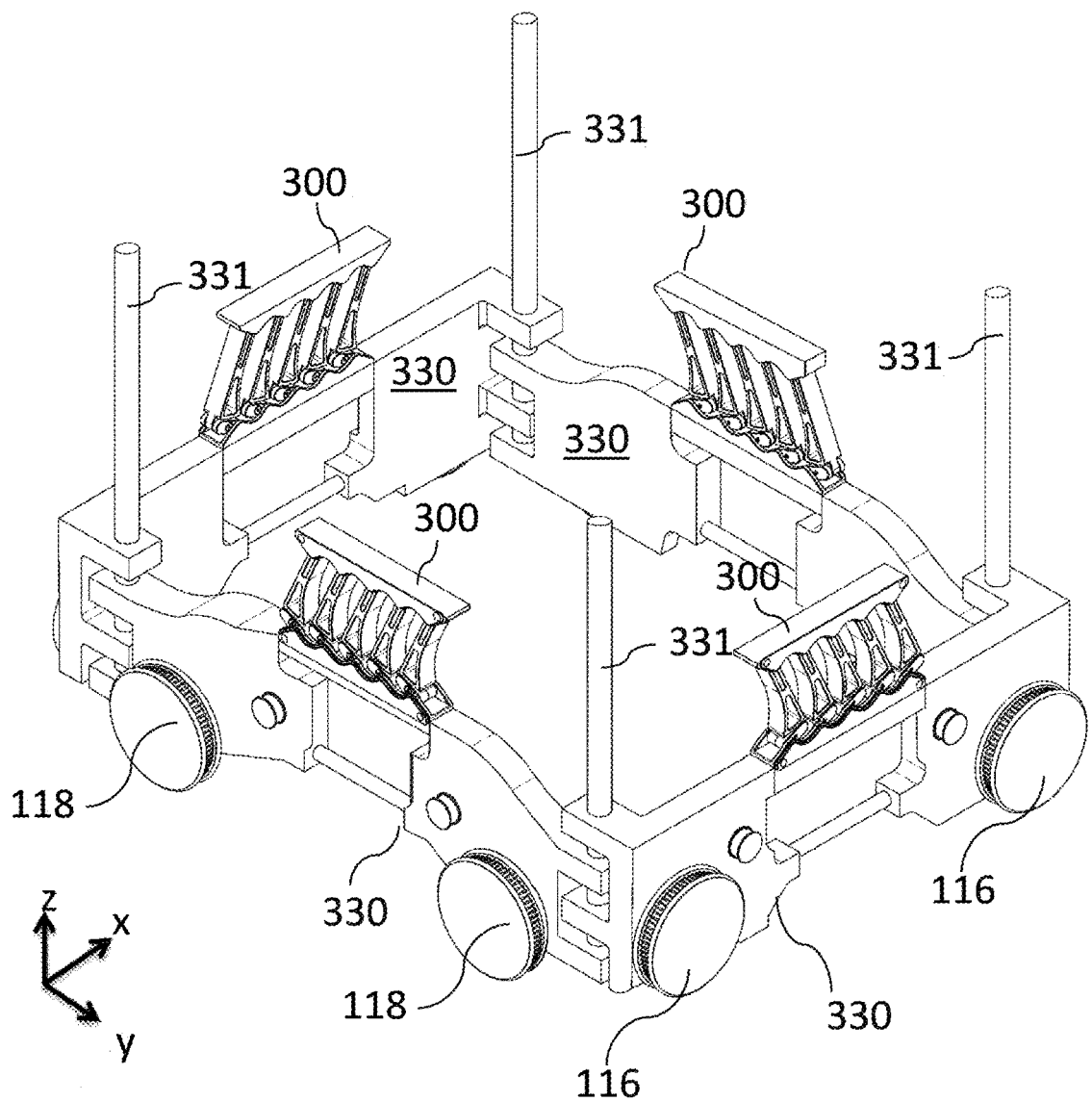
Figure 36:
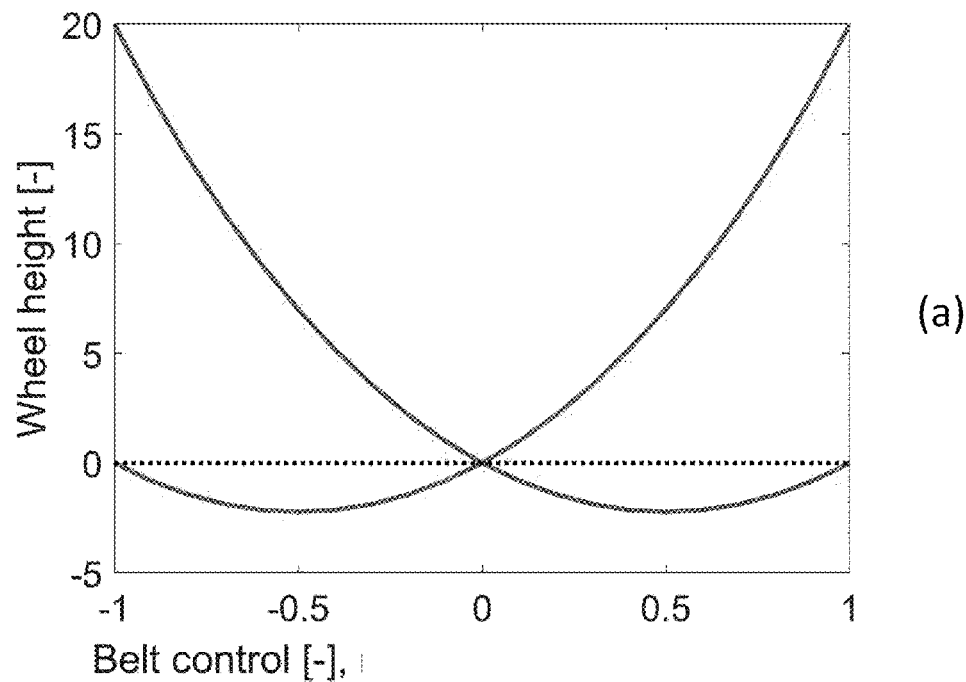
Figure 36:
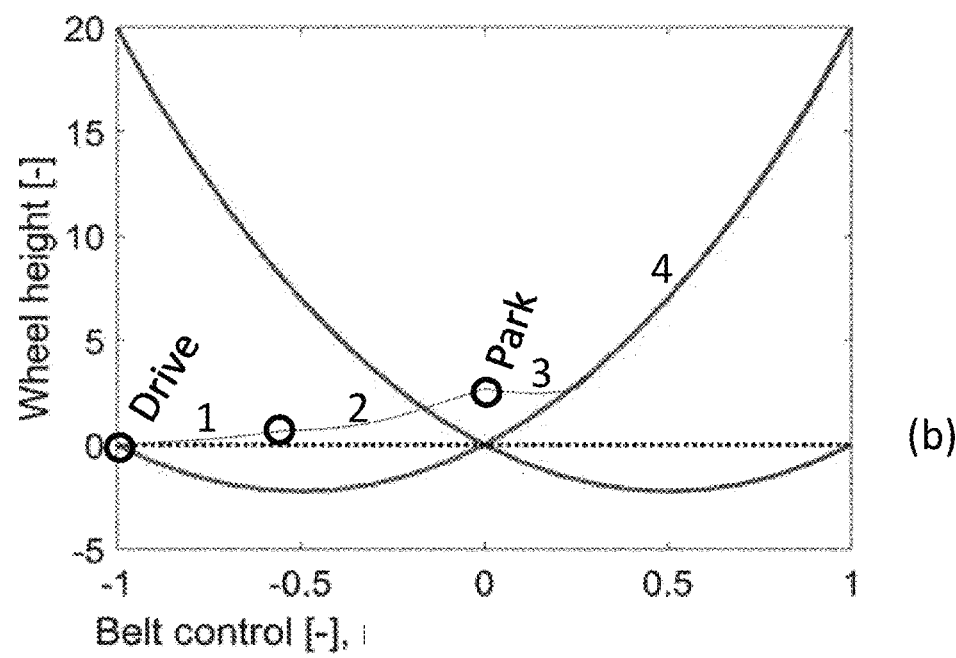
Figure 37:
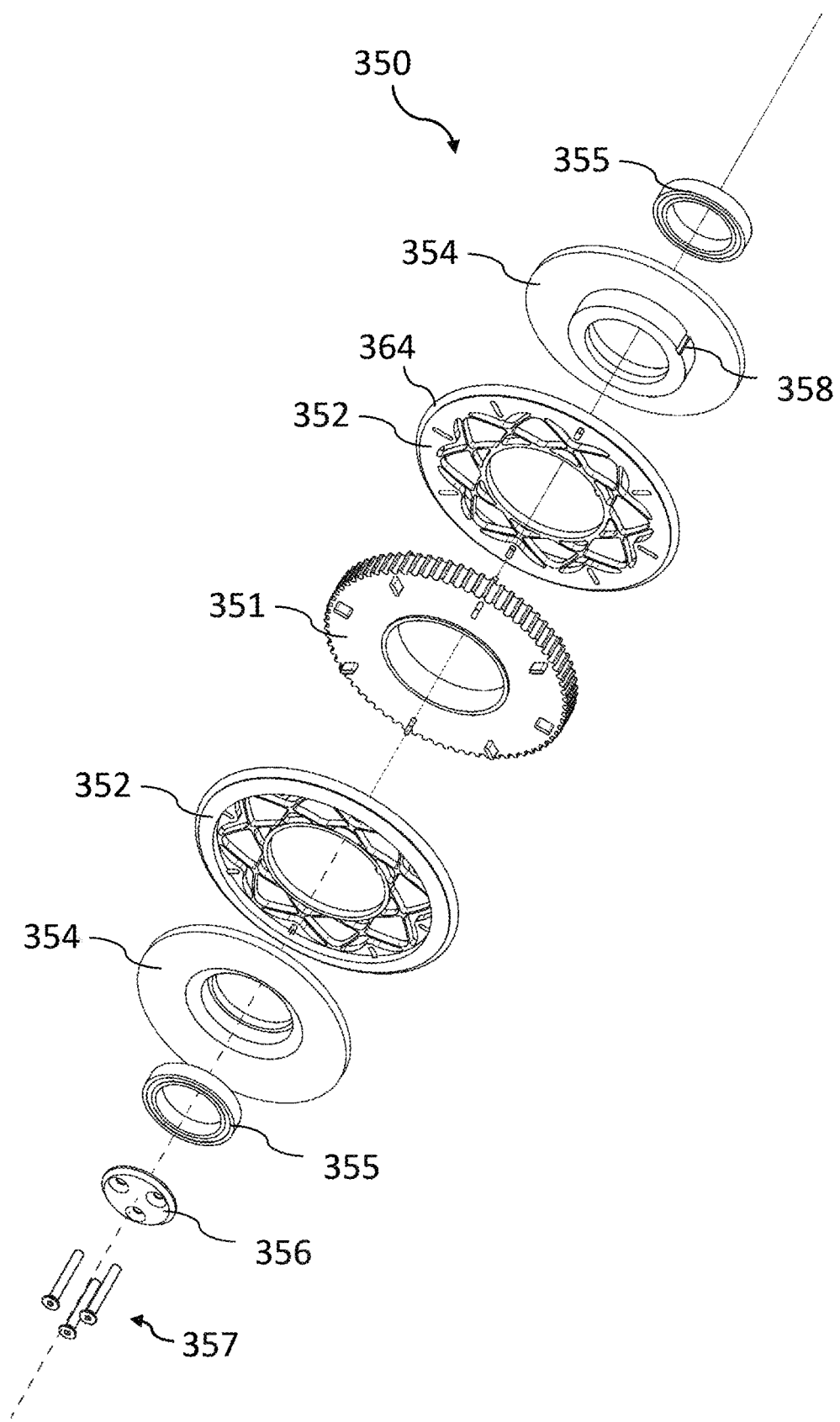
Figure 38:
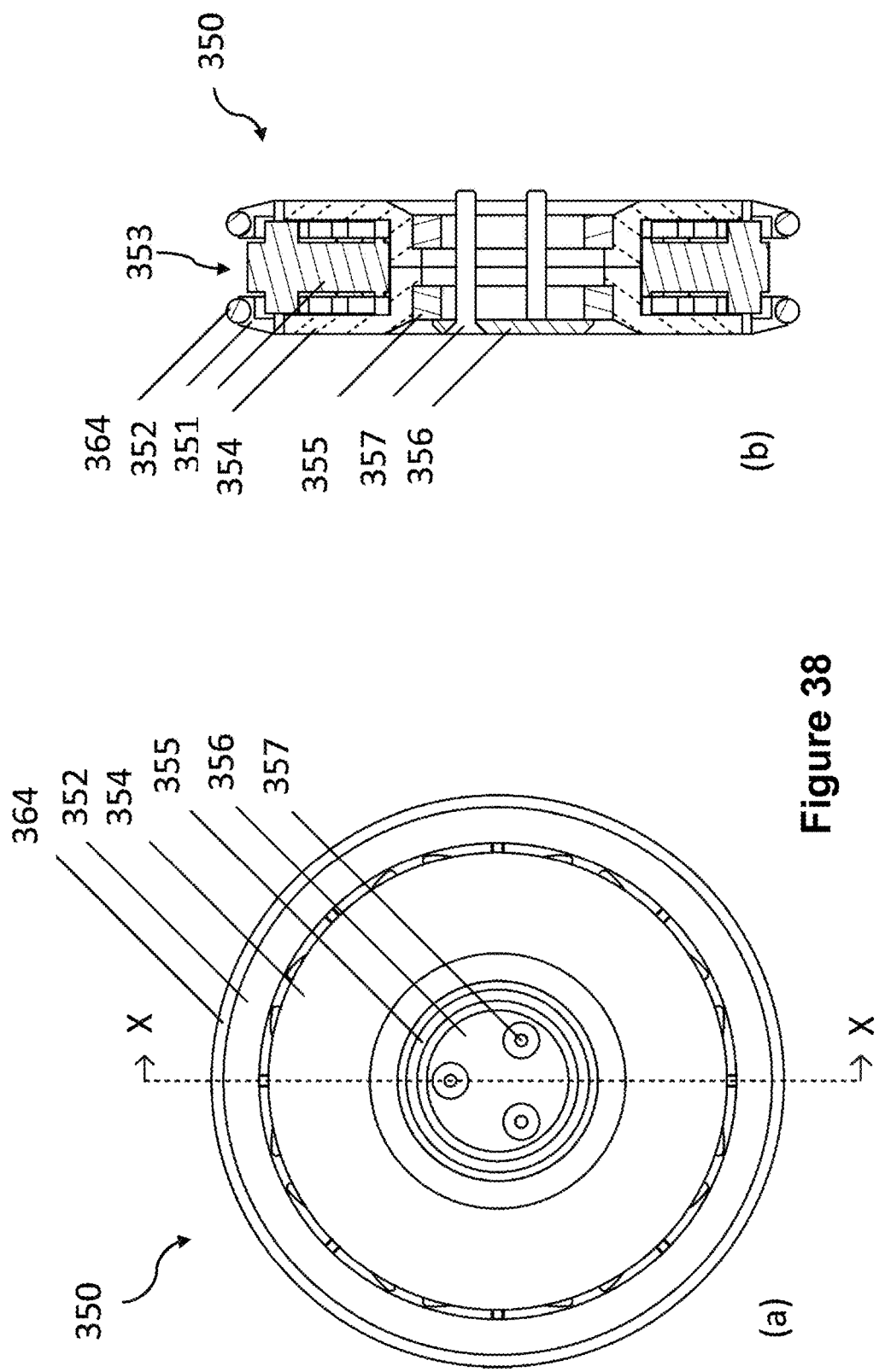
Figure 40:
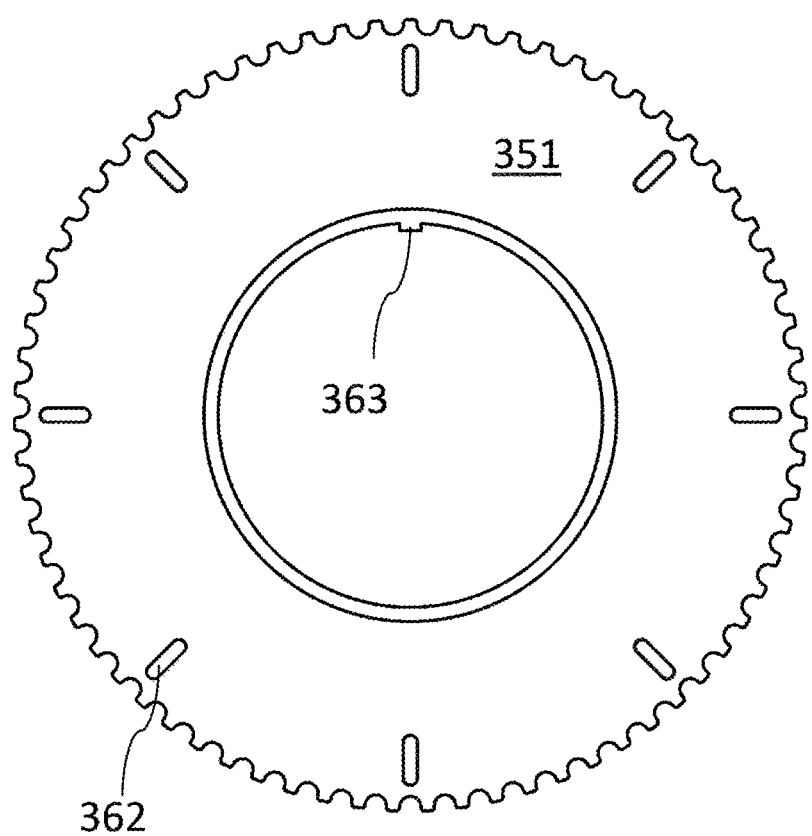

FIGS. 6(a), 6(b) and 6(c) are a schematic illustration of a compliant mechanism linkage-set for use in engaging first and second sets of wheels of load handling devices, as part of a direction-change assembly according to one form of the invention;

FIGS. 7(a), 7(b) and 7(c) are a perspective view of a load handling device showing the compliant mechanism and wheel position in similar positions to the positions shown in FIG. 6;

FIGS. 8(a), 8(b) and 8(c) illustrate examples of compliant mechanisms in neutral or at rest configuration having various flexural hinge arrangements, for use as part of a direction-change assembly;

FIGS. 9(a) and 9(b) illustrate a compliant mechanism in first and second stable configurations, for use in a direction-change assembly;

FIG. 10(a) is a planar view, and FIG. 10(b) is a perspective view, of a wheel having spokes for use on a load handling device;

FIG. 11(a) is a planar view, and FIG. 11(b) is a perspective view, of a first-layer type of a wheel for use on a load handling device;

FIG. 12(a) is a planar view, and FIG. 12(b) is a perspective view, of a second-layer type of a wheel for use on a load handling device;

FIGS. 13(a) and 13(b) show schematic force diagrams of part of a second-layer type of a wheel for use on a load handling device;

FIG. 14 shows a wheel chassis;

FIG. 15 shows a drive assembly for use with a set of wheels;

FIG. 16 shows a lifting assembly;

FIG. 17 shows an alternative arrangement of a lifting assembly;

FIGS. 18(a), 18(b) and 18(c) show a schematic illustration of a gripper assembly, FIG. 18(a) in a locked configuration; FIG. 18(b) moving from the locked configuration to a release configuration; and FIG. 18(c) in a release configuration;

FIGS. 19(a) and 19(b) show a schematic illustration of a gripper assembly, FIG. 19(a) in a locked configuration; and FIG. 19(b) in a release configuration;

FIGS. 20(a) and 20(b) illustrate a load handling device with and without a lifted container;

FIG. 21 shows a plane view of a drive assembly having a tensioning means;

FIG. 22 shows a perspective view of the drive assembly illustrated in FIG. 21;

FIGS. 23(a), 23(b) and 23(c) are a plane views of the drive assembly and the tensioning means, FIG. 23(a) with the wheels in a position to engage with a track, FIG. 23(b) with the wheels in a neutral position or at rest and FIG. 23(c) with the wheels up, or disengaged with a track;

FIGS. 24(a), 24(b) and 24(c) are plane views of the drive assembly and the tensioning means illustrating the relative position of the tensioning means and wheels on a load handling device resting on a surface, FIG. 24(a) with the y-direction wheels lowered in a position to engage with the surface and the x-direction wheels raised and disengaged with a track, FIG. 24(b) with the wheels in a neutral position or at rest where both x-direction and y-direction wheels are engaged with the track, and FIG. 24(c) with x-direction lowered and the y-direction wheels raised;

FIG. 25 illustrates a planar view of a load handling device showing a drive motor arrangement;

FIG. 26(a) is a top planar view, and FIG. 26(b) is a perspective view, of a wheel having spokes for use on a load handling device, and FIG. 26(c) is an side view of a wheel comprising plural O-rings as tyres;

FIGS. 27(a) and 27(b) show schematic force diagrams of part of lattice-layer type of a wheel;

FIG. 28(a) shows a plane view hub motor suitable for fitting a wheel of the type illustrated in FIG. 26, and FIG. 28(b) shows a side view of the hub motor;

FIG. 29(a) shows plane view and FIG. 29(b) shows a side view of a wheel of the type illustrated in FIG. 26 fitted to a hub motor of the type illustrated in FIG. 28;

FIG. 30 shows a plane view of a rigid-body linkage-set as part of a direction-change assembly according to one form of the invention;

FIGS. 31(a), 31(b), 31(c) and 31(d) show the deconstructed parts of a single two-part linkage of a ridged-body linkage-set of the type shown in FIG. 30;

FIG. 32 shows a perspective view of the rigid-body linkage-set shown in FIG. 30;

FIGS. 33a-c show the rigid-body linkage-set of FIGS. 30-32, where the first wheel set is engaged (FIG. 33c), where wheels are in a parked position (FIG. 33a) and where the second wheel set is engaged (FIG. 33b);

FIG. 34 shows a side view of the wheel mounts and linkages;

FIG. 35 shows an isometric view of the wheel mounds and linkages;

FIGS. 36(a) and 36(b) show graphs of the tension of the drive belt vs. the wheel height for a direction-change function;

FIG. 37 shows an exploded view of a wheel, showing each of the component parts;

FIG. 38(a) shows a planar view of an assembled wheel, and FIG. 38(b) shows a sectional view of the wheel taken through line X-X;

FIGS. 39(a) and 39(b) show the spring layer of a wheel, as a planar view FIG. 39(a) and a perspective view FIG. 39(b);

FIG. 40 shows a plane view of a wheel pulley layer;

FIGS. 41(a) and 41(b) show a wheel contact plate, as a planar view FIG. 41(a) and a perspective view FIG. 41(b);

DETAILED DESCRIPTION

In this document, the word "comprise" and its derivatives are intended to have an inclusive rather than an exclusive meaning. For example, "x comprises y" is intended to include the possibilities that x includes one and only one y, multiple y's, or one or more y's and one or more other elements. Where an exclusive meaning is intended, the language "x is composed of y" will be used, meaning that x includes only y and nothing else.

In this document, the language "movement in the n-direction" (and related wording), where n is one of x, y and z, is intended to mean movement substantially along or parallel to the n-axis, in either direction (i.e. towards the positive end of the n-axis or towards the negative end of the n-axis).

In this document, the word "connect" and its derivatives are intended to include the possibilities of direct and indirection connection. For example, "x is connected to y" is intended to include the possibility that x is directly connected to y, with no intervening components, and the possibility that x is indirectly connected to y, with one or more intervening components. Where a direct connection is intended, the words "directly connected", "direct connection" or similar will be used. Similarly, words such as "support", "mount" and their derivatives are intended to include the possibilities of direct and indirect contact.

In this document, some words such as "load handling device", "vehicle" and "bot" are used interchangeably. Similarly, words "body", "frame" and "skeleton" of the load handling device; "rails" and "tracks" of the storage frame; "bin", "container", or "tote" of the storage system may be used interchangeably. "DT" or "delivery tote" is a tote which contains completed or partially completed orders. "ST" or "storage tote" is a tote which contains items or a delivery tote being stored in the storage and retrieval system.

As is commonly understood, compliant mechanisms transfer an input force and displacement to an output force and displacement through elastic deformation of the mechanism body. The deformation and displacement, i.e. movement, of the compliant mechanism is determined by the material properties, shape and geometry of the mechanism. When a compliant mechanism is deformed by applying a force, elastic energy is stored in the compliant mechanism. When the force is removed, the compliant mechanism will return to its original shape or configuration, typically by releasing stored elastic energy. The stored elastic energy may be stored in the material itself or the elastic energy may be stored in the mechanism as a result of the shape or geometry of the mechanism.

The choice of material for a compliant mechanism is important to ensure that the compliant mechanism moves as intended. For example, a rubber material will introduce losses into the mechanism system as elastic energy may be dissipated as heat energy, whereas a rigid material may be unsuitable because it is unable to bend without fracture.

The method of manufacture may also influence the movement and properties of a compliant mechanism. For example, 3-D printing techniques may be used to manufacture complex shapes and geometries.

Typically, when no force is applied to a compliant mechanism and there is no stored elastic energy, the compliant mechanism is described as being "at rest" or in a neutral position. Often, compliant mechanisms comprise a linkage of rigid members connected together with revolute, i.e. curved, joints.

In some forms, compliant mechanisms may be "distributed". A distributed compliant mechanism can be designed by selectively removing material from an allowable build volume in conjunction with modelling approaches such as the Finite Element Method, which can determine the way in which a given volume deforms under load. Each time material is removed from the allowable build volume, the resultant mapping between input loads and output deflection and loads can be predicted, and an assessment can be made of the given shape's suitability for the task at hand. Many shapes can be tested iteratively by a topology optimisation algorithm. The resultant shapes have the added advantage of typically not having explicit flexure hinges but rather spreading the deformation throughout the shape, which reduces surface stresses in the material under load conditions and alleviates fatigue hi the part.

Alternatively, several components may act together to form a compliant mechanism.

Various compliant mechanisms are used as part of the load handling devices described herein.

Compliant mechanism topologies can closely imitate a rigid-body linkage comprising flexural pivots. Accordingly, rigid-body linkages may replace one or more of the compliant mechanisms described herein.

Advantageously, compliant mechanisms may be used to provide a "default" position that the mechanism will return to without external input. The default position may be designed to be a "safe" position. Advantageously this may be designed into a device as a safety feature. For example, when control of the system or part of the system is temporarily lost, the devices operating in the system may return to their default-safe position until control and operation is restored. This may be, for example, putting a load handling device into a "parked" configuration so that it cannot move until the issue is resolved.

Other uses and advantages of compliant mechanisms will become apparent from the following description.

As is commonly understood, topology is concerned with the geometric dimensions and properties of the shape of an object.

Objects may be designed to satisfy mechanical requirements for loading, and to ensure components of an assembly or mechanism are each free to move as required.

Artificial intelligence AI (or in some cases Machine learning ML) computing techniques may be used to satisfy structural and mechanical point and dynamic loading requirements using a particular material whilst aiming to achieve a particular secondary goal, such as to minimise overall weight, remain within certain stress limits, account for particular thermal properties of the material, etc. Thus, after designing for a particular function, parts may go through a process of "topology optimisation" using AI to create an, often unusual, shape that would not otherwise have been designed. For example, the AI may be provided with instructions such as "never bend joint 1 more than X, nor have a stress more than Y whilst performing function Z".

Various parts of a load handling device may be suitable for going through a topology optimisation process. Example parts include, but are not limited to, corner brackets, components of the direction-change assembly, the wheels, body work etc.

Other uses and advantages of topology optimisation will become apparent from the following description.

The load handling devices and associated methods disclosed herein are intended for operation on a storage and retrieval system as described above in connection with the prior art. The storage and retrieval system may be modified to accommodate the load handling devices described here. Further, the load handling devices operating on the grid of the storage and retrieval system are intended to be operated with or at the same time as other devices operating on the grid. The devices operating on the grid may be all of the same type, or more than one type of device may be operated on the grid at the same time.

The load handling devices described herein are intended to be lightweight and relatively cheap to manufacture. In addition, as will be apparent from the following description, the load handling devices described herein are substantially modular, making them easy and or cheap to maintain, as components may be readily assembled and replaced. Where possible, components are made from recyclable or environmentally-friendly materials.

A load handling device 100 comprises a skeleton 102, body or frame which supports, carries or houses the other components of the load handling device, for example, the battery and associated electronics, controllers and communications devices, motors for driving wheels, motors for driving the lift assembly, and other sensors and systems. The skeleton 102 comprises a recess, sized to accommodate a container or bin when it is lifted by the lift assembly. The skeletal structure of the load handling device helps to ensure that components are easily accessible.

As noted above, with reference to other load handling devices, each load handling device is arranged to travel in the x- and y- directions on the rails 22 of the framework 14, above the stacks 12 of containers or bins.

Referring to FIGS. 5-7 and 20, each load handling device is fitted with two sets of wheels 116, 118, which run on rails provided at the top of the frame of a storage system of the type described above. At least one wheel of each set 116, 118 is driven to enable movement of the vehicle 102 in x- and y-directions respectively along the rails. The wheels 116, 118 are arranged around the periphery of a skeleton 102 of the load handling device. As will be explained below, one set of wheels 116 can be moved vertically to lift the set of wheels 116 clear of the respective rails leaving the remaining set of wheels in contact with the rails, thereby allowing the load handling device to change direction. In some instances, both sets of wheels 116, 118 may be in contact with the respective rails at the same time.

The components displacing the or each set of wheels in a vertical or z-direction with respect to each other, and the skeleton 102 of the load handling device, are located within the body or skeleton 102 102 of the load handling device.

Figure 1:
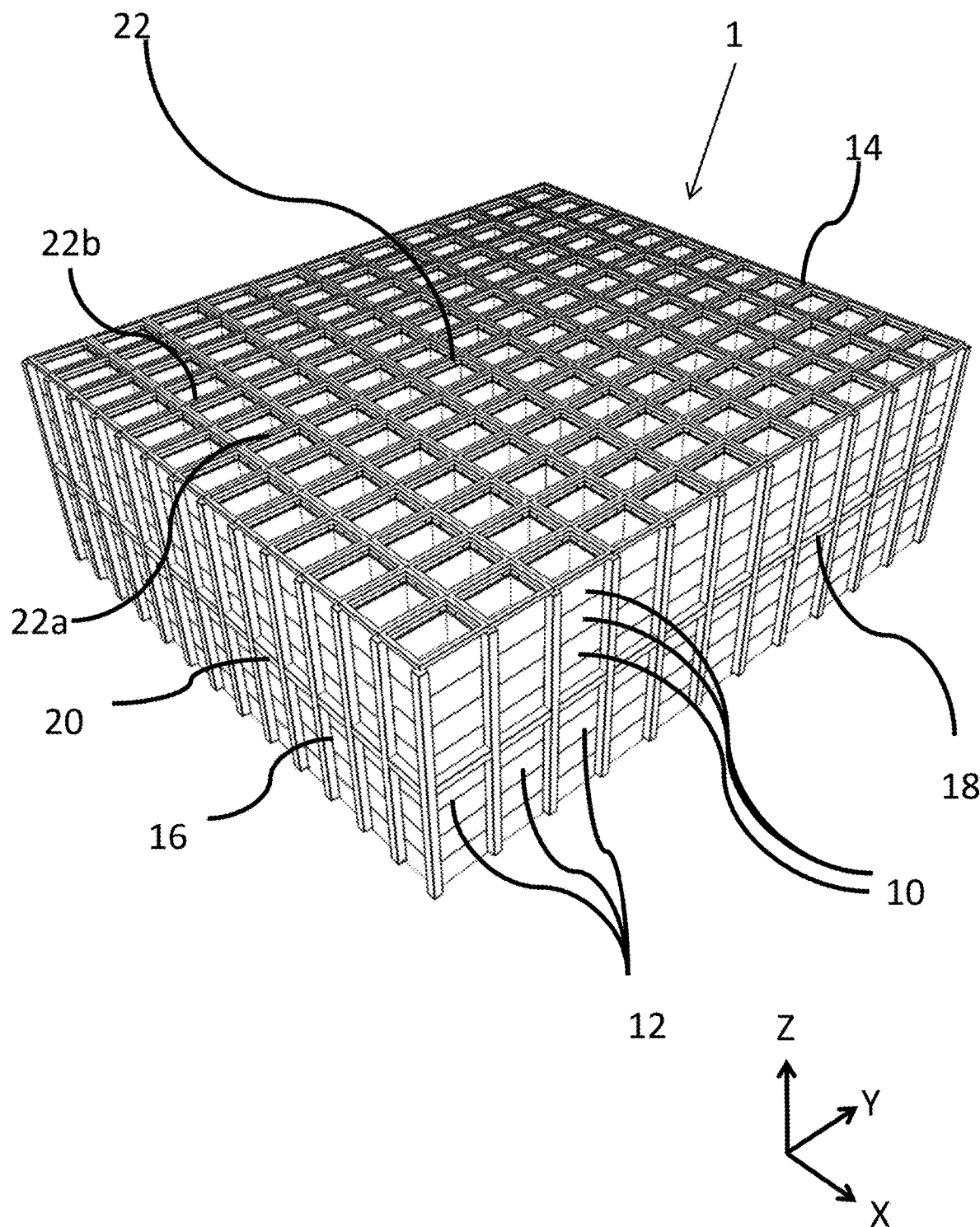
FIG. 1 is a schematic, perspective view of a frame structure for housing a plurality of stacks of bins in a storage system.
Figure 2:
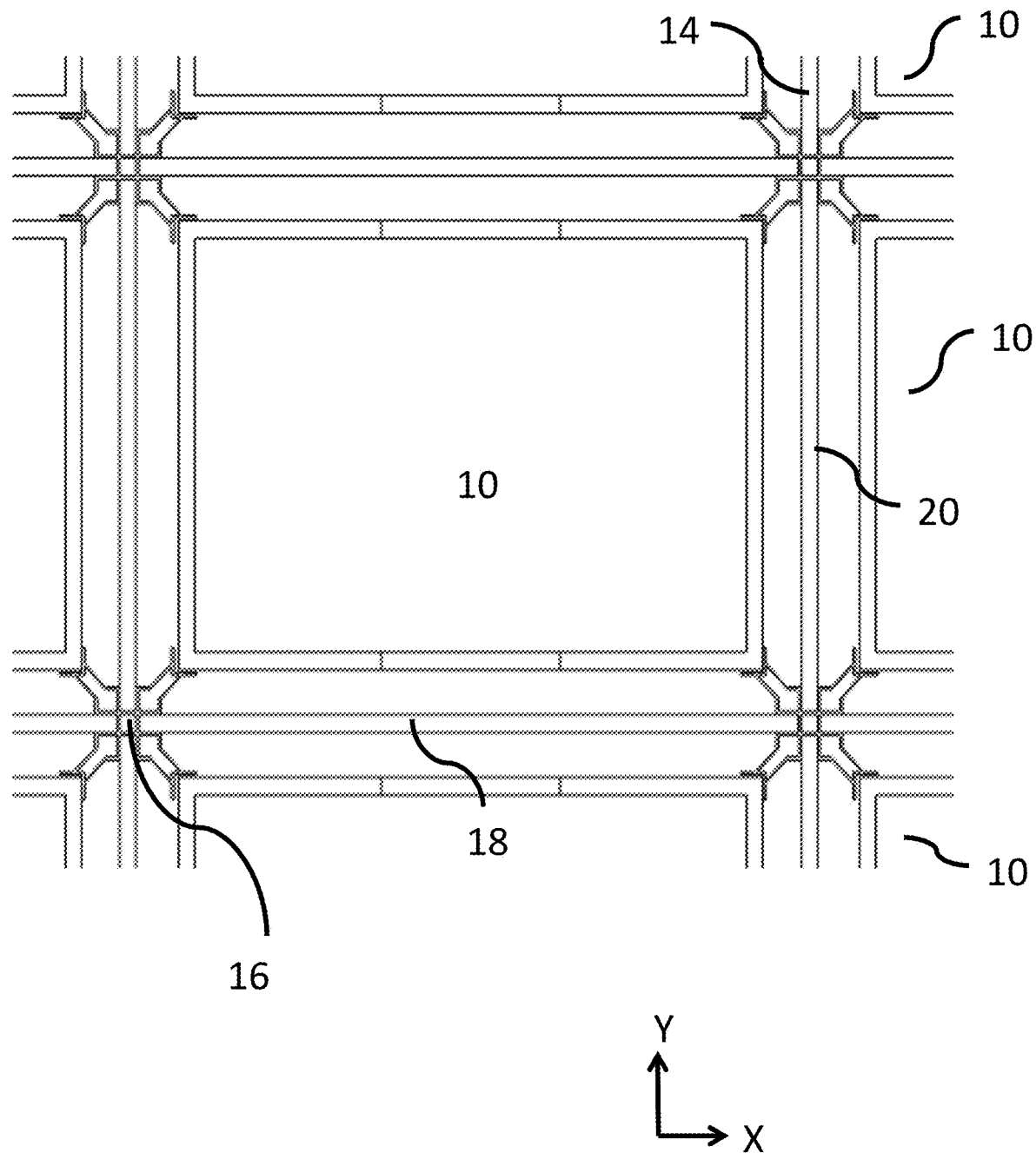
FIG. 2 is a schematic, plan view of part of the frame structure of FIG. 1.
Figure 3A:
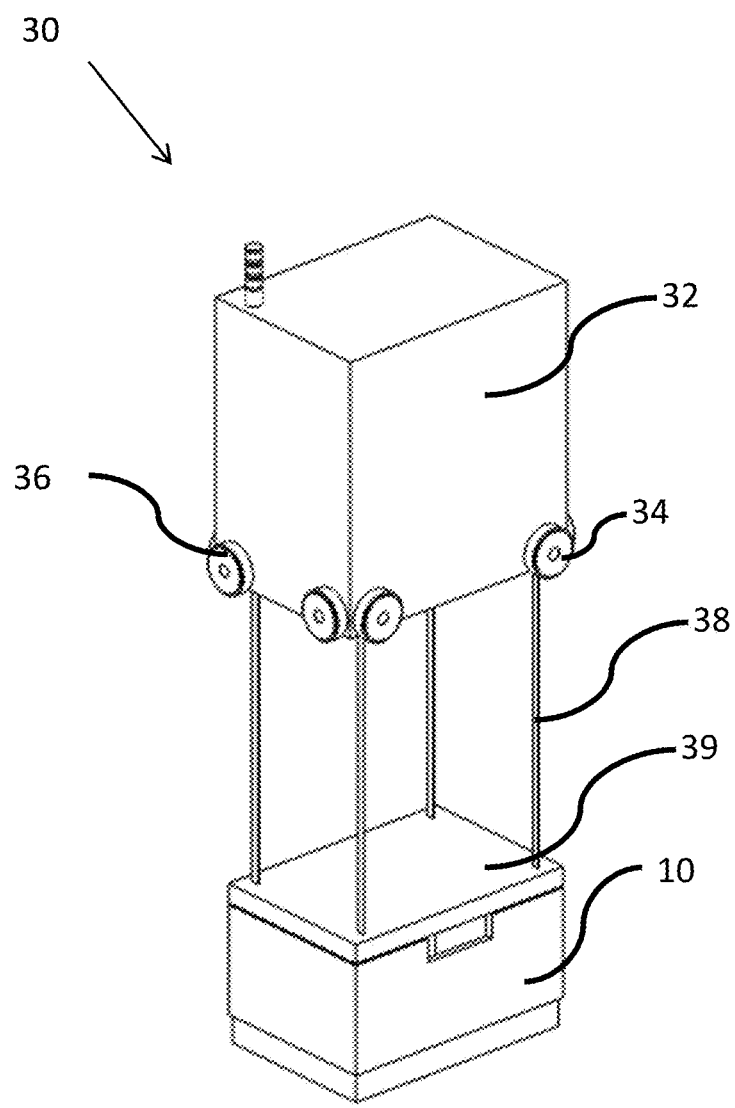
FIGS. 3a and 3b are schematic, perspective views, from the rear and front respectively, of one form of robotic load handling device for use with the frame structure of FIGS. 1 and 2.
Figures 3B, 3C:
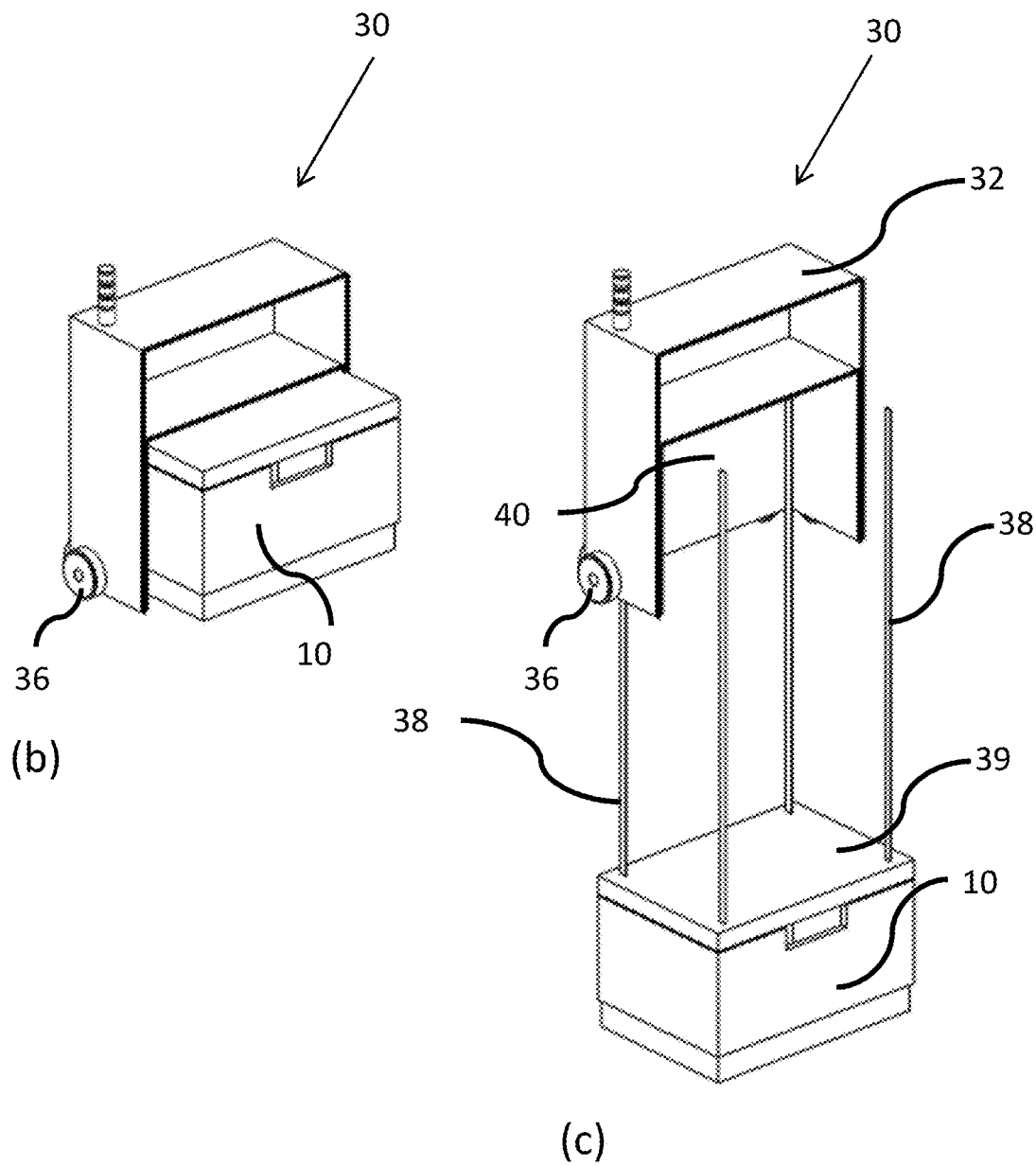
FIG. 3c is a schematic perspective view of the known load handler device in use lifting a bin.
Figure 4:
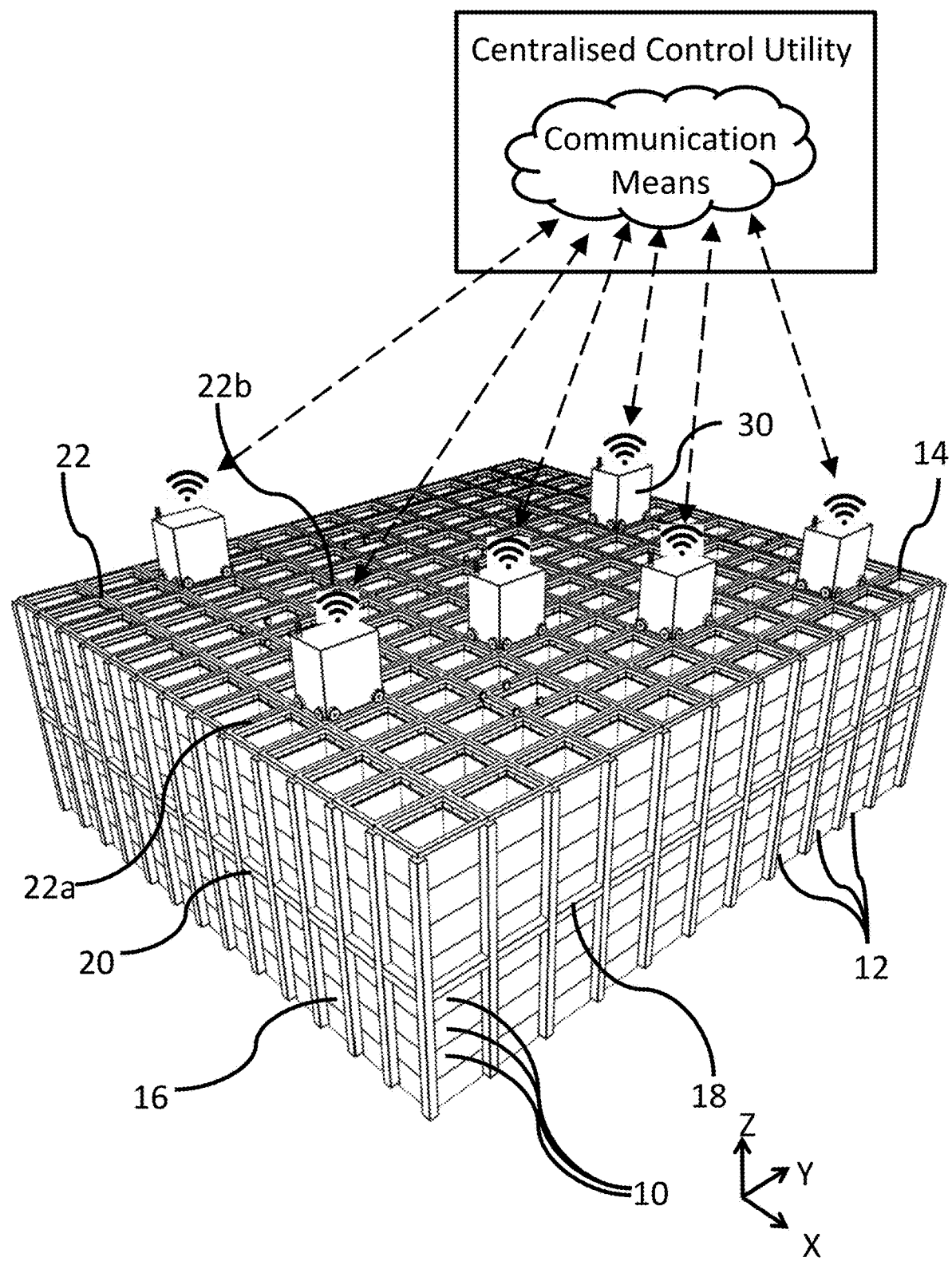
FIG. 4 is a schematic, perspective view of a known storage system comprising a plurality of load handler devices of the type shown in FIGS. 3a, 3b and 3c, installed on the frame structure of FIGS. 1 and 2.
Figure 5:
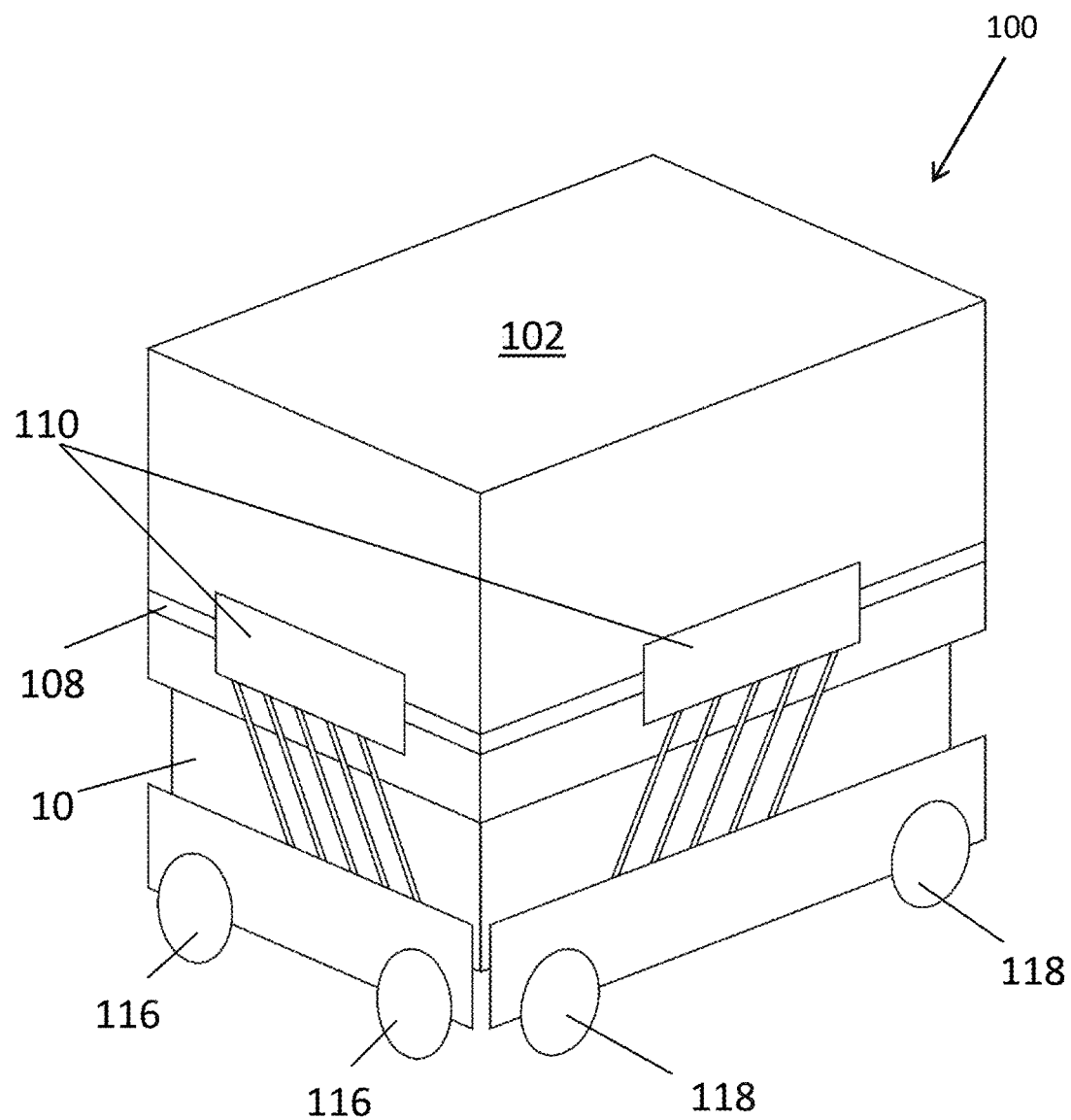
FIG. 5 is a schematic illustration of a load handling device.
Figure 7:
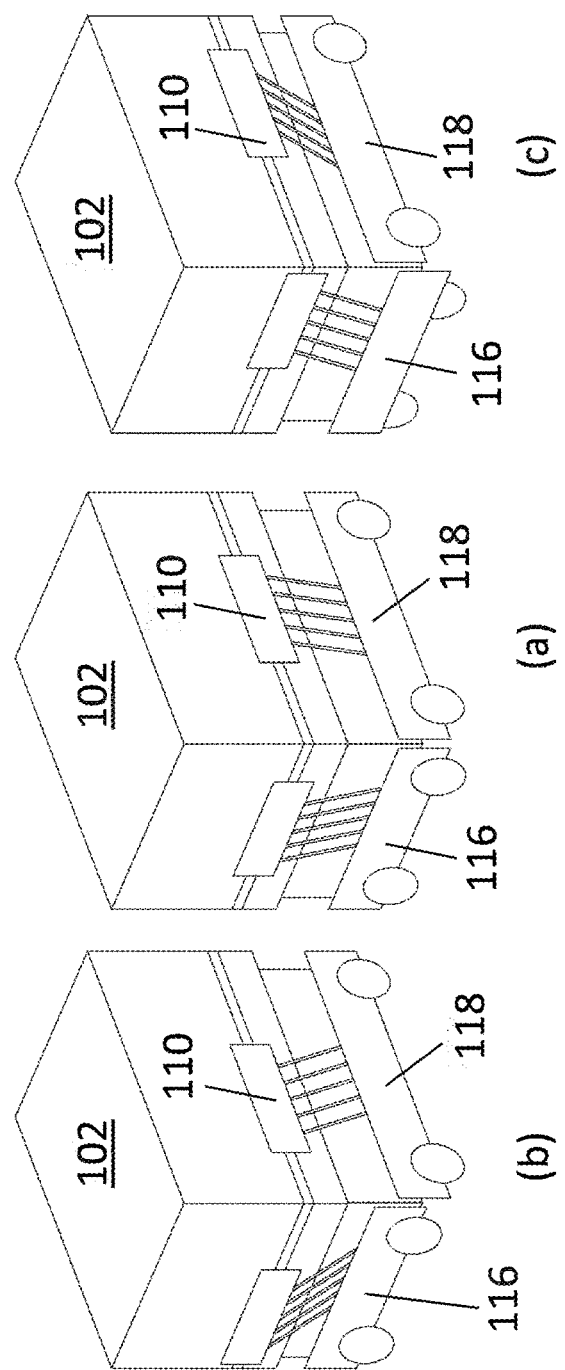

As shown in FIGS. 5-7, the first and second sets of wheels 116, 118 can be raised clear of the rails or lowered onto the rails by means of a direction-change assembly. The direction-change assembly comprises compliant mechanism(s) 110 or linkage-sets located on opposed faces of the load handling device skeleton 102.

The direction-change compliant mechanisms 110 are each deformable in first and second directions. FIG. 6 illustrates the compliant mechanism 110 in three positions and, below that, the position of the wheels 116, 118 relative to the vehicle skeleton 102 and rails in each of the positions. FIG. 7 is a perspective view of a load handling device showing the compliant mechanism 110 and wheel position in similar positions to the positions shown in FIG. 6.

When there is no input force, the compliant mechanism 110 is at rest or in a neutral position, i.e. the compliant mechanism 110 is not elastically deformed, and both sets of wheels 116, 118 are level and are resting on a surface. In this arrangement, the load handling device is unable to move in the x- nor y-directions and the load handling device is parked, FIGS. 6a and 7a. The elastic deformation of the compliant mechanism 110 is linked to arms holding each of the wheels and movable in a vertical (or z-) direction to raise and lower the wheels.

When a first input force $F_1$ is provided, the compliant mechanism 110 body deforms in a first direction. The displacement of the mechanism body is translated to a vertical direction to lower the first set of wheels 116, and raise the second set of wheels 118. The wheels of the first set of wheels 116 move downwards to engage with the rails and to support the vehicle and the wheels of the second set of wheels 118 move upwards to be clear of the rails, as shown in FIGS. 6c and 7c. Thus, the vehicle 100 may be driven in the x-direction.

When a second input force $F_2$ is provided, in a direction opposed to the first input force, the compliant mechanism 110 body deforms in a second direction. The displacement of the mechanism body is translated to operate in a vertical direction to raise the first set of wheels 116, and lower the second set of wheels 118 so that the load handling device is supported by the second set of wheels 118 and may be driven in the y-direction, FIGS. 6b and 7b.

The compliant mechanism 110 is connected to the sets of wheels 116, 118 via a transfer linkage. Thus, in this way, the compliant mechanism 110 provides means for changing the operational direction of travel of the load handling device 100.

It will be appreciated that the compliant mechanism 110 illustrated in FIGS. 6a-c comprises a series columns or trunk portions attached to rails or brace. The columns or trunk portions 111 are attached to the rails or braces 112 via relatively narrow sections which bend preferentially when a horizontal force is applied to the rails or braces. Accordingly, the narrow sections may be considered to be hinges 113.

Considering the shape of a compliant mechanism 110 for direction-change in more detail and with reference to FIGS. 8*a-c* as an example, the compliant mechanisms 110 comprise a number of column or trunk portions 111 attached to upper and lower braces 112*a,b* through upper and lower hinges in a series. FIG. 8*a* illustrates a compliant mechanism 110 where each of the trunks are attached by a branch type flexural hinge 120. FIG. 8*b* illustrates a compliant mechanism 110 where each of the trucks are attached by a zig-zag spring type flexural hinge 121. The trunk 111 of a zig-zag spring hinge additionally has a tether 123 to keep the trunk 111 in place between the upper and lower braces 112.

Figure 9:
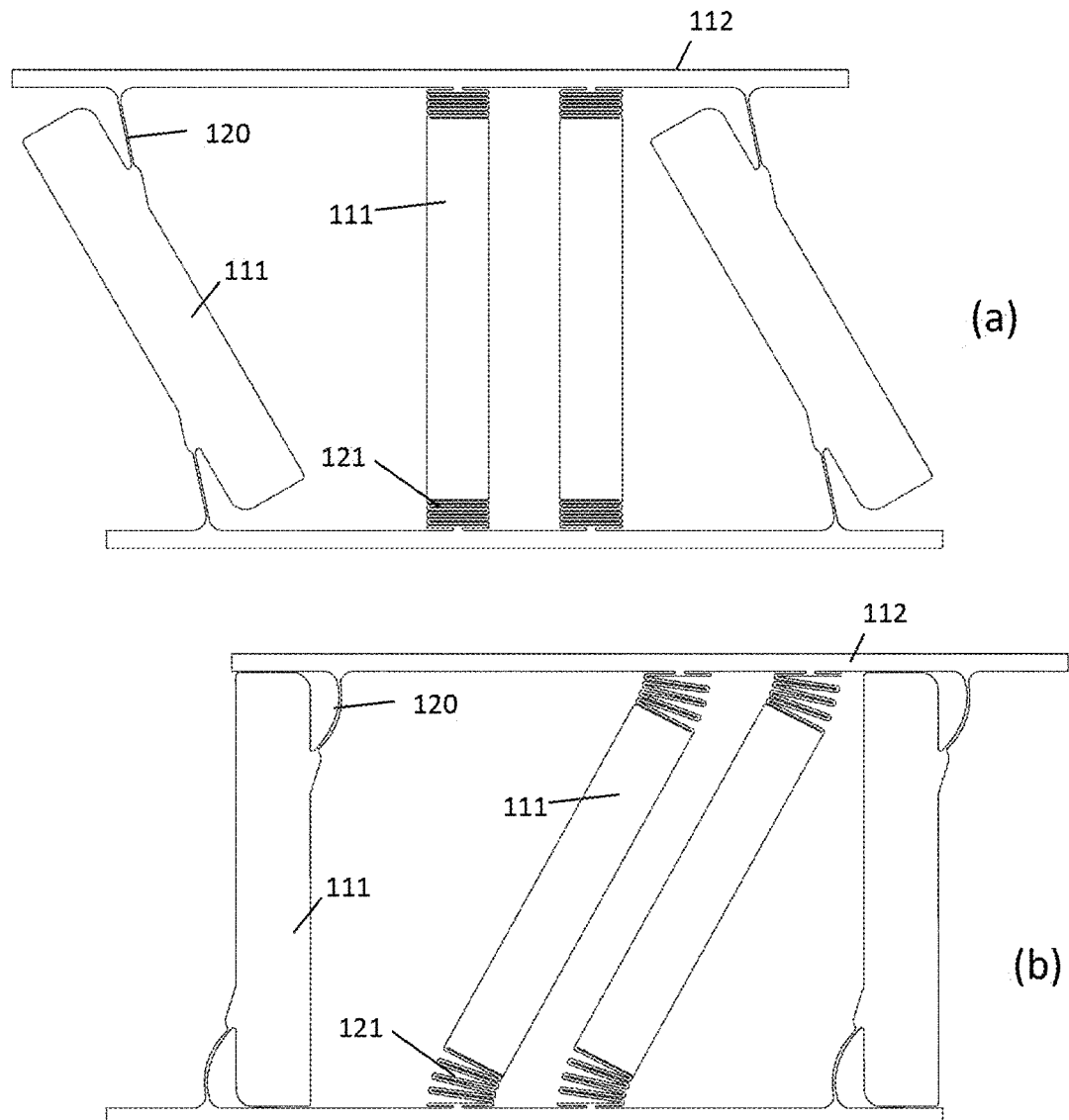

As shown in FIG. 9, the flexural hinges may be of two types: branch-type where at each end the trunk portion 111 is attached to the braces 112 by a thin flexible branch 120 extending from a point on opposed sides of the trunk 111 a short distance from each end of the trunk 111 to the braces 112, and spring-type where at each end the trunk portion 111 is attached to the braces 112 by a thin flexible zig-zag spring 121 extending from the end of the trunk 111 to the brace 112. Some material has been removed from each of the truck sections 111 to create a truss structure to reduce the overall weight of the compliant mechanism 110.

It will be appreciated that the examples provided herein are merely some of the ways for achieving the required characteristics of the compliant mechanism 110. Other arrangements are anticipated and may be determined using machine learning or AI techniques to meet the requirement. Further, machine learning may be used to optimise the topology of the design in order to reduce the weight of the direction-change compliant mechanism 110.

When the compliant mechanism 110 is mounted or supported by the load handling device skeleton 102, it will be appreciated that the lower brace 112*b* remains in a fixed position between a pair of wheels 116 or 118. Meanwhile, when a force is applied to the upper brace 112*a*, the elastic deformation of the compliant mechanism results in the upper brace 112*a* being horizontally displaced relative to the lower brace 112*b*. Accordingly, the upper brace 112*a* may be described or referred to as a traveller 112*a*.

In the following passage the direction-change assembly, x– direction and y-direction are referred to in terms of whether the first set of wheels 116 or the second set of wheels 118 would be engaged with the track to allow travel in the x– or y– direction. It will be appreciated that the x–, y– direction relative to the load handling device 100 will depend which face is being referred to. The direction in terms whether a force $F_1$ or $F_2$ is applied, or a direction in which resultant elastic deformation takes place, is either positively or negatively in the same direction.

When the compliant mechanism 110 is deformed in a first or x– direction (FIG. 9*a*), the spring-type flexural hinge 121 compresses and the ends of the trunks 111 engage through the compressed springs 121 with the upper and lower braces 112, while the branch-type flexural hinges 120 are in a relatively stretched position away from their respective trunk 111. In this way, load between the upper and lower braces 112 is supported by the spring-type trunks 111. Engagement of the trunk portions 111 with the upper and lower braces 112 means that the maximum displacement of the upper brace 112*a* (traveller) relative to the fixed lower brace 112*b* in the first or x-direction is limited.

When the compliant mechanism 110 is deformed in the second or y– direction (FIGS. 9*b*), the branch-type flexural hinge 120 bends and becomes relatively parallel with the trunks 111 and the ends of trunks 111 having branch-type flexural hinges 120 engage with the upper and lower braces 112, while spring-type hinges 121 are relatively stretched and bend out of line with their respective trunks 111. In this way, load between the upper and lower braces 112 is supported by the branch-type trunks 111. Engagement of the trunk portions 111 with the upper and lower braces 112 means that the maximum displacement of the upper brace (traveller) 112*a* relative to the fixed lower brace 112*b* in the second or y– direction is limited.

The position on a load handling device 100 of the upper brace or traveller 112*a* relative to the lower brace 112*b* may be seen in FIG. 7.

As a result of the geometry of the compliant mechanism 110 shown in FIG. 9, the compliant mechanism 110 is stable or stopped in both x– and y– drive directions at the extremity of allowable displacement. Also, the compliant mechanism 110 is stable when no deformation force is applied and the compliant mechanism 110 is at rest or in a neutral configuration, with substantially no stored elastic energy. In addition, in the stable x– and y– drive directions vertical load may be carried through the trunk or columns 111 of the compliant mechanism 110.

It will be appreciated that the compliant mechanism could be replaced with a fixed-pin pivot point rigid-body linkage mechanism having a trunk or column member for supporting a load, and have the same behaviour as the compliant mechanism described above. Accordingly a compliant mechanism of the type described above may be considered to be a type of linkage-set. Advantageously, the vertical load is not transmitted through the linkage joints at the pivot point, rather load is carried by the linkage members.

It will be appreciated that the direction change mechanism could comprise a combination of compliant mechanisms of one or more than one type, and or fixed-pin pivot point linkage mechanisms. FIGS. 30-33 show an example of a rigid-body linkage-set 300 for use in engaging first and second sets of wheels of load handling devices, as part of a direction-change assembly having a similar functional behaviour to the compliant mechanisms 110 described above.

The linkage-set 300 comprises a series of pivotally connected two-part linkages, FIGS. 30 and 32. Considering a single two-part linkage, at one end a primary linkage member (truck portion) 311 is pivotally attached to the traveller or upper brace 312*a* at knee join 316, and the opposing end is hingedly attached to a secondary linkage member (branch portion) 313 at ankle joint 314. The opposing end of the secondary linkage 313 is pivotally attached to the fixed or lower brace 312*b* at toe hinge 315. Thus, each single two-part linkage extends between the traveller 312*a* and the fixed brace 212*b*. To make the linkage-set 300, a series of similar two-part linkages are arranged in parallel between the traveller brace 312*a* and the fixed brace 312*b* to make up a linkage set 300, as shown in FIGS. 30 and 32.

The rotation or angular motion of the knees joint 216, ankle joint 314 and toe joint 315 are limited as will be described below. At the ankle joint 314, the primary linkage 311 has a single knuckle which slots between two knuckles of the secondary linkage 313. FIGS. 31*a-d* show deconstructed views of a single two-part linkage where FIGS. 31*a* and 31*b* show the primary linkage 311 and FIGS. 31*c* and 31*d* show the secondary linkage 313.

As shown in FIG. 31*c*, the secondary linkage 313 has a step 318, 321 in the z-x plane face between the ankle joint 314 and the toe hinge 315. The step 318, 321 has an inflection point between the first section 318 and the second section 321. When the primary linkage 311 is attached to the secondary linkage 313 at the pivot 314 face 317 of the primary linkage 311 knuckle meets the step surface 318, 321 and is able to rotate between the first section 318 and the second section 321 of the step surface.

Similarly, movement of the two-part linkage is limited when the lower surface of the primary linkage 319 meets the upper surface of the secondary linkage 320.

Movement of the two-part linkages, when arranged between the traveller 312a and the fixed brace 312b as a linkage-set 300, is described now with reference to FIGS. 33a-c.

FIG. 33a shows the linkage-set in a neutral or parked position, where the first set of wheels 116 and the second set of wheels 118 would be engaged with the track (shown in the thumbnail) and the load handling device 100 is unable to travel in the x-direction nor the y-direction. In this position, no force F is applied to the traveller 312a, and the lower face 319 of the primary linkage 311 rests against the upper face 320 of the secondary linkage 313.

In FIG. 33b a positive force F (i.e. from left to right as illustrated) has been applied to the traveller 312a. Applying a positive force F causes primary linkage 311 to rotate clockwise about the knee joint 316 and anti-clockwise about the ankle joint 314. Rotation about the ankle joint 314 is limited by face 317 meeting surface 318. By moving the traveller 312a further to the right, the secondary linkage 313 lifts away from the fixed brace 312b by rotating in a clockwise direction about the toe hinge 315. Thus, the traveller 312a is displaced horizontally in a positive direction relative to the fixed brace 312b. With the positive displacement of the traveller 312a the first set of wheels 116 are raised and the second set of wheels 118 are lowered to be engaged with the track (shown in the thumbnail), and the load handling device 100 would be able to travel in the y-direction.

In FIG. 33c a negative Force F (i.e. from right to left as illustrated) has been applied to the traveller 312a. Applying a negative force F causes the primary linkage 311 to rotate anticlockwise about the knee joint 316 and clockwise about the ankel joint 314. Rotation about the ankle joint 314 is limited by face 317 meeting surface 321 and the heels of the two-part linkages are pushed into the fixed brace 312b. Thus, the traveller 312a is displaced horizontally in a negative direction relative to the fixed brace 312b. With the negative displacement of the traveller 312b the first set of wheels 116 are lowered to be engaged with the track and the second set of wheels 118 are raised (shown in the thumbnail), and the load handling device 100 would be able to travel in the x-direction.

It will be appreciated that between the x-direction travel position and the y-direction travel position the linkage-set moves through the neutral or parked position.

The output of the compliant mechanisms or linkage sets 110, 300 is transferred to the wheels 116, 118 via a chassis 330 further discussed below in connection with FIGS. 34 and 35 which translates the horizontal movement of the compliant mechanism to a vertical movement of the wheels. In some arrangements, the upper brace or traveller 112a may be attached to a rod arrangement extending along a face of the load handling device 100 between each of the horizontal edges of the load handling device 100 via a glide bearing. In turn the rod arrangement may be attached to corner pieces at first and second ends, the corner pieces pivoting about their respective edges. The corner pieces may extend around the corner to a second face, perpendicular to the first face so that the linkage extends around the entire load handling device 100. In use, pivoting of the corner pieces may transfer to movement in the vertical or z-direction to a wheel mount. Pivoting in a clockwise direction may move a wheel mount on the face upwards to raise the wheels on the face, and lower the wheels on the face, perpendicular to the first face—or vice versa.

The linkage between the compliant mechanism 110, 300 and the corner pieces may be considered to be a distributed compliant mechanism and suitable for AI design. Further, the corner pieces are one example of a part of the device which is suitable for topology optimisation.

As can be seen in FIGS. 5 and 7, a first pair of compliant mechanisms 110, 300 are positioned on opposed faces within the skeleton 102 of the load handling device for controlling the position of the first set of wheels 116, and a second pair of compliant mechanisms 110 are positioned on orthogonal opposed faces within the skeleton 102 of the load handling device for controlling the position of the second set of wheels 118. Thus, each face of the load handling device comprises a compliant mechanism 110. The pairs of compliant mechanisms 110, 300 are coupled via a transfer belt 108 that substantially circumnavigates the load handling device skeleton 102, and is mechanically coupled to the upper braces or traveller 112a, 312a of the compliant mechanisms 110, 300. Thus, it is ensured that the wheel sets 116, 118 can be moved in unison, for example via corner pieces, to engage x- and or y- direction wheel sets with the rails of a storage system grid. In this way, the direction-change assembly may be operated by a single motor. In some examples of the load handling device 100 a direction-change motor may be arranged in or near the vertical corner piece arrangement so as not to occupy space within the skeleton, and for accessibility. In some examples of the direction-change assembly, the transfer belt 108 may pass over one or more idler pulleys for monitoring the rotation rate when moving between positions to engage the x- and y-directions to provide instant detection of belt 108 failure. If the belt 108 or another part of the direction-change assembly were to fail, then this information could be fed back to and exploited by the central control facility to prevent bot collisions.

The linkage members may be made from carbon fibre rods for example. The transfer belt 108 may be a toothed polyurethane tape, reinforced with glass, steel or carbon fibres, for example.

FIGS. 34 and 35 show in more detail how an arrangement of the direction-change linkage-sets 100, 300 are attached to the wheels 116, 118 and arranged on each side face of a load handling device 100. FIG. 34 shows a side view of the wheel mounts or wheel chassis and linkages 330, and FIG. 35 shows an isometric view showing the wheel chassis and linkages 330 of each side of a load handling device. It will be appreciated that FIGS. 34 and 35 show the wheel chassis and linkages or wheel mount 330 in more detail compared with FIG. 14.

Linkage-sets 300 are arranged on each side face of a load handling device 100, and connected to the wheels 116, 118 of the load handling device 100 via the chassis 330. As mentioned above, the upper brace or traveller 312a of the direction change linkage-set is fixed vertically (z-direction), while the lower brace 312b is able to move vertically in response to a horizontal movement of the upper brace 312a. The lower brace 312b is fixed to the wheel chassis 300, thus the direction change linkage-set 300 is able to raise and lower respective wheels 116, 118. The vertical movement of the chassis 330 is guided by skeleton members 331 located at the corners of the load handling device.

It will be appreciated that the linkage-sets 300 may be reversed or arranged in mirror image compared with the illustrations of FIGS. 30-33. As may be seen in FIG. 35, the linkage-sets 300 for the x-direction wheels 116 are a mirror image compared with the linkage sets 300 for the y-direction wheels 118.

In this way, when the wheels 116, 118 are being driven, the linkage-sets 300 will be in the position illustrated in FIG. 33c with the primary linkage 311 substantially vertical. Advantageously, in this position, the linkage-set 300 and the weight of the load handling device carried through the linkage-set 300 is directed through the linkage members 311, 313 rather than through the pivots 314, 315, 316.

As will be apparent, as the linkage-sets 300 move between wheels up, parked and wheels down positions, the distance between the wheels 116, 118 and the body 102 of the load handling device changes. The change of height of the wheels may put additional tension on the drive belt 271, or the change of height may cause the drive belt 271 to become slack (the drive belt arrangement is discussed in more detail below). The geometry of the two-part linkages may be selected to advantageously limit or avoid the additional tension put on the drive belt 271.

FIGS. 36a and 36b compare the tension in the drive belt caused by a direction-change action, of a single member linkage (FIG. 36a) with a two-part linkage (FIG. 36b) having a geometry similar to that described above. In the graphs, force on the drive belt is shown on the x-axis, while wheel height is shown on the y-axis. For both graphs, a plot for the x-direction, and a plot for the y-direction are drawn using a single member linkage. At+/-1, one set of wheels 116, 118 is raised while the other set of wheel 118, 116 respectively is engaged with the track.

In FIG. 36a, where the plots cross, on the zero line, both sets of wheels are engaged with the track i.e. park position. As may be seen, the plots follow a sinusoidal path, dipping below the zero line. The difference between the zero line and the minima represents the maximum additional force which is put on the drive belt during a direction-change action. The value of the maximum additional force is dependent on the length of the single member linkage or compliant mechanism. As illustrated in FIG. 36b, by adopting a two-part linkage, the plot follows a complex compound path. The path is dependent on the relative lengths between the first linkage member 311 and the second linkage member 313, and dependent on the rotation limits on the pivot points 314, 315. The path will follow a first path 1 while a first pivot point is rotating, and when the rotation limit is reached the path will inflect and follow a second path 2 according to rotation about a second pivot point. At the park position, the wheels are slightly raised. The path then continues to re-join the sinusoidal path and follow a single member movement. This compound path can be arranged to avoid dipping below the zero line during a direction-change function, and accordingly, avoid putting additional tension on the drive belt.

It will be appreciated that additional motors may be used for each direction-change compliant mechanism 110, 300 or for groups of direction-change compliant mechanisms. Such an arrangement may provide redundancy for the direction change assembly, additional torque for operating the direction change assembly or to avoid the need for a transfer belt 108 that completely circumnavigates the load handling device skeleton 102.

It will be appreciated that where more than one motor is used, they may be operated independently. However in order to efficiently change direction the motors are coordinated to operate synchronously to raise and lower each set of the wheels simultaneously.

It will be appreciated that variations in the arrangement of the direction change assembly may result in similar characteristics and are within the intended scope of the invention.

The compliant mechanism(s) 110, 300 may be operated by a motor or solenoid or worm gear or lead screw mechanism or any suitable means housed within the device skeleton 102 for providing input forces $F_1$ and $F_2$, in respectively first and second directions.

As noted above, each load handling device is fitted with two sets of wheels 116, 118, which run on rails provided at the top of the frame of a storage system of the type described above. The first wheel set 116 or the second wheel set 118 is driven to enable movement of the vehicle 102 in x- and y-directions respectively along the rails. The wheels 116, 118 are arranged around the periphery of a skeleton 102 of the load handling device.

FIGS. 10-13 illustrate a wheel 150 for use in the first and second wheel sets 116, 118 on a load handling device as described herein.

The wheel 150 has a sandwiched layer construction, with each layer imparting different optimised characteristics to the wheel. Between the hub and the rim, the spokes are arranged in a network 155.

The central, inner or first-type layer 151 (FIG. 11) has a number of radial spokes 156 connecting the hub to the rim. The design of the central layer spokes is to optimise compressional strength. The rim has a plurality of gear teeth 157 for cooperating with a drive belt. The first-type layer 151 may be made from a stiff and load bearing material such as epoxy. Thus, the first-type layer 151 is part of the drive train.

The outer or second-type layers 152 (FIG. 12) are fitted to each face of the central layer 151 and have slightly larger diameter than the central layer 151 to create a channel 153 therebetween, with the gear teeth 157 of the central layer 151 at the bottom of the channel 153. Thus, when a drive belt is received in the channel 153 it will tend to remain in position to engage with the gear teeth of the central layer 151.

The spokes 159 of the outer layers 152 are curved and arranged to form a mesh 158. A first set of spokes 159a is curved in a clockwise direction, and a second set of spokes 159b are curved in an anti-clockwise direction overlapping with the first set of spokes. The two sets of spokes are joined or fused where they cross. The inner layer spoke arrangement is to optimise for torsional stiffness.

The outer layer spoke arrangement is to maximise torsional stiffness while also allowing radial deflection. In some examples, the spoke arrangement for the inner layer and the outer layer may be the same shape. Generally, the inner layer, will be made from a stiffer material than the outer layer and with a thick shell or rim to reduce radial deflection.

Figure 12:
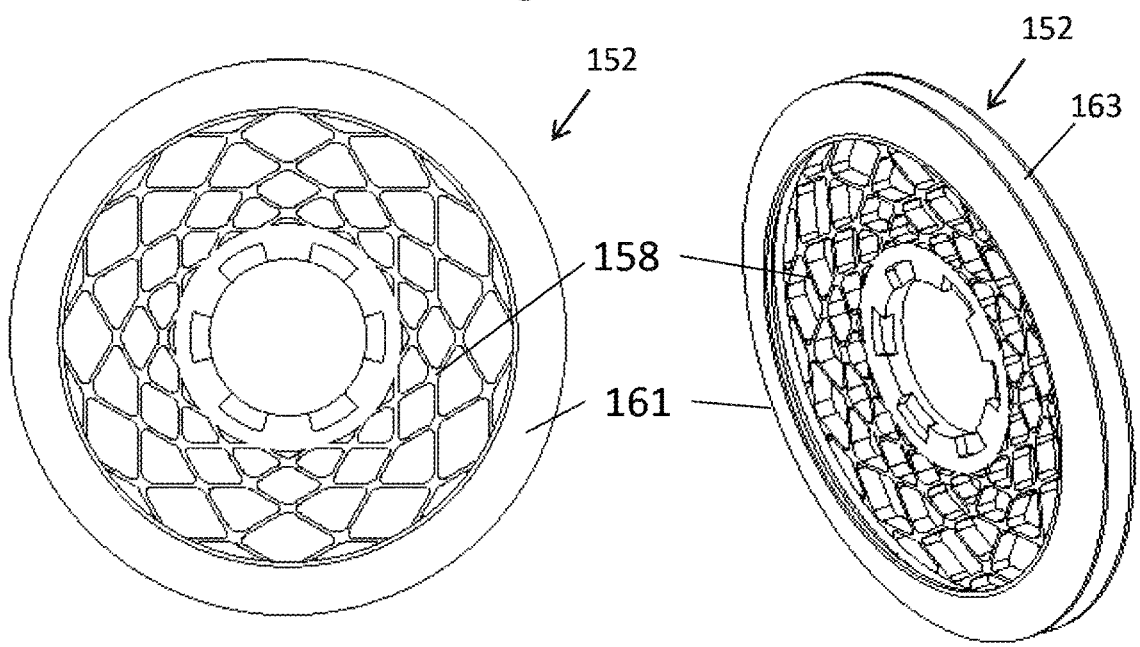
Figure 13:
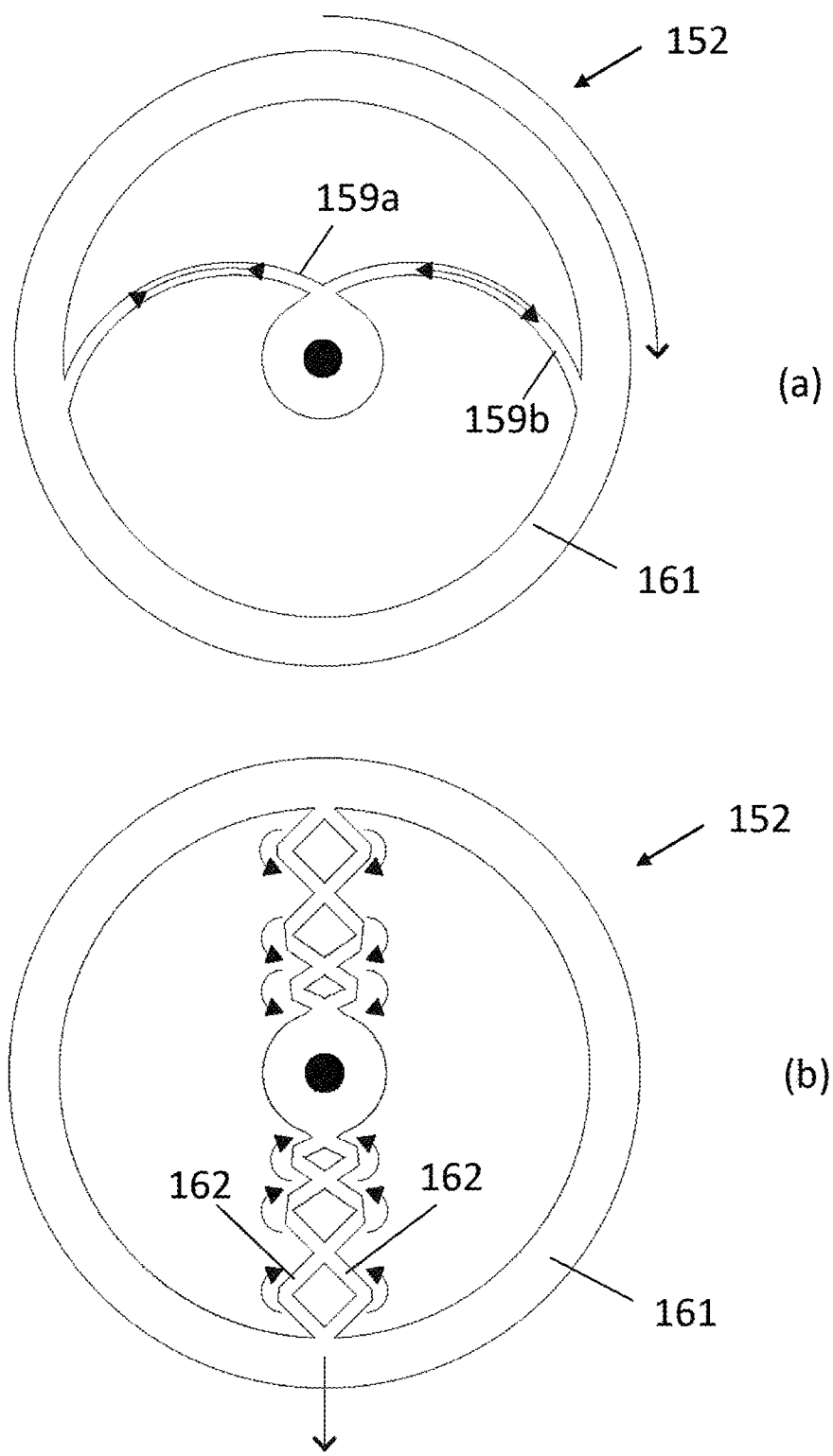

FIG. 13 shows a portion of a spoke 159 of the wheel outer layer 152 of the type shown in FIG. 12. Further, FIG. 13 indicates force directions of the wheel in use. In FIG. 13a, for simplicity, a single clockwise curved spoke 159a and a single anti-clockwise curved spoke 159b are shown extending from the hub 160 to the rim 161. When a rotational force is applied to the wheel, as indicated by the arrow around the circumference of the wheel, the force is transmitted in the directions indicated along the spokes 159. In FIG. 13b, for simplicity, a radial portion of spoke mesh 158 is shown which comprises segments 162 between node points of several clockwise curved spokes 159a and a corresponding number of anti-clockwise curved spokes 159b. When a compressional force is applied to the second-type layer 152, as indicated by the downwards arrow at the bottom of the wheel, opposed rotational forces are transmitted at each node of the mesh section.

The rim 161 of outer layers 152 is deeper relative to the rim of the central or inner layer 151. The outer surface of the rim is angled relative to the plane of the wheel, each side forming one half of a "V" providing a relatively smooth surface. This helps to ensure that the wheels stay within the tracks or rails of the storage system grid, and run smoothly between grid spaces. The outer layer 152 may be made from a nylon material, to allow the outer layers 152 to flex and because of a relatively low coefficient of friction so that the rim slides or rolls smoothly along the tracks or rails. The flexibility of the outer layer 152 provides the wheel 150 with a degree of shock absorption and suspension.

The spoke mesh 158 may be considered a compliant mechanism. Thus, the outer layer may be known as a spring section.

At the circumference edge of the outer layers there is provided a groove 163 for receiving an O-ring 164. The O-ring 164 may be made of a relatively compliant material such as rubber for providing traction or grip between the wheels 150 and the track and for absorbing bumps in the track between grid spaces. The O-ring 164 may be thought of as the tyre for the wheel 150. The flexibility of the outer layer 152 may decrease wear of the O-ring.

In addition to their different geometry, the central and outer layers may impart different characteristics through use of different materials. For example, the curved spokes may be made from a relatively flexible material compared with the radial spokes, to impart some suspension into the wheel—in addition to any suspension imparted by the O-ring. Further, the rim and hub may be made of relatively stiff material to support maintenance of the wheel shape.

A hub 160 is fitted through each of the layers of the wheel and at the centre has a bearing for rotatably mounting the wheel 150 to an axle on the load handling device skeleton 102. This allows the wheels 150 to be readily interchanged should they become worn out or damaged during use.

Pairs of wheels 150 may be coupled to the skeleton 102 by a wheel chassis 165 as illustrated in FIG. 14. The chassis 165 extends between the first and second wheels 150 and comprises first and second axle mounts 166 and helps to maintain the relative position between the first and second wheels 150. In this way, the entire chassis arrangement 165 may move in a vertical z-direction as the direction change assembly is operated. Alternatively, the first and second wheels 150 may move relative to the chassis arrangement 165, for example, along a slot in the chassis, so that the chassis is fixed relative to the skeleton body 102 of a load handling device.

The sets of wheels 116, 118 further comprise part of the drive assembly for load handling devices to enable the load handling device to move on a grid. A drive belt assembly 170 is provided for each set of wheels 116, 118.

The drive belt assembly 170 comprises a drive belt 171 pulley gear arrangement for engaging with the toothed edge of a pair of wheels 116, 118 on one side of the load handling device 100, as illustrated in FIG. 15. A toothed drive belt 171 engages with both of the wheels 150. The drive belt 171 is guided by a slave-wheel 172 mounted on the load handling device skeleton 102, and two tensioning wheel arrangements 173. The tensioning wheel arrangements 173 are movably mounted to the load handling device skeleton 102 with springs (not shown), and are intended to keep the drive belt 171 taut and maintain engagement of the drive belt 171 with the wheels 150. A drive wheel 174 is provided, mounted to the load handling device skeleton 102.

The drive wheel is driven by a pulley and gear arrangement 175 which is linked to the axle of a motor (not shown in FIG. 15).

The load handling device 100 is provided with drive assemblies 170 for each pair of wheels 150. The pairs of wheels on opposed sides comprise a set of wheels 116, 118. The drive wheels 174 on opposed sides of the load handling device may share a common motor axle so that each pair of wheels 150 are driven at the same time and at the same speed. As a result only a single motor is required to drive the load handling device 100 forward and reverse in a first x-direction, and only a single motor is required to drive the load handling device 100 forward and reverse in a second y-direction. This arrangement may advantageously reduce the cost in terms of space in the load handling device and the number of parts required. The first set of wheels 116 and the second set of wheels 118 may be selectively driven under the control of the load handling device.

In the arrangement of FIG. 15, it will be appreciated that when the set of wheels 116, 118 are moved out of position for engagement with the grid track, the drive belt may become slack because the distance between the upper portion of the drive belt assembly 170 and the wheels changes as the wheels are lowered and raised. Accordingly, depending on the direction-change assembly selected, additional tensioning mechanisms may be required. For example, an idler pulley on a mechanical linkage connected to the direction-change assembly may be employed to keep the notional drive belt length constant throughout the full range of motion of the direction-change assembly.

An alternative drive belt assembly 270 is illustrated in FIGS. 21-24. Similarly to the drive belt assembly 170, a drive belt assembly 270 is provided for each set of wheels 116, 118 or face of a load handling device 100. The upper portion of the drive belt assembly 270 is mounted on an upper portion of the load handling device skeleton 102. The lower portion of the drive belt assembly 270 extends around the wheels 116 or 118 mounted on a chassis 165 or lower portion of the load handling device skeleton 102.

Similarly to the arrangement illustrated in FIG. 15, the drive belt assembly 270 comprises a drive belt 271 pulley gear arrangement for engaging with the toothed edge of a pair of wheels 116 or 118 on one side of the load handling device 100. A toothed drive belt 271 engages with both of the wheels 116 or 118 which are typically of a wheel type 150 described above. The drive belt 271 is guided by a slave-wheel 272 mounted on an upper portion of the load handling device skeleton 102. The drive belt assembly 270 further comprises tensioning means. The tensioning means may also be referred to as pre-tensioning means.

It will be appreciated that when the direction change mechanism 110 raises the wheels 116 or 118, the length of the belt path becomes shorter because the vertical distance between the upper portion of the device skeleton, where the direction change mechanism 110 is mounted, and the wheels 116 or 18 is decreased due to the vertical motion of the wheels 116 or 118 between wheels down and wheels up positions. If the drive belt were not otherwise tensioned or pretensioned then it would become slack and would risk losing touch with the drive wheel 175, 275 and the driven wheels 116 or 118. Such a loss of touch situation could disable the drive belt assembly 170, 270 of the load handling device. Furthermore, the loose drive belt 171, 271 could become caught on devices operating on adjacent tracks.

An upper portion of the tensioning means is mounted on the upper portion of the device skeleton 102, where a direction change mechanism 110 is mounted also, and is coupled with the direction change mechanism 110.

A first arm 273 of the tensioning means extends from one end the direction change mechanism 110, having an elbow at a mid-point and a guide wheel at the distal end. The first arm 273 is able to rotate about a pivot point at the mid-point elbow between positions. A second arm 274 is rotatably mounted to the device skeleton 102 at a pivot point located beside the direction change mechanism 110 at the opposite end to the first arm 273. The second arm 274 has a guide wheel at the distal end.

Further parts of the tensioning means are mounted on the chassis 165 or lower part of the skeleton 102. Fixedly mounted slave wheels 276 direct the drive belt 271 from the wheels 116 and around a pulley 277. Pulley 277 may be moved in the direction indicated by the arrow to adjust and or measure the path length of the drive belt 271. It will be appreciated that additional slave wheels 276 may be used.

Typically a fixed belt length is used and the path length of the belt is adjusted with additional pulleys to fine tune the path length to substantially match the fixed belt length. It will be understood that the belt may stretch under tension, and this is factored into the geometric design of the drive belt assembly.

As may be seen in FIG. 22 which shows a perspective view of the tensioning means, the drive belt is threaded through the first and second tensioning arms 273, 274. The rotating portion of the first arm 273 and the second arm 274 are biased to the wheels up position as shown in FIGS. 23c. The arms 273, 274 may be biased by any suitable biasing means such as a simple spring arrangement. In the neutral or parked position, the direction change mechanism 110 is positioned substantially at the centre of its range of movement. In the neutral position the distal end of the arm 273 is angled slightly from the axis of the end fixed to the direction change mechanism. The second arm 274 is at rest, angled slightly down from the upper portion of the skeleton body 102. The drive belt 271 is arranged to move over the guide wheel at distal end of the of the first arm 273 with reduced directional force from the guide wheel, and the drive belt 271 is arranged to move over the guide wheel at the distal end of the second arm 274 with reduced directional force from the guide wheel. In the neutral position the drive belt 271 is engaged with the drive wheel 274 and the driven wheels 116 but is not relatively taut nor relatively slack, i.e. the drive belt 271 is not pretensioned.

When the wheels 116, 118 are in a lowered or down position to engage with a surface or rack as controlled by the direction change mechanism 110, as shown in FIGS. 23a, 24a for the y–direction wheels 118 and 24c for the x-direction wheels 116, the direction change mechanism 110 is moved across to be positioned closer to the second arm 274. In this position, the distal end of the first arm 273 is rotated at the elbow in the opposite direction about the pivot point compared with the neutral position. The drive belt 271 is arranged to move over the guide wheel at distal end of the first arm 273, and the guide wheel is pulled against the drive belt 271 exerting a force on the drive belt 271. The drive belt 271 is arranged to move over the guide wheel at the distal end of the second arm 274, with reduced directional force from the guide wheel. As a result, in the engaged or wheels down position, the tensioning means puts some tension on the drive belt 271 via the first arm 273 to make the drive belt 271 relatively taut or pretensioned. Advantageously, the tensioning means helps to ensure that the drive belt 271 stays engaged with the drive wheel 275 and the driven wheels 116 or 118 when the wheels 116 or 118 are in a down position to engage with a surface or track.

When the wheels 116, 118 are in a raised position so that they are dis-engaged with a surface or track as shown in FIG. 23c, 24c for the y–direction wheels 118 and 24a for the x-direction wheels 116, the direction change mechanism 110 is moved across to be positioned away from the second arm 274. In this position, the distal end of the first arm 273 is rotated with a greater angle in the same direction compared with the natural position. The drive belt 271 is arranged against a further guide wheel at the mid-point elbow of the first arm 273 and the guide wheel at the distal end of the first arm 273. The arrangement of the belt over the first arm 273 in the wheels raised position, increases the length of the path followed by the drive belt 271 on the first side of the tensioning means. As the drive belt 271 remains substantially the same length regardless of the position of the tensioning means and as a result of lengthening the belt path on the first side, the drive belt 271 pulls against the distal end of the second arm 274 to shorten the belt path by an equal amount on the second side of the tensioning means, and as a result the second arm rotates to become more vertically aligned. Advantageously the tensioning means compensates for the decrease in vertical distance between the upper portion of the skeleton 102 and the wheel chassis 165 to keep the belt taut enough so as not to be slack enough to disengage with the drive when 275 nor disengage with the drive wheels 116 or 118.

Advantageously, as the tensioning means is directly linked to the direction change mechanism 110, the tensioning means operates in unison with the direction change mechanism 110. Accordingly, as the direction change mechanism 100 to raise and lower sets of wheels 116 and 118 respectively no additional control or separate actuation functionality is required to tension the drive belt 271.

Considering the tensioning means in use during a transition from wheels 118 up to wheels 118 down (i.e. from FIG. 24c through FIG. 24b to FIG. 24a), to begin, the elbow joint is bent downwards and the belt 271 is pulled inwards on the first and second sides by the biasing means. The biasing means exerts a relatively small force, just enough to stop the belt 271 going slack and ensure the belt teeth are meshed with the various pulleys (FIG. 24c).

During a transition, the load is transferred from the first set of wheels 116 to the second set of wheels 118. Around the half way through a transition the direction change motor is working hardest or at its peak load to perform the wheel change necessary for a direction change operation. During this time, the belt 271 is relatively slack. The tensioning means adds additional work on the direction change motor to rotate the elbow joint of the first arm 273 against the biasing means. As the second set of wheels 118 start to carry the load of the device, the elbow is pulled straight so that the axis distal end of the arm 273 and the fixed end of the first arm 273 are substantially aligned, the guide pulley at the distal end pulls directly on the belt 271 belt exerting a relatively large pre-tensioning force (FIG. 24b).

Finally, when the load has been transferred to the second set of wheels 118, the elbow is pulled to the rotated position by the biasing means to keep the belt 271 from going slack (FIG. 24a).

It will be appreciated that the positioning of the elbow on the first arm 273 allows the tensioning means to be tuned to control the point at which the largest force for the belt 271 pre-tensioning means is required.

By separating direction change mechanism 110 force requirement, and the tensioning means force requirement, advantageously, it is possible to minimise the size of motor required.

It will be apparent, that the tensioning means may be alternatively tuned and biased to a wheels down position or parked position rather than a wheels up position. It will be appreciated that alternative tensioning means may be employed.

The tensioning means is intended to keep the drive belt 271 taut and maintain engagement of the drive belt 271 with the wheels 150, 116 when the wheels are positioned to be engaged or dis-engaged with the surface, and when the wheels are in a neutral position or transitioning between engaged and disengaged positions.

As is known, ideally for a belt drive assembly to be effective six teeth between the drive belt and the drive wheel should be in contact. This may be ensured by including additional wheels to provide a mega-drive assembly.

During operation of the drive arrangement 270, the drive belt 271 is driven by drive wheel 275. The path of the drive belt 271 onto the drive wheel 275 is assisted by mega-drive wheel 278. Mega drive wheel 278 is positioned adjacent to the drive wheel 275 and directs the drive belt 271 so that an increased number of teeth are engaged between the drive wheel 275 and the drive belt 271 compared with when no mega drive wheel is present. Typically, around 6 or more teeth of the drive belt 271 are engaged with the drive wheel 275 when a mega drive wheel 278 is used.

As is known, in a gear tooth drive arrangement, backlash is an error in motion that occurs when the direction of drive changes from forward to reverse, or vice versa. This exists because there is always a small gap between the training face of the drive tooth and the leading face of the tooth behind it on the driven belt, and that gap must be closed before force can be transferred in the new direction. The amount of backlash is dependent on the size of the gap. In an ideal drive belt/wheel gear arrangement there would be no gap between the teeth of the drive belt and the teeth of the wheel.

However, this would require perfect manufacturing, and uniform dimensional characteristics throughout the system. Where a drive belt is used, additional backlash may be introduced by stretching of the belt. At least some of the backlash that occurs during forward and reverse direction changes may be compensated by the wheel spoke design. Accordingly, it will be appreciated that a suitable material should be selected. For example, the drive belt 171 may be made from polyurethane, rubber reinforced with steel strands, rubber reinforced with fibres etc. FIG. 25 illustrates a top planar view of a load handling device showing a drive motor arrangement suitable for driving the drive assembly 170 or 270. A first drive motor 290 is coupled to a first drive shaft 292 via a first gear arrangement 291. The drive shaft extends across the width of the load handling device in the y-direction to drive assemblies 170 or 270 for driving wheels 116 in the x- direction. The motor 290 is arranged towards one end of the drive shaft 292. As a result the length of the drive shaft 292 to a first side is shorter than the length of the drive shaft 292 to the facing side. As is known, torsional stiffness decreases with length. Accordingly, assuming that both sides of the drive shaft 292 are made from the same material, then the shorter length of drive shaft has a proportionately narrower diameter compared with the longer length of drive shaft to ensure that the torsional stiffness between each side is matched. In an alternative arrangement, the two sides of the drive shaft may be made from different materials to match torsional stiffness. For example, the shorter length may be made from an aluminium rod, while the longer length may be made from a carbon fibre rod with similar diameter. In this way, both facing sides of the load handling device are driven by the same motor 290 and receive the same torsion.

Similarly, an perpendicularly arranged second drive motor 290' is coupled to a second drive shaft 292' via a second gear arrangement 291'. The drive shaft extends across the width of the load handling device in the x-direction to drive assemblies 170 or 270 for driving wheels 116 in the y- direction.

Advantageously, the drive motor arrangement requires only two motors to drive the load handling device in forward and reverse x- and y-directions.

In an alternative arrangement, the drive assembly may comprise four drive motors, one for driving each of the drive assemblies 170 or 270.

Advantageously, the control of the load handling device is simplified because there are a limited number of actions and assemblies required to manoeuvre the load handling device, and accordingly the amount of coordination between actions is reduced. In this arrangement, each of the eight wheels 150 on a load handling device are driven wheels 150.

In larger light weight devices the corners of the load handling device may be multi-functional and have room for mounting and integration of many parts of the load handling device assembly. The drive motors may be mounted in the top section of the boats and or on the corners.

Advantageously, this mounting position required fewer fixtures. Advantageously, this arrangement may allow for shorter cables for power and data conveyance to the actuators. Advantageously, in this arrangement, many of the complex parts of the load handling device are positioned in easily accessible locations and thus maintenance time and labour costs may be reduced.

FIGS. 26-29 illustrate an alternative wheel design 250 for use as the first and second wheel sets 116, 118 on a load handling device as described here. The wheel 250 is intended to be suitable for use with a hub motor. As illustrated, the hub 260 has a relatively large diameter for receiving the hub motor. As a result, the distance between the hub 260 and the rim is reduced, and the spokes 259 are limited to a relatively slim band between the hub 260 and the rim.

The rim of the hub 260 is relatively broad and comprises a number of attachment points 251 for fixing the wheel 250 to a hub motor.

The spokes 259 are arranged to form a truss arrangement. The spokes 259 may be straight or curved, alternating clockwise and anticlockwise. In some arrangements, the spokes 259 may be arranged as two overlapping and oppositely oriented part-spirals. The spoke arrangement is to maximise torsional stiffness while also allowing radial deflection.

Figure 27:
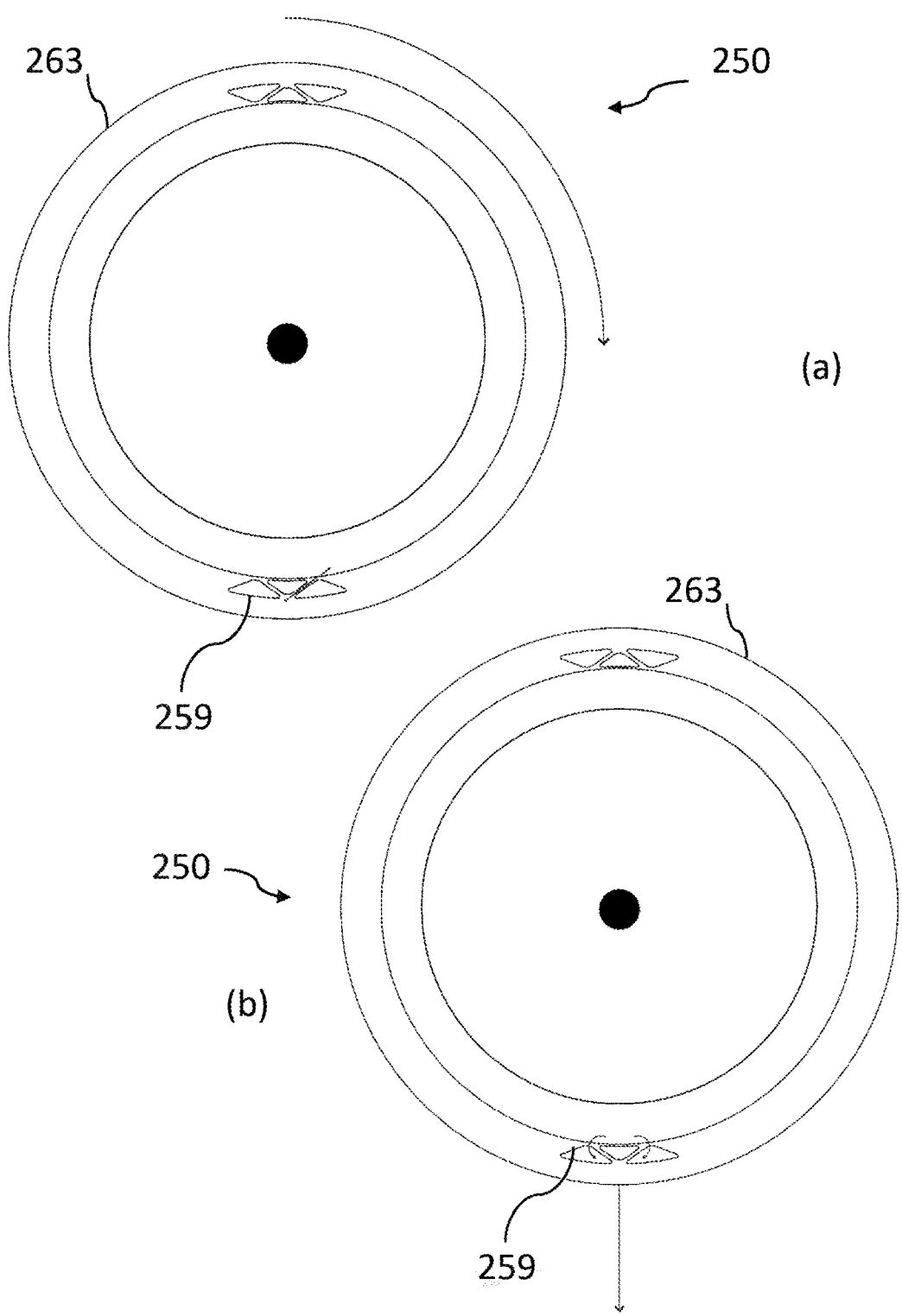

FIG. 27 shows a portion of a spoke 259 arrangement of the wheel outer layer 152 of the type shown in FIG. 26. Further, FIG. 27 indicates force directions of the wheel in use. For simplicity, only a small portion of the spokes 259 are shown, similarly to FIG. 13. Referring to FIG. 27a, when a rotational force is applied to the wheel, as indicated by the arrow around the circumference of the wheel, the force is transmitted in the directions indicated along the spokes 159. Referring to FIG. 27b, when a compressional force is applied as indicated by the downwards arrow at the bottom of the wheel opposed rotational forces are transmitted through each node where the spokes 259 join to the hub rim.

At the circumference edge of the wheel 250 there is provided a series of grooves 263 for receiving a corresponding number of O-rings 264. The O-rings 164 may be made of a relatively compliant material such as rubber for providing traction or grip between the wheels 250 and the track and for absorbing bumps in the track between grid spaces. The O-rings 264 may be thought of as the tyre for the wheel 250. The flexibility of the wheel 250 may decrease wear of the O-rings 264 in use.

The wheel 250 may be made from a single layer, or the wheel 250 may have a sandwiched layer construction, similarly to the wheel 150.

As can be seen in FIG. 26c, considering the wheel 250 in the radial direction between the O-ring 263 tyres and the outer plane of the wheel, there is a slim sandwiched layer 265 providing a gap between the tyres or main body of the wheel 250 and the outer edge plane. This gap allows the wheel 250 to be deformed or "squashed" into a narrower track.

Wheels 250 of the type described in connection with FIGS. 26 and 27 are suitable for being driven by hub motors. Accordingly, wheels of this type would have a direct drive arrangement in use, rather than the belt drive arrangements described elsewhere in this disclosure.

Figure 29:
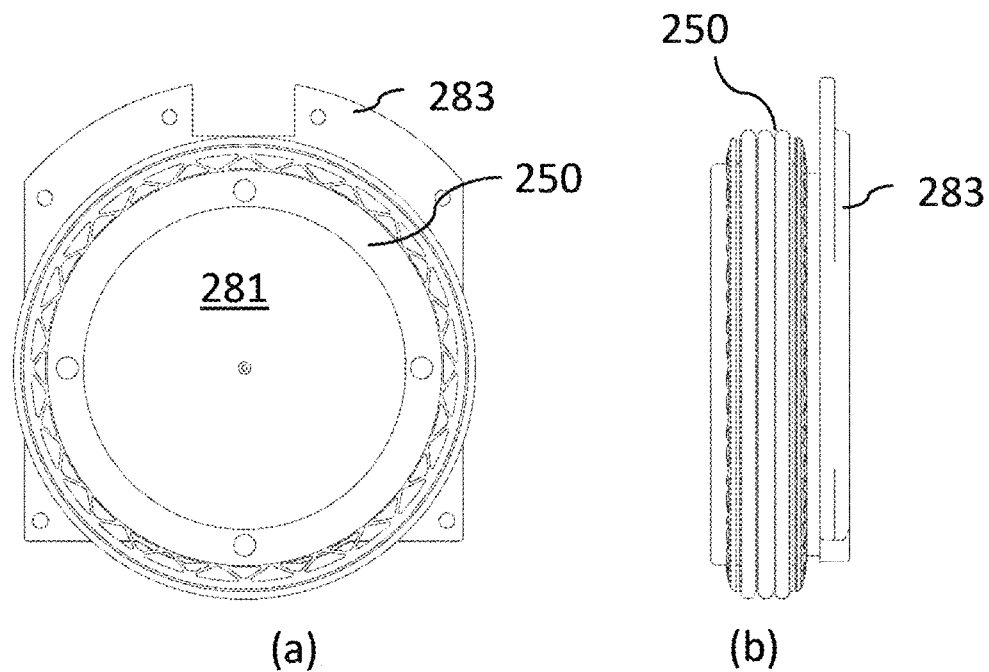

FIG. 28 illustrates a hub motor 280 suitable for use with the wheels 250, and FIG. 29 illustrates the hub motor 280 with a wheel 250 mounted. The hub motor 280 comprises a motor 281, a wheel mount 282 and a mounting plate 283 for mounting the hub motor 280 on to a vehicle.

FIGS. 37-41 illustrate another alternative wheel design 350 for use as the first and second wheel sets 116, 118 on a load handling device as described here.

FIG. 37 shows an exploded view of a wheel 350, showing each of the component parts. Starting from substantially the centre, the wheel 350 comprises a pulley 351. Spring sections or layers 352 are mounted to each face of the pulley 351, and an O-ring 364 is fitted to the rim of spring section 352. First and second torque limiting or contact plates 354 are then fitted together through the central hub of the pulley 351 and spring sections 352. First and second bearings 355 are fitted into the contact plates 354. Finally, a front cap plate 356 is fitted over the bearings 355 and affixed with screws or bolts 357 in to a rear cap plate (not shown). FIG. 38a shows a planar view of the assembled wheel 350, and FIG. 38b shows a sectional view of the wheel 350 taken through line X-X of FIG. 38a. As may be seen in the sectional view, a channel 353 is located between the O-rings 364.

As discussed herein, the channel 353 may receive a drive belt which engages with the teeth of the pulley 351 to drive the wheel 350. As discussed above, the O-rings 364 engage with a track or surface to support the load handling device to which they are attached.

Figure 39:
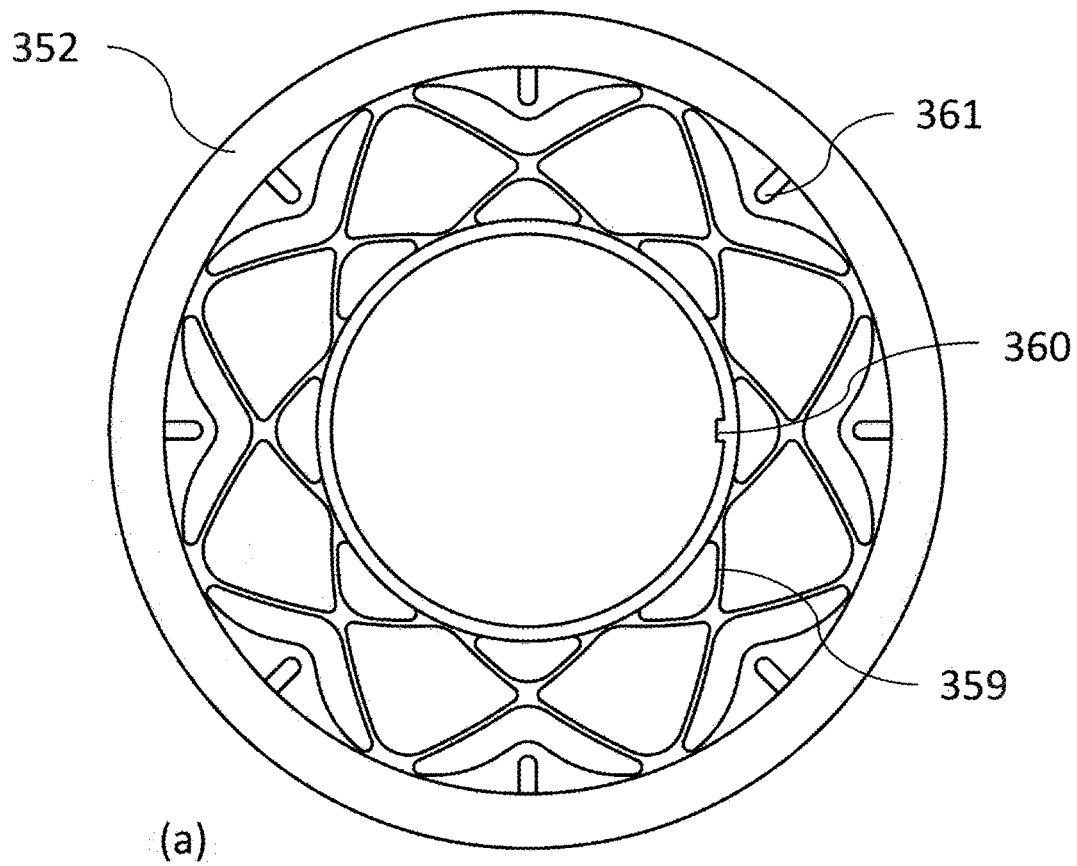
Figure 39:
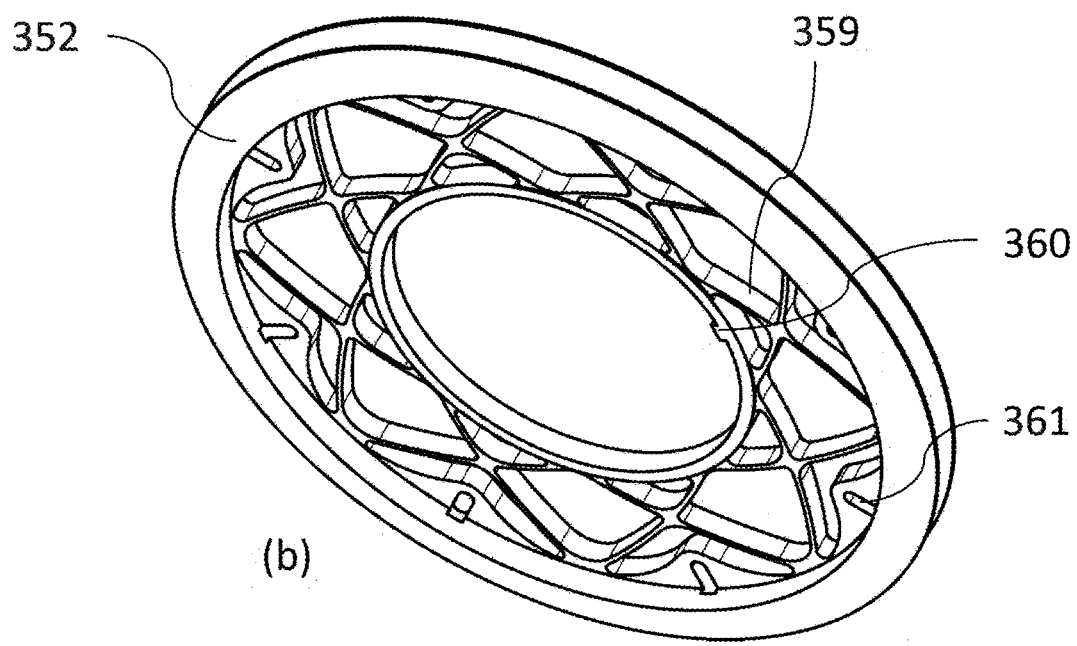

FIG. 39 shows the spring layer 352 of the wheel 350 in more detail, as a planar view FIG. 39a and a perspective view FIG. 39b. Similarly to wheels 150, 250 described above, the spokes 359 are curved in clockwise and anti-clockwise directions to form a network or mesh for transferring forces between the rub and the rim. The spring layer 352 will be made from a resilient material, thus, enabling the spring layer 352 to bend and deform. The inside circumference of the spring layer 352 comprises a notch 360 which locates in a groove 358 of the contact plates 354. Further, towards the outside edge of the spoke section, the spring layer 352 comprises a number of regularly spaced grooves 361 for fitting together with similarly spaced protrusions 362 on the front and back faces of the pulley 351, seen in FIGS. 37 and 40. It will be appreciated that the groove and notch or protraction pairs ensure that the wheel is properly aligned when assembled and may be quickly assembled by hand, by a technician for example.

FIG. 40 which shows the pulley layer 351 in plane view and more detail, where the cog teeth around the circumference; protrusions 362 slightly inside the circumference and regularly spaced around the face; and a notch 363 for locating in the groove 358 of the contact plates 354 (similarly to the notch 360).

Figure 41:
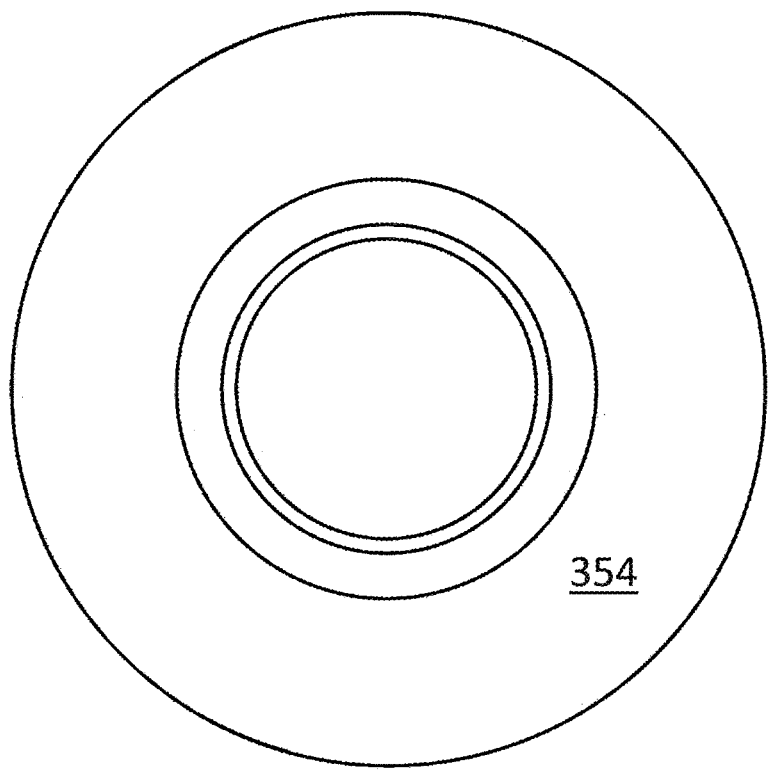
Figure 41:
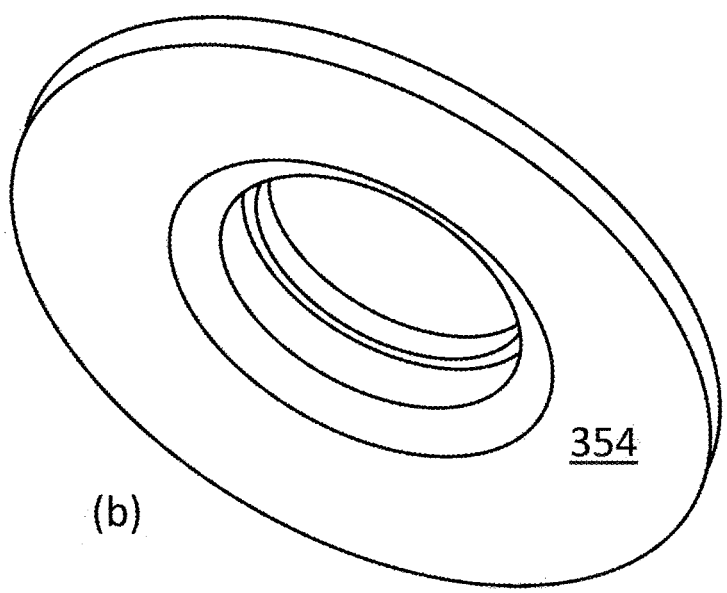

Finally, FIG. 41 shows the contact plate 354, as a planar view FIG. 41a and a perspective view FIG. 41b. It will be appreciated that the contact plate 354 limits the outward being of the spring section 352. Further, the contact plate 354 assists in preventing the spokes 359 from catching on nearby objects.

Referring back to FIG. 38a it will be appreciated that the diameter of the contract plate 354 is slightly smaller than the diameter of the spoke section. In this way, the rim of the wheel 350 may be allowed to deflect inwards, for example, to compensate for narrowing or misalignment of the track.

It will be appreciated that the notches 360, 363 and groove 358, and the grooves 361 and protrusions 362 assist in properly aligning the layers of the wheel 350, and ensuring that a drive force applied to the circumferential cog teeth of the pulley 352 is transferred to the spring layers 352 for driving a load handling device.

It will be appreciated that while certain features of the wheel have been described in connection with FIGS. 10-15, 21-25, other features have been described in connection with FIGS. 26-29, and further features in connection with FIGS. 37-41, a combination of features from any of the figures and related description are anticipated by the inventors. For example, a belt driven wheel may comprise plural O-ring tyres, or a hub motor driven wheel may have a layered construction.

In a variation to the wheels 150, 250, 350 illustrated and described, it will be appreciated that the wheel may be asymmetric along the axis, that is, the wheel may comprise a spring layer only on one side of the support or pulley layer, for example.

As noted above, the load handling devices typically comprise a space or skeletal void for receiving a container. The cavity is sized such that enough of a container can fit inside the void to enable the load handling device to move across the grid on top of the storage framework without the underside of the container catching on the grid or another part of the storage framework. When the load handling device has reached its intended destination, the container-lifting mechanism controls lift tapes to lower the gripper assembly and the corresponding container out of the load handling device and into the intended position.

The intended position may be a stack of containers or an egress point of the storage framework, or an ingress point of the storage framework if the load handling device has moved to collect a container for storage in the storage framework.

Various lifting assemblies are described in GB2001012.0 Ocado, which is incorporated herein by reference.

FIGS. 16 and 17 show representations of lifting assemblies 180, 190 of a load handling device 100 for raising and lowering a container 10. The lifting assembly 180, 190 comprises a gear 182, 192 and motor 181, 191.

Extending through the gear 182, 192 a common axle 183, 193 extends to first and second hoist drums 184, 194, around which lifting tape 185 is wound. A first end of the lifting tape is attached to the hoist drums 184, 194, and the second end of the lifting tape is attached to a gripper plate. Slave wheels 186 are used to guide the lifting tape 185 to the gripper plate attached to the ends of the lifting tape 185 and/or to adjust the tension in the lifting tape 185. The gripper plate is used to latch to a load, which may then be lifted and lowered by the lifting assembly 180, 190.

In the case of the assembly 180 shown in FIG. 16, first and second lifting tapes 185 are wound alternately around the drums 184. Thus, when the first and second drums 184 are rotated by the motor 181 to lower the gripper plate, both tapes 185 unwind at the same time and at the same speed. In reverse, the lifting tapes 185 wrap or coil around the hoist drums 184 at the same time and speed, thereby lifting a weight or payload supported by the gripper plate.

In the case of the assembly 190 shown in FIG. 17, first and second lifting tapes 185 are wound around respective drums 194 at each end of the axle 193.

For both assemblies 180, 190, at each end of the axle 183, 193, the tapes 185 unwind from the top and bottom of the drum 184, 194 respectively to balance the forces applied to the assembly.

It will be appreciated that the diameter of the drum 184 is necessarily larger than the respective drums 194 for a given length of lifting tape 185. Correspondingly, the gear 182 is larger than the gear 192, and the required torque produced by motor 181 is larger than the required torque produced by motor 191.

The lifting assembly 180 has the advantage that fewer parts are required. The lifting assembly 190 has the advantage that the drums 194, gear 192 and motor 191 are smaller. In both cases, the space required within the body of the load handling device 100 by the lifting assembly may be minimised.

The illustrated lifting arrangement has various advantages, including that: cost and space within the body of the load handling device may be saved relative to arrangements incorporating more motors; the rates of winding and unwinding of the spools or hoist drums 184, 194 do not need synchronising, as they are all driven by the same motor 181, 191, allowing them to be wound and unwound at the same rate without additional gearing, control or other intervention; only a single control unit is required to control the raising and lowering of the hoist drums 184, 194.

As will be discussed in more detail below, the gripper plate attached to the distal ends of the lifting tapes 185 has one or more gripper assemblies mounted thereon for latching to a storage container. The components of the lifting assembly may be mounted directly on or indirectly on a frame that is releasably mountable on a load handling device. For example, the lifting assembly may be mounted on crossbeams or rods which sit in brackets mounted on the skeleton of the load handling device. The bracket may be 3-D printed and optimised for weight. Thus, the lifting assembly is used to lift containers into the skeletal void of the load handling device. It will be appreciated that the lifting assembly used in reverse is used to lower containers from the load handling device to a position in a stack below the grid.

Configuring the lifting assembly for releasable mountability on the load handling device may advantageously mean that lifting assembly can be easily removed and replaced with another lifting assembly (e.g. if the first assembly needs to be serviced or repaired), allowing the corresponding load handling device to return to service relatively quickly.

A communications cable reel may also be mounted on the lifting assembly for transmitting control instructions from a control unit to the gripper assemblies. The communications cable may transmit sensor data to the control unit, for example, to ensure that the gripper plate is latched to the container. The communications cable is also raised and lowered with the gripper plate.

In an alternative arrangement, communication between the lifting assembly and the control facilities may be wireless. The operation of the lifting assembly or TGA (tote gripping assembly) may be semi-autonomous.

Before the lifting assembly raises or lowers the gripper assembly and any engaged container, the direction-change mechanism preferably ensures that the first set of wheels 116 and the second set of wheels 118 of the load handling device are both engaged with respective tracks. This may provide additional stability as the lifting assembly is raised and lowered, and may additionally help to ensure that any malfunction in or more of the wheels which would cause the load handling device to move along the tracks is counteracted by the other set of wheels being in contact with the tracks. This may avoid damage to the storage framework if the load handling device attempts to move while the gripper assembly is in a lowered configuration.

The gripper plate comprises at least one gripper assembly arranged to be aligned with recesses or holes in the upper surface of a storage container such that the gripper assembly may latch to the storage container. More usually the gripper plate will comprise two or more gripper assemblies. Typically the gripper plate will comprise four gripper assemblies arranged in locations to correspond to cooperating recesses of a container.

Figure 19:
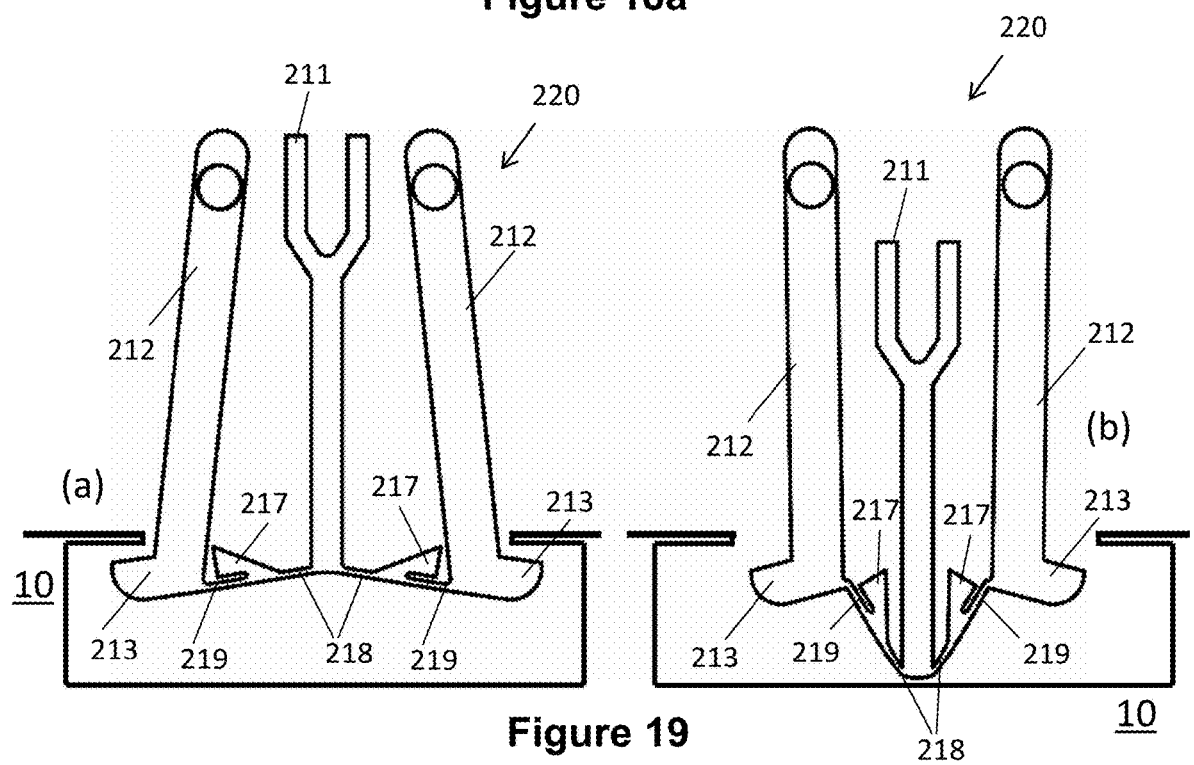
Figure 18:
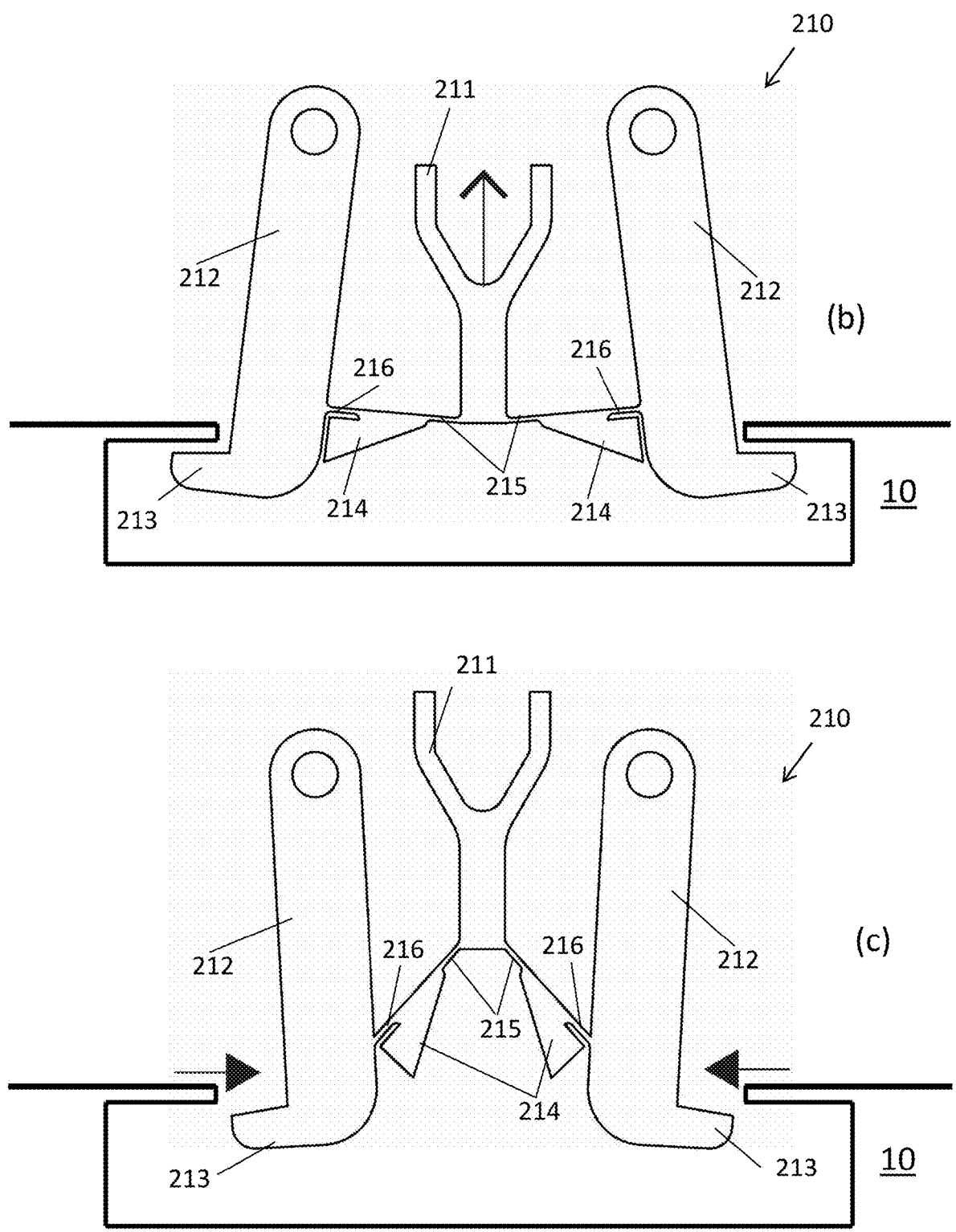

FIGS. 18-19 illustrate a self-locking gripper assembly for use on the load handling devices described here. The gripper assembly comprises a flexure mechanism 210 movable between bi-stable locked and release configurations. The flexure mechanism 210 comprises an actuator 211, two gripper-arms 212 having hook-ends 213 and two flexural hinge arrangements connecting the gripper-arms 212 to the actuator 211. The flexural hinge arrangements each comprise a triangular keystone-form 214, a first deformable section 215 between the actuator and the keystone-form and a second deformable section 216 between the keystone-form and the gripper-arms 212. The deformable sections 215, 216 are relatively thin sections compared with the other sections of the flexure mechanism 210. In this way, the deformable sections preferentially bend or flex when an appropriate force is applied to the flexure mechanism 210.

Referring to FIG. 18, in the locked configuration (FIG. 18a) the keystone-forms 214 engages or abuts the respective gripper-arms 212. In the locked configuration the flexure mechanism 210 is open or wide and the gripper-arms spread. The flexure mechanism 210 may be moved into the locked configuration by applying a downward force on the actuator 211 as indicated by the solid arrow in FIG. 18a. The actuator 211 is in a downward position relative to the gripper-arms 212.

The flexure mechanism 210 may be moved into the unlocked or release configuration by applying an upward force or pulling force on the actuator 211 as indicated in FIG. 18b. When such a force is applied, the first and second hinges 215, 216 bend or flex, releasing the keystone-form 214 from engagement with the gripper-arms. The first hinges 215 bend so that the keystone-forms pivot downward relative to the actuator. The second hinges 216 bend so that the keystone-forms 214 pivot upwards relative to the gripper-arms 212. Thus, the actuator moves 211 to an upward position relative to the gripper-arms 212 which draws the hooked end 213 of the gripper-arms together, as indicated by the solid arrows in FIG. 18c, into a narrow or closed arrangement.

An alternative arrangement of the gripper having flexure mechanism 220 is illustrated in FIGS. 19a and 19b— similar features are indicated with the same reference numerals. In FIG. 18, the keystone-form 214 is connected to the gripper-arms 212 spaced apart from the hook-ends 213 of the arms. The keystone-form 214 extends below the line between first and second hinges 215, 216. In the alternative arrangement shown in FIGS. 19a and 19b, the keystone-form 217 is connected to the gripper-arms 212 substantially at the hook-end 213. The keystone-form 217 extends above the line between the first hinge 218 and the second hinge 219.

FIG. 19a shows the flexure mechanism 220 in locked configuration with the keystone-forms 217 engaged with the respective gripper-arms 212. In FIG. 19b the flexure mechanism 220 is in release configuration. In this case, the actuator 211 is in a downward position relative to the gripper-arms 212, and the first and second hinges 218, 219 flex in the opposite direction compared with the first and second hinges 215, 216 of FIG. 18. Thus, the flexure mechanism 220 may be moved into the locked configuration by applying an upward force to the actuator 211, and the flexure mechanism 220 may be moved into the unlocked or release configuration by applying a downward force or pushing force on the actuator 211.

As mentioned above, the gripper assembly is for latching to a storage container 10 so that the storage container may be lifted. The gripper assembly is arranged to be compatible with the storage container 10. Typically storage containers 10 have recesses around the edge of the container on the upper faces.

In use, in the narrow or flexed configuration, the flexure mechanism 210 is inserted into the recess. Once inserted, a downward force may be applied to the actuator 211 as indicated by the solid arrow in FIG. 18a. This puts the flexure mechanism 210 into the locked configuration, and the flexure mechanism 210 is wide. It is then not possible to remove the flexure mechanism 210 from the recess of the container. The hooked end 113 of the gripper-arms engages with the underside of the upper surface of the container 10. Therefore, a lifting force may be applied to the gripper-arms 212 to lift the container.

It will be appreciated that the flexure mechanism 220 may be used with containers 10 by applying the opposite forces to the actuator 211.

In use, as part of a load handling device, the gripper assembly(ies) 210, 220 are mounted on a gripper plate. Lifting tape(s) 185 are attached to the gripper-arms 212. The actuator 211 may be operated by a solenoid motor, or electromagnet for example.

In use with a load handling device, grippers 210, 220 are used at each corner of a container 10, to latch the lifting assembly 200 to the container 10. The lifting assembly 200 is then operated to lift the container 10 into the skeletal void of a load handling device 100 so that the container 10 may be transported by the load handling device. FIG. 20a illustrates a load handling device without a container, and FIG. 20b (and FIG. 5) illustrates a load handling device having a container lifted into the void.

It will be appreciated that the gripper assembly 210, 220 may have more than two gripper-arms and a corresponding number of flexural hinge arrangements arranged around the actuator. In some arrangements, additional gripper-arms may provide more secure attachment to the storage container.

The arrangement allows a single motor to cause the lifting and lowering of the gripper plate, although it will be apparent from the foregoing that two motors may be preferred to provide some redundancy to the system, and therefore provide a fault tolerant load handling device.

As noted above, some parts of the load handling device may be swapped or interchanged straightforwardly. Accordingly, the load handling device may be considered to have a modular assembly.

The body of the load handling device may be considered to be a skeleton body, skeleton, frame.

Advantageously, this allows each of the modules to be swapped more easily as there is direct or indirect access to each module. Modules may be self-contained, i.e. a single unit having a number of connected parts, or modules may comprise multiple parts.

Modules may comprise: a direction change assembly, wheels or sets of wheels, drive assembly, lifting assembly, gripper assembly, power means, communication means, control means, sensing means or sensor packs This may particularly advantageously allow components within or supported by the skeleton of the load handling device to be swapped more frequently; for instance, it may allow a rechargeable battery of the load handling device to be easily removed from the skeleton and replaced with another rechargeable battery.

In order to operate autonomously, the load handling device has its own power supply means. The power supply means may be in the form of rechargeable or interchangeable batteries.

The batteries may be located within the skeleton of the load handling device. For example, where the skeleton comprises a hollow rod structure, batteries may be inserted into the rods.

Various control and sensor arrangements are described in WO2019170805 (Ocado), which is incorporated herein by reference.

The load handling device is controlled by an on-board control facility.

The control facility may comprise communication means such as a transceiver unit, or transmitter and receiver units, for sending and receiving instructions from a centralised control facility of the system. The load handling device is able to act substantially autonomously based on instructions or tasks from the centralised control facility.

The on-board control facility is able to control and operate the direction-change mechanism, the drive assembly and the lifting assembly according to instructions received from the centralised control facility. The on-board control facility further comprises input from various sensors and cameras to provide feedback to the control facilities regarding the condition of the load handling device and the environment around the load handling device.

Based on the condition and environment around the load handling device, the on-board control facility operates the direction-change, drive and lifting assemblies to carry out tasks.

Accurate knowledge of the condition of the load handling devices is required to determine the speed at which the load handling device may operate, and when tasks are completed and when the load handling device is available to complete subsequent tasks.

Accurate positioning of each load handling device is required to allow load handling devices to be driven at faster speeds and/or accelerations with minimal positional errors allowing for a reduction in the spacing between load handling devices on the grid system to increase the efficiency of the system.

More than one type of sensor may be used to determine the condition and environment of the load handling device, in order to verify that the received information is correct. More than one sensor of the same type may be mounted on the load handling device at different locations.

In this way, each of the sensors detects different parts of the environment in which the load handling device is operating. Multiple sensors are advantageous because they provide redundancy on the device in that if one sensor fails to capture appropriate information from the environment then one of the other sensors may be more successful.

Moreover, in positions where one sensor is unable to capture the environment (such as over rail intersections) then another sensor may be able to capture the environment more successfully. In addition, with multiple sensors other measurements may be taken such as determining a rotational orientation of the transporting device by comparing positional measurements from one sensor to the same positional measurement on a sensor mounted on an opposing face of the transporting device to determine an angle between the sensors.

Thus, whilst one advantage of the load handling device disclosed herein is removing redundancy, it will be appreciated that for operating in a larger system some redundancy on the load handling device might be desirable for other reasons, for example, for sensing position on a grid.

A load handling device may comprise many different types of sensors, for example: cameras, ultrasonic detectors, x-ray cameras, trundle, or dead reckoning wheel arrangement, gyroscopic, barcode or QR scanner for reading markings provided on the grid; RFID reader for identifying items stored in the system.

One type of sensor that may be used with the load handling device described herein is a low-cost downward looking camera located in the skeleton. Such a camera may be used to detect track crossings and determine grid position.

Sensors may be provided for: assessing the communications functions within the load handling device, measuring traction between the wheels and the grid tracks, measuring the distance travelled, measuring the speed of travel, determining the grid position of the load handling device on the grid, accurate positioning of the load handling device in a single grid space.

It will be appreciated that the load handling device may comprise all, one or any combination of the features described above and that it is not essential to the invention for the service device to include all the sensors and features described.

It is envisaged that any one or more of the variations described in the foregoing paragraphs may be implemented in the same embodiment of a load-handling device.

The invention described herein has been in connection with load handling devices for a grocery retrieval system by way of example. It will be appreciated that the storage system and devices described herein are not limited to the type of article stored and managed therein.

Further, it will be appreciated that some embodiments of the invention may be used in connection with manual handling equipment other than load handling devices.

Many variations and modifications not explicitly described above are also possible without departing from the scope of the invention as defined in the appended claims.

Aspects of exemplary implementations are summarised in the following clauses:

A load handling device, wherein the at least one resiliently deformable member is a flexural hinge, and the compliant mechanism comprises a series of trunk portions attached to an upper brace and a lower brace through flexural hinges.

A load handling device, wherein the flexural hinge comprises a branch portion, or wherein the flexural hinge comprises a spring portion.

A load handling device, wherein each compliant mechanism comprises at least one trunk portion having flexural hinges of a first type and at least one trunk portion having flexural hinges of a second type.

A grid-based storage and retrieval system comprising: a grid framework (14) structure comprising: a first set of parallel rails or tracks (22b) and a second set of parallel rails or tracks (22a) extending substantially perpendicularly to the first set of rails or tracks (22b) in a substantially horizontal plane to form a grid pattern comprising a plurality of grid spaces, wherein the grid is supported by a set of uprights (16) to form a plurality of vertical storage locations beneath the grid for containers (10) to be stacked between and be guided by the uprights in a vertical direction through the plurality of grid spaces, at least one load handling device operating on the grid framework structure; and a centralised control utility for controlling the at least one load handling device(s). A system, wherein the at least one load handling device further comprises a communication means; and the centralised control utility of the storage system comprises communication means for communicating with a communication means on the at least one load handling device.

A system, wherein the centralised control utility remotely monitors the condition of the at least one load handling device.

A system, wherein if a malfunction and or failure of the load handling device is detected, the load handling device is instructed to move to a maintenance area or the edge of the grid using non-malfunctioning and non-failed means.

A system, wherein the centralised control utility communicates with the at least one load handling device operating on the grid to instruct the load handling device to move to a specific location on the grid.

A system, further instructing the load handling device to lift a container from a stack and move the container to another location on the grid, AND OR further instructing the load handling device to lower a container into a stack position beneath the grid.

A wheel wherein the rim of the wheel comprises one or more grooves for receiving an O-ring. A wheel wherein the rim comprises three grooves for receiving three O-rings.

A wheel wherein further comprising an additional layer providing a gap between the depth of the body of the wheel and the outer plane. In this way, the wheel may be "squashed" into a narrower form to pass along a narrower or maligned section of track.

A wheel wherein the wheel is a driven wheel.

A wheel wherein the wheel is suitable for receiving a hub motor.

A method of pre-tensioning a drive belt of a drive belt assembly for a load handling device comprising the steps of: A tensioning means, wherein the second arm is rotatably mounted.

A tensioning means, wherein the drive belt is threaded through the first tensioning arm and the second tensioning arm.

The invention claimed is:

1. A load handling device for lifting and moving storage containers stacked in a grid framework structure, the grid framework structure including a first set of parallel rails or tracks and a second set of parallel rails or tracks extending substantially perpendicularly to the first set of rails or tracks in a substantially horizontal plane to form a grid having a grid pattern with a plurality of grid spaces, wherein the grid is supported by a set of uprights to form a plurality of vertical storage locations beneath the grid for containers to be stacked between and be guided by the uprights in a vertical direction through the plurality of grid spaces, wherein each container includes one or more recesses around an edge of the container on one or more upper faces of the container, the load handling device comprising:
- a body mounted on a first set of wheels configured and arranged to engage with the first set of parallel rails or tracks and a second set of wheels configured and arranged to engage with the second set of parallel rails or tracks; and
- a gripper assembly for latching to a storage container, wherein the gripper assembly includes a deformable flexure mechanism for inserting into a cooperating recess of the one or more recesses of the container, movable between a locked configuration in which it is not possible to remove the deformable flexure mechanism from the cooperating recess of the container, and a release configuration in which it is possible to remove the deformable flexure mechanism from the cooperating recess of the container,
- wherein the deformable flexure mechanism includes:
  - an actuator;
  - two or more gripper-arms having hook-ends; and
  - a number of hinge arrangements, the number of hinge arrangements corresponding to the number of gripper arms, wherein each hinge arrangement is deformable and connects a corresponding gripper-arm to the actuator,
  - wherein each hinge arrangement includes:
    - a fulcrum; and
    - first and second deformable flexure sections connected to respective ends of the fulcrum,
- wherein in the locked configuration the fulcrum is configured to cooperate with the gripper-arms to engage with the gripper-arms and/or the actuator to cause the deformable flexure mechanism to be open or wide to prevent removal of the deformable flexure mechanism from the cooperating recess of the container; and
- wherein in the release configuration, the first and second deformable flexure sections of the hinge arrangements are configured to be flexed to cause the deformable flexure mechanism to be closed or narrow to enable removal of the deformable flexure mechanism from the cooperating recess of the container.

2. A load handling device according to claim 1, wherein the fulcrum is configured to cooperate with the gripper-arms to move the gripper assembly between the locked configuration and the release configuration.

3. A load handling device according to claim 1, wherein the fulcrum is substantially triangular.

4. A load handling device according to claim 1, wherein:
the number of hinge arrangements are connected to the gripper-arms spaced apart from the hook-ends and the fulcrum extends above a line between first and second hinge arrangements of the number of hinge arrangements; or
wherein the fulcrum extends below the line between first and second hinge arrangements of the number of hinge arrangements.

5. A load handling device according to claim 1, wherein the number of hinge arrangements includes two hinge arrangements, each of the two hinge arrangements having a fulcrum; and
wherein the fulcrum of each of the two hinge arrangements together form a beam between respective gripper-arms when in the locked configuration.

6. A load handling device according to claim 1, wherein the gripper assembly comprises:
two or more deformable flexure mechanisms.

7. A load handling device according to claim 1, wherein the gripper assembly comprises:
four deformable flexure mechanisms.

8. A load handling device according to claim 7, comprising:
lifting tapes attached to the gripper-arms.

9. A load handling device according to claim 1, comprising:
a means for lifting storage containers, wherein the means for lifting storage containers includes a gripper plate, and the gripper assembly is mounted on the gripper plate.

10. A load handling device according to claim 9, wherein the means for lifting storage containers is configured to be releasably mountable on the body of the load-handling device.

11. A load handling device according to claim 1, wherein the hook-ends of the two or more gripper-arms engage with the underside of the upper surface of the container.

12. A method of gripping a container with a gripper assembly of a load handling device for lifting and moving storage containers stacked in a grid framework structure, the grid framework structure including:
- a first set of parallel rails or tracks and a second set of parallel rails or tracks extending substantially perpendicularly to the first set of parallel rails or tracks in a substantially horizontal plane to form a grid having a grid pattern with a plurality of grid spaces, wherein the grid is supported by a set of uprights to form a plurality of vertical storage locations beneath the grid for containers to be stacked between and be guided by the uprights in a vertical direction through the plurality of grid spaces, wherein each container includes one or more recesses around an edge of the container on one or more upper faces of the container; and
the load handling device including:
- a body mounted on a first set of wheels being arranged to engage with the first set of parallel rails or tracks and a second set of wheels configured and arranged to engage with the second set of parallel rails or tracks; and
- a gripper assembly for latching to a storage container, wherein the gripper assembly includes a deformable flexure mechanism movable between a locked configuration in which it is not possible to remove the deformable flexure mechanism from a cooperating recess of the one or more recesses of the container, and a release configuration in which it is possible to remove the deformable flexure mechanism from the cooperating recess of the container, wherein the deformable flexure mechanism includes:
  - an actuator;
  - two or more gripper-arms having hook-ends; and
  - a number of hinge arrangements, the number of hinge arrangements corresponding to the number of gripper arms, wherein each hinge arrangement is deformable and connects a corresponding gripper-arm to the actuator,
wherein each hinge arrangement includes:
a fulcrum; and
first and second deformable flexure sections connected to respective ends of the fulcrum, the method comprising the steps of:
(i) inserting the deformable flexure mechanism into the cooperating recess of a the container;
(ii) applying a force to the actuator to move the deformable flexure mechanism into the locked configuration;
(iii) applying a lifting force to the container by the gripper assembly, thereby causing the deformable flexure mechanism to engage with the container,
wherein in the locked configuration the fulcrum is configured to cooperate with the gripper-arms to engage with the gripper-arms and/or the actuator to cause the deformable flexure mechanism to be open or wide to prevent removal of the deformable flexure mechanism from the cooperating recess of the container; and
wherein in the release configuration, the first and second deformable flexure sections of the hinge arrangements are configured to be flexed to cause the deformable flexure mechanism to be closed or narrow to enable removal of the deformable flexure mechanism from the cooperating recess of the container.

13. A method according to claim 12, the method comprising:
when the deformable flexure mechanism is in the locked configuration, applying an actuating force to the gripper assembly, such that the deformable flexure mechanism moves from the locked configuration to the release configuration.

14. A kit of parts for modular assembly of a load handling device configured according to claim 1, the kit comprising:
a plurality of gripper assemblies, each gripper assembly being arranged according to claim 1.

15. A kit of parts according to claim 14, comprising:
a lifting assembly.

16. A grid-based storage and retrieval system comprising:
a grid framework structure having:
a first set of parallel rails or tracks and a second set of parallel rails or tracks extending substantially perpendicularly to the first set of parallel rails or tracks in a substantially horizontal plane to form a grid having a grid pattern with a plurality of grid spaces, wherein the grid is supported by a set of uprights to form a plurality of vertical storage locations beneath the grid for containers to be stacked between and be guided by the uprights in a vertical direction through the plurality of grid spaces;
at least one load handling device according to claim 1, configured for operating on the grid framework structure; and
a centralised control utility for controlling the at least one load handling device.

17. A system according to claim 16, wherein the at least one load handling device comprises:
a communication means; and the centralised control utility of the storage system includes:
communication means for communicating with the communication means on the at least one load handling device.

18. A system according to claim 16, wherein the centralised control utility is configured to remotely monitor a condition of the at least one load handling device.

19. A system according to claim 16, wherein the centralized control utility is configured such that if a malfunction and or failure of the load handling device is detected, the load handling device is instructed to move to a maintenance area or an edge of the grid.

20. A system according to claim 16, wherein the centralised control utility is configured to communicate with the at least one load handling device operating on the grid to instruct the load handling device to move to a specific location on the grid.

21. A system according to claim 20, wherein the centralised control unit utility is configured for instructing the load handling device to lift a container from a stack and move the container to another location on the grid; and/or for instructing the load handling device to lower a container into a stack position beneath the grid.

* * * * *